US010768785B2

(12) United States Patent
Fram

(10) Patent No.: US 10,768,785 B2
(45) Date of Patent: Sep. 8, 2020

(54) PRESSURE SENSITIVE MANIPULATION OF MEDICAL IMAGE DATA

(71) Applicant: MERGE HEALTHCARE SOLUTIONS INC., Hartland, WI (US)

(72) Inventor: Evan K. Fram, Paradise Valley, AZ (US)

(73) Assignee: MERGE HEALTHCARE SOLUTIONS INC., Hartland, WI (US)

(*) Notice: Subject to any disclaimer, the term of this patent is extended or adjusted under 35 U.S.C. 154(b) by 443 days.

(21) Appl. No.: 15/264,404

(22) Filed: Sep. 13, 2016

(65) Prior Publication Data

US 2017/0038926 A1    Feb. 9, 2017

Related U.S. Application Data

(63) Continuation-in-part of application No. 14/792,016, filed on Jul. 6, 2015, now Pat. No. 10,162,483, which is a continuation of application No. 13/651,328, filed on Oct. 12, 2012, now Pat. No. 9,081,479, which is a
(Continued)

(51) Int. Cl.
| | | |
|---|---|---|
| *G06F 3/0482* | (2013.01) | |
| *G06F 3/0481* | (2013.01) | |
| *G06F 3/0487* | (2013.01) | |
| *G06F 3/0488* | (2013.01) | |
| *G06F 3/0484* | (2013.01) | |

(Continued)

(52) U.S. Cl.
CPC ......... *G06F 3/0482* (2013.01); *G06F 1/1694* (2013.01); *G06F 3/03543* (2013.01); *G06F 3/0487* (2013.01); *G06F 3/0488* (2013.01); *G06F 3/04817* (2013.01); *G06F 3/04842* (2013.01); *G06F 3/04812* (2013.01); *G06F 2200/1637* (2013.01); *G06F 2203/04807* (2013.01)

(58) Field of Classification Search
CPC .......... G06F 3/00; G06F 3/048; G06F 3/0219; G06F 3/0482; G06F 3/01; H04M 1/00; H04B 1/38; H04B 1/40
See application file for complete search history.

(56) References Cited

U.S. PATENT DOCUMENTS

| | | |
|---|---|---|
| 5,374,942 A | 12/1994 | Gilligan et al. |
| 5,596,699 A | 1/1997 | Driskell |
| 5,701,424 A | 12/1997 | Atkinson |

(Continued)

OTHER PUBLICATIONS

U.S. Appl. No. 14/792,016, filed Jul. 6, 2015, Fram.
(Continued)

*Primary Examiner* — Rashawn N Tillery
(74) *Attorney, Agent, or Firm* — Michael Best & Friedrich LLP

(57) ABSTRACT

Navigating user-interfaces of medical image viewing software using pressure-sensitive displays can increase productivity of the viewer. In certain embodiments, a menu having a number of icons can be provided on a display device such that the icons are arranged around an initial area that is touched by a user's finger or stylus, for example. Due to the icons being arranged around the initial cursor position, any one of the icons from the menu can be chosen with relatively small finger movement and/or changes in pressure applied by the finger.

18 Claims, 28 Drawing Sheets

Related U.S. Application Data continuation of application No. 12/577,949, filed on Oct. 13, 2009, now abandoned.

(60) Provisional application No. 61/107,621, filed on Oct. 22, 2008.

(51) Int. Cl.
*G06F 3/0354* (2013.01)
*G06F 1/16* (2006.01)

(56) References Cited

U.S. PATENT DOCUMENTS

| | | | |
|---|---|---|---|
| 5,943,039 | A | 8/1999 | Anderson et al. |
| 6,549,219 | B2 | 4/2003 | Selker |
| 7,327,348 | B2 | 2/2008 | Goldenberg et al. |
| 7,389,591 | B2 | 6/2008 | Jaiswal et al. |
| 8,245,156 | B2 | 8/2012 | Mouilleseaux et al. |
| 8,423,306 | B2 | 4/2013 | Duncan et al. |
| 8,549,442 | B2 | 10/2013 | Marks et al. |
| 8,751,948 | B2 | 6/2014 | Wetzer et al. |
| 8,797,350 | B2 | 8/2014 | Fram |
| 8,826,181 | B2 | 9/2014 | Mouilleseaux et al. |
| 9,081,479 | B1 | 7/2015 | Fram |
| 9,524,080 | B1 | 12/2016 | Fram |
| 10,162,483 | B1 | 12/2018 | Fram |
| 10,345,996 | B2 | 7/2019 | Reicher et al. |
| 2002/0075333 | A1 | 6/2002 | Dutta et al. |
| 2003/0217892 | A1 | 11/2003 | Persky |
| 2004/0263475 | A1 | 12/2004 | Wecker et al. |
| 2005/0204312 | A1 | 9/2005 | Rosel |
| 2005/0245803 | A1 | 11/2005 | Glenn, Jr. et al. |
| 2005/0251755 | A1 | 11/2005 | Mullins, II et al. |
| 2006/0187204 | A1 | 8/2006 | Yi et al. |
| 2007/0136690 | A1 | 6/2007 | Maclaurin et al. |
| 2007/0142093 | A1* | 6/2007 | Mikuni ............... G06F 3/0219 455/566 |
| 2007/0234224 | A1 | 10/2007 | Leavitt et al. |
| 2007/0250793 | A1 | 10/2007 | Miura et al. |
| 2007/0274585 | A1 | 11/2007 | Zhang et al. |
| 2008/0022228 | A1 | 1/2008 | Kwon et al. |
| 2008/0024599 | A1 | 1/2008 | Hirakawa |
| 2008/0046931 | A1 | 2/2008 | Corbett et al. |
| 2008/0178090 | A1* | 7/2008 | Mahajan ............. G06F 1/16 715/733 |
| 2008/0222439 | A1 | 9/2008 | Lin et al. |
| 2008/0222569 | A1* | 9/2008 | Champion ........... G06F 3/0482 715/834 |
| 2008/0235583 | A1 | 9/2008 | Ostergaard et al. |
| 2009/0187860 | A1 | 7/2009 | Fleck et al. |
| 2009/0235201 | A1 | 9/2009 | Baalbergen et al. |
| 2009/0327964 | A1 | 12/2009 | Mouilleseaux et al. |
| 2010/0073563 | A1* | 3/2010 | Painter ............... H04N 5/4403 348/563 |
| 2010/0100849 | A1 | 4/2010 | Fram |
| 2010/0214211 | A1 | 8/2010 | Dods et al. |
| 2010/0235794 | A1 | 9/2010 | Ording |
| 2010/0306650 | A1* | 12/2010 | Oh ..................... G06F 3/0482 715/702 |
| 2011/0041077 | A1 | 2/2011 | Reiner |
| 2011/0109650 | A1 | 5/2011 | Kreeger |
| 2011/0289161 | A1 | 11/2011 | Rankin, Jr. et al. |
| 2012/0033866 | A1 | 2/2012 | Masumoto et al. |
| 2012/0154431 | A1 | 6/2012 | Fram |
| 2012/0192108 | A1* | 7/2012 | Kolb ................... G06F 3/0482 715/810 |
| 2013/0212535 | A1* | 8/2013 | Kim ................... G06F 3/0482 715/841 |
| 2014/0325443 | A1* | 10/2014 | Kim ................... G06F 3/0482 715/825 |
| 2014/0359456 | A1 | 12/2014 | Thiele et al. |
| 2014/0362056 | A1 | 12/2014 | Zambetti et al. |
| 2015/0106731 | A1 | 4/2015 | Matas et al. |
| 2015/0220218 | A1* | 8/2015 | Jeon ................... G06F 3/04886 715/825 |
| 2017/0038917 | A1 | 2/2017 | Reicher et al. |
| 2017/0060270 | A1 | 3/2017 | Fram |

OTHER PUBLICATIONS

U.S. Appl. No. 15/097,219, filed Apr. 16, 2016, Reicher et al.
U.S. Office Action, U.S. Appl. No. 13/331,651, dated Sep. 18, 2013.
U.S. Interview Summary, U.S. Appl. No. 13/331,651, dated Oct. 16, 2013.
U.S. Final Office Action, U.S. Appl. No. 13/331,651, dated Jan. 24, 2014.
U.S. Interview Summary, U.S. Appl. No. 13/331,651, dated Mar. 21, 2014.
U.S. Notice of Allowance, U.S. Appl. No. 13/331,651, dated Mar. 31, 2014.
U.S. Office Action, U.S. Appl. No. 14/318,437, dated Mar. 16, 2016.
U.S. Interview Summary, U.S. Appl. No. 14/318,437, dated Jun. 8, 2016, 2016.
Non-Final Office Action from the U.S. Appl. No. 15/097,219 dated Mar. 8, 2018 (9 pages).
Notice of Allowance from the U.S. Appl. No. 15/097,219 dated Aug. 16, 2018 (2 pages).
Final Office Action from the U.S. Appl. No. 15/347,099 dated Jul. 12, 2018 (22 pages).
Notice of Allowance from the U.S. Appl. No. 14/792,016 dated Aug. 7, 2018 (8 pages).
Final Office Action from the U.S. Appl. No. 14/792,016 dated Apr. 20, 2018 (18 pages).
Notice of Allowance from the U.S. Appl. No. 14/792,016 dated May 30, 2018 (8 pages).
Notice of Allowance from the U.S. Appl. No. 15/097,219 dated Jul. 11, 2018 (5 pages).
Non-Final Office Action from the U.S. Appl. No. 15/347,099 dated Jan. 26, 2018 (23 pages).
Examiner-Initiated Interview Summary from the U.S. Appl. No. 14/318,437 dated Sep. 23, 2016 (1 page).
Non-Final Office Action from the U.S. Appl. No. 15/097,219 dated Mar. 8, 2018 (23 pages).
Bronevetsky, Greg, Circle Menus, "What is a Circle Menu?," downloaded from http://www.cs.cornell.edu/boom/2001sp/bronevetsky/What%20is%20a%20Circle%20Menu.htm on May 24, 2010 (3 pages).
Callahan, Jack et al., "An Empirical Comparison of Pie vs. Linear Menus," Computer Science Department, University of Maryland, Sep. 1988 (6 pages).
Hopkins, Don, "Dynamic Pie Menus," Don Hopkins' Web Site, submitted Sep. 18, 2005, downloaded from www.donhopkins.com/drupal/node/68, (3 pages).
Hopkins, Don, "Pie Menus for OLPC Sugar User Interface, in Python with GTK, Cairo and Pangomodules," Don Hopkins' Web Site, downloaded from www.donhopkins.com/drupal/node/128 on May 24, 2010 (13 pages).
Hopkins, Don, The Design and Implementation of Pie Menus—Dr. Dobb's Journal, Dec. 1991, DonHopkins' Web Site, submitted Sep. 27, 2005, downloaded from www.donhopkins.com/drupal/node/98, (8 pages).
Hopkins, Don, "Theta Menus Proposal and Pie Menu Designs—May 1986," Don Hopkins' Web Site, submitted Sep. 26, 2005, downloaded from www.donhopkins.com/drupal/node/82, (14 pages).
Kurtenbach, G., et al., "User Learning and Performance with Marking Menus," Department of ComputerScience, University of Toronto, Ontario, Canada, as downloaded frombillbuxton.com/MMUserLearn.html on May 24, 2010 (11 pages).
Kurtenbach, Gordon, "Notes on the History of Radial menus, Pie menus and Marking menus," Alias, Toronto, Ontario, Canada, Apr. 2004 (2 pages).
Pie Menus, as downloaded from http://c2.com/cgi/wiki?PieMenus on May 24, 2010, (5 pages).

(56) References Cited

OTHER PUBLICATIONS

Rollo, Carl C., "A Brief Description of Pie Menus for Windows," as downloaded from http://web.archive.org/web/20060505030416/www.sm.luth.se/~david/carl/www/piedscrp.html on May 24, 2010 (2 pages).
U.S. Office Action, Final, U.S. Appl. No. 12/577,949, dated Apr. 13, 2012.
U.S. Office Action, Interview Summary, U.S. Appl. No. 12/577,949, dated Feb. 13, 2012.
U.S. Office Action, Notice of Abandonment, U.S. Appl. No. 12/577,949, dated Nov. 15, 2012.
U.S. Office Action, U.S. Appl. No. 12/577,949, dated Dec. 16, 2011.
U.S. Office Action, U.S. Appl. No. 13/651,328, dated Sep. 3, 2014.
U.S. Interview Summary, U.S. Appl. No. 13/651,328, dated Jan. 23, 2015.
U.S. Notice of Allowance, U.S. Appl. No. 13/651,328, dated Mar. 13, 2015.
AGFA HealthCare, color brochure "IMPAX 6: Digital Image and Information Management," © 2012 Agfa HealthCare N.V. Downloaded from http://www.agfahealthcare.com/global/en/he/library/libraryopen?ID=32882925. Accessed on Feb. 9, 2015.
AGFA HealthCare, IMPAX 6.5 Datasheet (US)2012. © 2012 Agfa HealthCare N.V. Downloaded from http://www.agfahealthcare.com/global/en/he/library/libraryopen?ID=37459801. Accessed on Feb. 9, 2015.
AMD Technologies, Inc., Catella PACS 5.0 Viewer User Manual (112 pgs), © 2010, AMD Technologies, Inc. (Doc. 340-3-503 Rev. 01). Downloaded from http://www.amdtechnologies.com/lit/cat5viewer.pdf. Accessed on Feb. 9, 2015.
ASPYRA's Imaging Solutions, 3 page color print out. Accessed at http://www.aspyra.com/imaging-solutions. Accessed on Feb. 9, 2015.
AVREO, interWorks—RIS/PACS package, 2 page color brochure, © 2014, Avreo, Inc. (Document MR-5032 Rev. 4). Downloaded from http://www.avreo.com/ProductBrochures/MR-5032Rev.%204interWORKS%20RISPACSPackage.pdf. Accessed on Feb. 9, 2015.
BRIT Systems, BRIT PACS View Viewer, 2 page color brochure, (BPB-BPV-0001). Downloaded from http://www.brit.com/pdfs/britpacsview.pdf. Accessed on Feb. 9, 2015.
BRIT Systems, Roentgen Works—100% Browers-based VNA (Vendor Neutral Archive/PACS), © 2010 BRIT Systems, 1 page color sheet. Accessed at http://www.roentgenworks.com/PACS. Accessed on Feb. 9, 2015.
BRIT Systems, Vision Multi-modality Viewer—with 3D, 2 page color brochure, (BPB-BVV-0001 REVC). Downloaded from http://www.brit.com/pdfs/BPB-BVV-0001REVC_BRIT_Vision_Viewer.pdf. Accessed on Feb. 9, 2015.
CANDELiS, ImageGrid™: Image Management Appliance, 6 page color brochure. (AD-012 Rev. F Nov. 2012), © 2012 Candelis, Inc. Downloaded from http://www.candelis.com/images/pdf/Candelis_ImageGrid_Appliance_20111121.pdf. Accessed on Feb. 9, 2015.
Carestream, Cardiology PACS, 8 page color brochure. (CAT 866 6075 Jun. 2012). © Carestream Health, Inc., 2012. Downloaded from http://www.carestream.com/cardioPACS_brochure_M1-877.pdf. Accessed on Feb. 9, 2015.
Carestream, Vue PACS, 8 page color brochure. (CAT 300 1035 May 2014). © Carestream Health, Inc., 2014. Downloaded from http://www.carestream.com/csPACS_brochure_M1-876.pdf. Accessed on Feb. 9, 2015.
Cerner, Radiology—Streamline image management, 2 page color brochure, (fl03_332_10_v3). Downloaded from http://www.cerner.com/uploadedFiles/Clinical_Imaging.pdf. Accessed on Feb. 9, 2015.
CoActiv, EXAM-PACS, 2 page color brochure, © 2014 CoActiv, LLC. Downloaded from http://coactiv.com/wp-content/uploads/2013/08/EXAM-PACS-BROCHURE-final-web.pdf. Accessed on Feb. 9, 2015.
DR Systems, Dominator™ Guide for Reading Physicians, Release 8.2, 546 pages, (TCP-000260-A), © 1997-2009, DR Systems, Inc. Downloaded from https://resources.dominator.com/assets/004/6999.pdf. Document accessed Feb. 9, 2015.
DR Systems, DR Scheduler User Guide, Release 8.2, 410 pages, (TCP-000115-A), © 1997-2009, DR Systems, Inc. Downloaded from https://resources.dominator.com/assets/003/6850.pdf. Document accessed Feb. 9, 2015.
FUJIFILM Medical Systems, SYNAPSE® Product Data, Synapse Release Version 3.2.1, Foundation Technologies, 4 page color brochure, (XBUSSY084) Aug. 2008. Downloaded from http://www.fujifilmusa.com/shared/bin/foundation.pdf. Accessed on Feb. 9, 2015.
FUJIFILM Medical Systems, SYNAPSE® Product Data, Synapse Release Version 3.2.1, Server Modules and Interfaces, 4 page color brochure, (XBUSSY085) Aug. 2008. Downloaded from http://www.fujifilmusa.com/shared/bin/server-interface.pdf. Accessed on Feb. 9, 2015.
FUJIFILM Medical Systems, SYNAPSE® Product Data, Synapse Release Version 3.2.1, Workstation Software, 4 page color brochure, (XBUSSY082) Aug. 2008. Downloaded from http://www.fujifilmusa.com/shared/bin/workstation.pdf. Accessed on Feb. 9, 2015.
GE Healthcare, Centricity PACS, in 8 page printout. Accessed at http://www3.gehealthcare.com/en/products/categories/healthcare_it/medical_imaging_informatics_-_ris-pacs-cvis/centricity_pacs. Accessed on Feb. 9, 2015.
Handylife.com—Overview of Handy Patients Enterprise, in 2 page printout. Accessed from http://www.handylife.com/en/software/overview.html. Accessed on Feb. 18, 2015.
Handylife.com—Features of Handy Patients Enterprise, in 4 page printout. Accessed from http://www.handylife.com/en/software/features.html. Accessed on Feb. 18, 2015.
Handylife.com—Screenshots of Handy Patients Enterprise, in 2 page printout. Accessed from http://www.handylife.com/en/software/screenshots.html. Accessed on Feb. 18, 2015.
ICRco, I See the Future, in 12 pages, color brochure, (BR080809AUS), © 2009 iCRco.ClarityPACS. Downloaded from http://www.claritypacs.com/pdfs/ISeeFuture_26_Web.pdf. Accessed on Feb. 9, 2015.
Imageanalysis, dynamika, 2 page color brochure. Downloaded from http://www.imageanalysis.org.uk/what-we-do. Accessed on Feb. 9, 2015.
Imageanalysis, MRI Software, in 5 page printout. Accessed at http://www.imageanalysis.org.uk/mri-software. Accessed on Feb. 9, 2015.
IMSI, Integrated Modular Systems, Inc., Hosted / Cloud PACS in one page printout. Accessed at http://www.imsimed.com/#!products-services/ctnu. Accessed on Feb. 9, 2015.
lnfinitt, PACS, RIS, Mammo PACS, Cardiology Suite and 3D/Advanced Visualization | Infinittna, 2 page printout. Accessed at http://www.infinittna.com/products/radiology/radiology-pacs. Accessed on Feb. 9, 2015.
Intelerad, IntelePACS, 2 page color brochure, © 2014 Intelerad Medical Systems Incoprorated. Downloaded http://www.intelerad.com/wp-content/uploads/sites/2/2014/08/IntelePACS-brochure.pdf. Accessed on Feb. 9, 2015.
Intelerad, InteleViewer, 2 page color brochure, © 2014 Intelerad Medical Systems Incoprorated. Downloaded from http://www.intelerad.com/wp-content/uploads/sites/2/2014/09/InteleViewer-brochure.pdf. Accessed on Feb. 9, 2015.
Intuitive Imaging Informatics, ImageQube, 1 page in color. Downloaded from http://www.intuitiveimaging.com/2013/pdf/ImageQube%20one-sheet.pdf. Accessed on Feb. 9, 2015.
Kuhl, Helen: Comparison Chart/PACS, Customers Are Happy, but Looking for More, (color) Imaging Techology News, itnonline.com, May 2012, pp. 24-27. Downloaded from http://www.merge.com/MergeHealthcare/media/company/In%20The%20News/merge-pacs-comparison.pdf. Accessed on Feb. 9, 2015.
LUMEDX CardioPACS 5.0 Web Viewer, Cardiopacs Module, 2 page color brochure, (506-10011 Rev A). Downloaded from http://cdn.medicexchange.com/images/whitepaper/cardiopacs_web_viewer.pdf?1295436926. Accessed on Feb. 9, 2015.
LUMEDX Cardiovascular Information System, CardioPACS, one page in color printout. Accessed at http://www.lumedx..com/pacs.aspx. Accessed on Feb. 9, 2015.
McKesson Enterprise Medical Imaging and PACS | McKesson, 1 page (color) printout. Accessed at http://www.mckesson.com/providers/health-systems/diagnostic-imaging/enterprise-medical-imaging. Accessed on Feb. 9, 2015.

(56) References Cited

OTHER PUBLICATIONS

Medweb Radiology Workflow Solutions, Radiology Workflow Solutions, Complete Workflow & Flexible Turnkey Solutions, Web RIS/PACS with Advanced Viewer, 3 page color brochure, © 2006-2014 Medweb. Downloaded from http://www.medweb.com/docs/rispacs_brochure_2014.pdf. Accessed on Feb. 9, 2015.
Merge Radiology Solutions, Merge PACS, A real-time picture archiving communication system, (PAX-21990 rev 2.0), 2 page color brochure. Downloaded from http://www.merge.com/MergeHealthcare/media/documents/brochures/Merge_PACS_web.pdf. Accessed on Feb. 9, 2015.
NOVARAD Enterprise Imaging Solutions, NOVAPACS, 2 page (color) printout. Accessed at http://ww1.novarad.net/novapacs. Accessed on Feb. 9, 2015.
PACSPLUS, PACSPLUS Server, 1 page (color) printout. Accessed at http://www.pacsplus.com/01_products/products_01.html. Accessed on Feb. 9, 2015.
PACSPLUS, PACSPLUS Workstation, 3 page (color) printout. Accessed at http://www.pacsplus.com/01_products/products_01.html. Accessed on Feb. 9, 2015.
Philips IntelliSpace PACS, in 2 color page printout. Accessed at https://www.healthcare.philips.com/main/products/healthcare_informatics/products/enterprise_imaging_informatics/isite_pacs. Accessed on Feb. 9, 2015.
Philips, IntelliSpace: Multi-modality tumor tracking application versus manual PACS methods, a time study for Response Evaluation Criteria in Solid Tumors (RECIST). 2012, Koninklijke Philips Electronics N.V., in four pages.
RamSoft, RIS PACS Teleradiology, PowerServer PACS, Lite PACS, XU PACS Compare RamSoft PACS Products, 2 color page printout. Accessed at http://www.ramsoft.com/products/powerserver-pacs-overview. Accessed on Feb. 9, 2015.
Sage Intergy PACS | Product Summary. Enhancing Your Workflow by Delivering Web-based Diagnostic Images When and Where You Need Them, in 2 color pages. (IRV-SS-INTPACS-PSS-031309). © 2009 Sage Software Healcare, Inc. Downloaded from http://www.greenwayhealth.com/solutions/intergy/. Accessed on Feb. 9, 2015.
ScImage, Cardiology PACS, in 8 color page printout. Accessed at http://www.scimage.com/solutions/clinical-solutions/cardiology. Accessed on Feb. 9, 2015.
Sectra RIS PACS, in 2 color page printout. Accessed at https://www.sectra.com/medical/diagnostic_imaging/solutions/ris-pacs/. Accessed on Feb. 9, 2015.
Siemens syngo.plaza, Features and Benefits, in 2 color page printout. Accessed at http://www.healthcare.siemens.com/medical-imaging-it/imaging-it-radiology-image-management-pacs/syngoplaza/features. Accessed on Feb. 9, 2015.
Simms | RIS and PACS Medical Imaging Software, in 2 color page printout. http://www.mysimms.com/ris-pacs.php. Accessed on Feb. 9, 2015.
Stryker, Imaging—OfficePACS Power Digital Imaging, in one color page printout. Accessed from http://www.stryker.com/emea/Solutions/Imaging/OfficePACSPowerDigitalImaging/index.htm. Accessed on Feb. 9, 2015.
Stryker, OfficePACS Power—Digital Imaging, 8 page color brochure, (MPP-022 Rev 4 BC/MP 300 Jan. 2007). © 2007 Stryker. Downloaded from http://www.stryker.com/emea/Solutions/Imaging/OfficePACSPowerDigitalImaging/ssLINK/emea/1557/022268. Accessed on Feb. 9, 2015.
UltraRAD—ultra Vision, 1 page (color). Downloaded from http://www.ultraradcorp.com/pdf/UltraVISION.pdf. Accessed on Feb. 9, 2015.
VioStream for VitreaView, 2 color pages printout. Accessed at http://www.vitalimages.com/solutions/universal-viewing/viostream-for-vitreaview. Accessed on Feb. 9, 2015.
Visage Imaging Visage 7, 3 color page printout. Accessed at http://www.visageimaging.com/visage-7. Accessed on Feb. 9, 2015.
VIZTEK Radiology PACS Software Vixtek Opal-RAD, 4 color page printout. Accessed at http://viztek.net/products/opal-rad. Accessed on Feb. 9, 2015.
Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.
Voyager Imaging—Voyager Pacs, 3 page color brochure. Downloaded from http://www.intellirad.com.au/index.php/assets/Uploads/Voyager-Pacs3.pdf. Accessed on Feb. 9, 2015.
Non-Final Office Action from the U.S. Appl. No. 15/097,219 dated Sep. 21, 2018 (10 pages).
Notice of Allowance from the U.S. Appl. No. 15/097,219 dated Mar. 1, 2019 (5 pages).
Final Office Action from the U.S. Appl. No. 15/347,099 dated Mar. 8, 2019 (26 pages).
Non-Final Office Action from the U.S. Patent and Trademark Office for U.S. Appl. No. 14/792,016 dated Nov. 2, 2017 (19 pages).
Applicant-Intiated Interview Summary from the U.S. Patent and Trademark Office for U.S. Appl. No. 14/792,016 dated Jan. 19, 2018 (3 pages).
Notice of Allowance from the U.S. Patent and Trademark Office for U.S. Appl. No. 14/318,437 dated Sep. 23, 2016 (9 pages).
Notice of Allowance from the U.S. Patent and Trademark Office for U.S. Appl. No. 15/347,099 dated Sep. 9, 2019 (5 pages).
Notice of Allowance from the U.S. Patent and Trademark Office for U.S. Appl. No. 15/347,099 dated May 28, 2019 (5 pages).
Non-Final Office Action from the U.S. Patent and Trademark Office for U.S. Appl. No. 15/347,099 dated Dec. 6, 2018 (32 pages).
Examiner-Initiated Interview Summary from the U.S. Patent and Trademark Office for U.S. Appl. No. 15/347,099 dated Oct. 15, 2018 (2 pages).
Advisory Action from the U.S. Patent and Trademark Office for U.S. Appl. No. 15/347,099 dated Oct. 15, 2018 (3 pages).
Applicant-Intiated Interview Summary from the U.S. Patent and Trademark Office for U.S. Appl. No. 15/347,099 dated May 1, 2019 (15 pages).
Corrected Notice of Allowability from the U.S. Patent and Trademark Office for U.S. Appl. No. 15/097,219 dated Mar. 28, 2019 (2 pages).

* cited by examiner

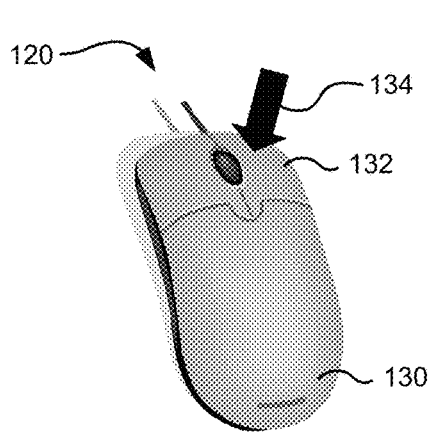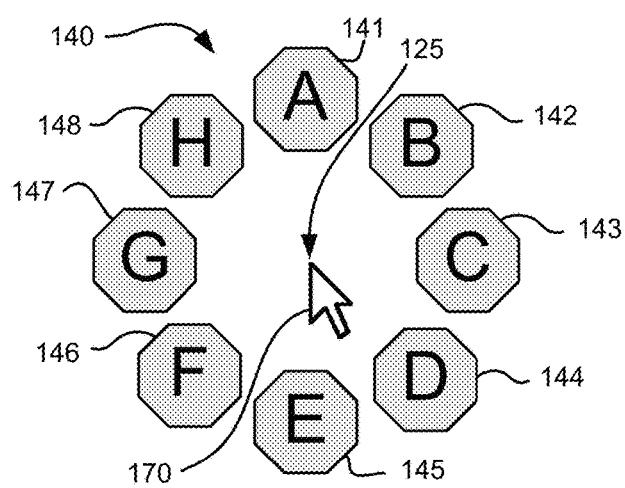
*Fig. 1b*
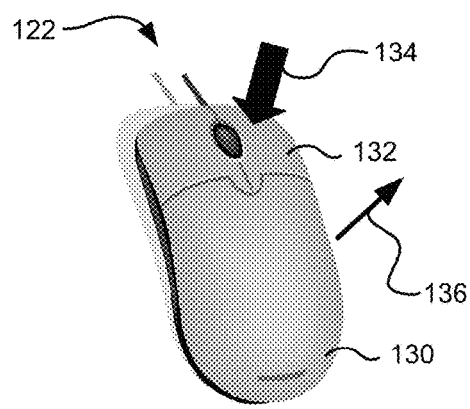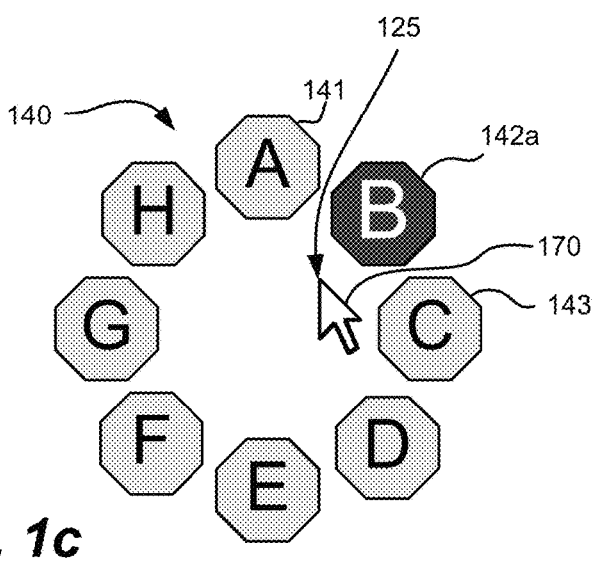
*Fig. 1c*
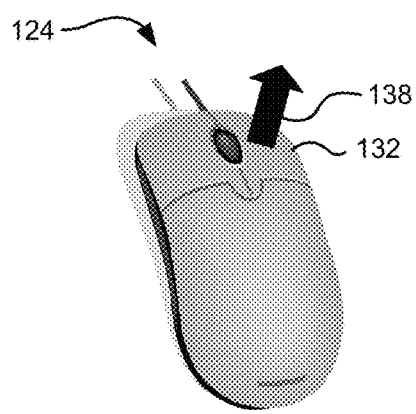
*Fig. 1d*

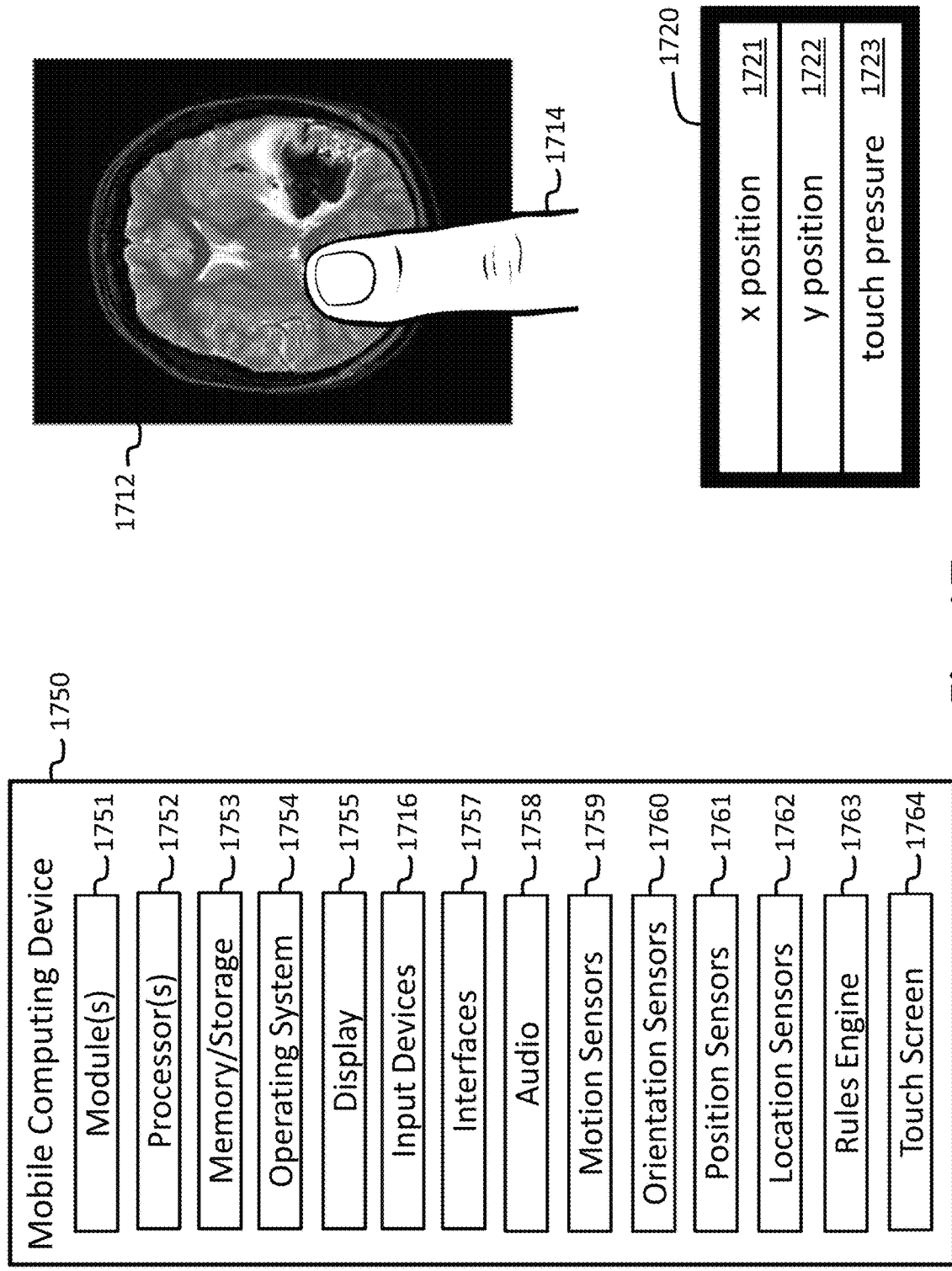

PRESSURE SENSITIVE MANIPULATION OF MEDICAL IMAGE DATA

CROSS-REFERENCE TO RELATED APPLICATIONS

This application is a continuation-in-part of U.S. patent application Ser. No. 14/792,016 filed on Jul. 6, 2015, titled "USER INTERFACE SYSTEMS AND METHODS," which is a continuation of U.S. patent application Ser. No. 13/651,328 filed on Oct. 12, 2012, titled "USER INTERFACE SYSTEMS AND METHODS," which is a continuation of U.S. patent application Ser. No. 12/577,949 filed on Oct. 13, 2009, titled "USER INTERFACE SYSTEMS AND METHODS," which claims priority under 35 U.S.C. § 119(e) to U.S. Provisional Application Ser. No. 61/107,621, filed on Oct. 22, 2008, each of which is hereby expressly incorporated by reference in its entirety. All publications and patent applications mentioned in this specification are herein incorporated by reference in their entirety to the same extent as if each individual publication or patent application was specifically and individually indicated to be incorporated by reference.

BACKGROUND

Field

This invention relates to computing devices and, more particularly, to systems and methods of providing user interface for computing devices.

Description of the Related Art

In many computer uses, a user selects from a menu displayed on an interface such as a screen. Such selection can be achieved by, for example, a cursor based input. An interface device such as a mouse can move the cursor to a desired location for activating an icon of the menu.

In many situations, such cursor movement can cover significant distances on the screen. Repetition of cursor movements can result in user fatigue, frustration, and repetitive motion injury. Additionally, while each individual movement to a menu of a software application may require little time, repeated use of the menu over time results in a significant amount of cumulative time spent, reducing user productivity and efficiency.

SUMMARY

In one embodiment, a method for providing a user interface on a computing device comprises displaying a first menu on a display of a computing device, the first menu having a first plurality of icons arranged in an icon region that extends substantially around an initial position of a cursor, wherein the icon region defines a central region within the icon region that includes the initial cursor position. In one embodiment, the method further comprises detecting movement of the cursor to a second position within the central region, wherein the second position of the cursor is near a first icon of the first plurality of icons or includes at least a portion of the first icon, changing an appearance of the first icon in response to detecting movement of the cursor to the second position, wherein the change in appearance indicates that the icon is temporarily selected, initiating a first action associated with the first icon in response to detecting an input from the user indicating that the first icon should be permanently selected, wherein at least some of the method is performed by the computing device.

In one embodiment, a method for providing a user interface on a computing device comprises displaying a first menu on a display of the computing device, the first menu having a plurality of icons arranged substantially around a current position of a cursor, the plurality of icons defining a central region of the display between the plurality of icons and including the current position of the cursor, receiving a first input indicative of movement of the cursor, determining which of the plurality of icons is to be temporarily selected based at least in part on a pattern of the first input within the central region, and temporarily selecting the determined icon.

In one embodiment, a computing system comprises a display screen, an input device configured to facilitate interaction with a user, and a processor configured to execute software code that causes the computing system to display a menu on the display screen, the menu having a plurality of icons arranged about a home region, detect an input facilitated by the input device and indicative of the user's desire to at least temporarily select one of the icons, and determine which of the icons is to be at least temporarily selected based at least in part on a pattern of the input, the pattern involving at least a part of the home region.

In one embodiment, a method for providing a user interface on a computing device comprises displaying a first menu on a display of a computing device, the first menu having a first plurality of icons arranged in an icon region that extends substantially around an interaction position, wherein the interaction position comprises an area of the display where a user or an apparatus controlled by a user touched the display, a current position of a cursor, or a predetermined position on the display. In one embodiment, the method further comprising receiving a first user-initiated input indicative of movement from the interaction position, and in response to the movement, selecting an icon associated with a direction of the first user-initiated input, wherein at least some of the method is performed by the computing device.

Additional embodiments of the disclosure are described below in reference to the appended claims, which may serve as an additional summary of the disclosure.

Design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, image data (including medical images) and may enable a user to more quickly and accurately access, navigate, assess, and digest the image data than previous systems.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

FIG. 1B illustrates an example of a graphical menu and an example of mouse activity that could be used to initiate its display.

FIG. 1C illustrates mouse activity that could be used to temporality select an icon within the graphical menu of FIG. 1B.

FIG. 1D illustrates mouse activity that could be used to permanently select the temporarily selected icon of FIG. 1C.

FIG. 17 illustrates a touch screen that allows display of visual information, in this example a brain MRI image, as well as touch input, for example from a finger.

DETAILED DESCRIPTION OF CERTAIN EMBODIMENTS

Figure 1A:
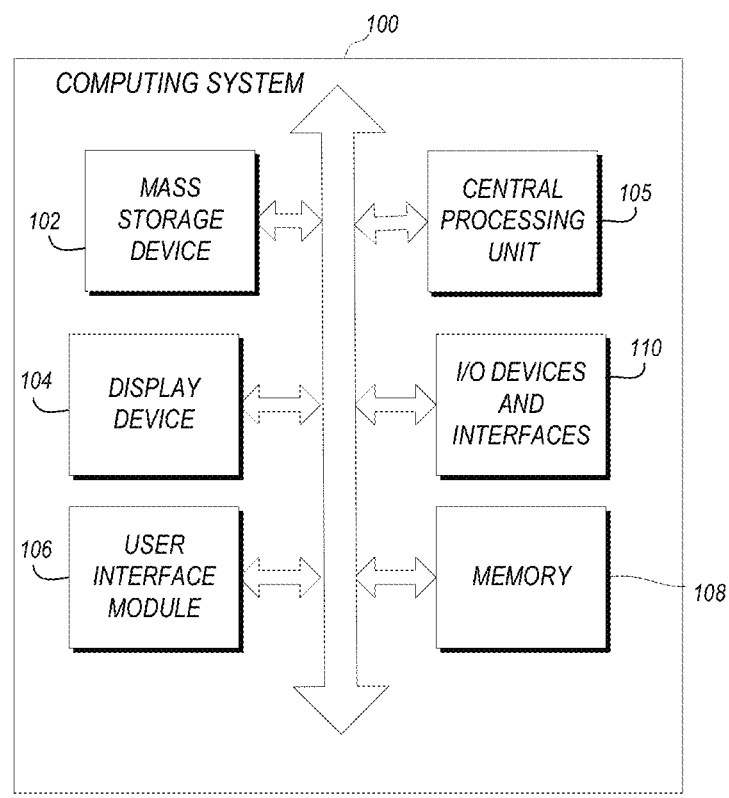
FIG. 1A is a block diagram illustrating one embodiment of a computing system that may be used to implement certain systems and methods described herein.

Embodiments of the user interface will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the user interface may include several novel features, no single one of which is solely responsible for its desirable attributes or which is essential to practicing the inventions herein described.

People spend large amounts of time interacting with computers and computer like devices such as cell phones, PDAs, gaming devices and portable media players. There is a need for improved ways of interacting with these and other devices that: improves speed and efficiency; reduces repetitive motion injury; is more intuitive; and/or operates well on small display screens.

Various systems and methods described herein address some or all of these issues with embodiments of a flexible graphical menu and an efficient method of interacting with it. While embodiments of the user interface will be illustrated using display of a graphical menu, sound could be used as a supplement or replacement for display of the graphical menu, as will be discussed below.

User Interfaces and Menus

User interfaces are described herein for depicting data on a display device of a computer, where the term "computer" is meant to include any of the computing devices described above, as well as any other electronic device that includes a display and/or other audio output device. Depending on the embodiment, the user interfaces described herein may provide one or more of several advantages. For example, a user interface may include a graphical menu that appears on demand so it does not take up room on the display screen until it is needed. This reduces screen clutter and is especially useful with small screens as there is no need to devote screen pixels to display the menu until it is needed. In another example, the user does not have to move the screen cursor large distances to initiate display of the graphical menu.

In yet another example, the graphical menu appears in a home region, which includes an area surrounding or near a current cursor position in one embodiment, or other area with which the user is likely interfacing with. Therefore, the user does not need to direct his attention to other areas of the screen, which may provide a particular advantage when users are concentrating on analyzing content of screen. In yet another example, the user can pick an icon (e.g., that is representative of a function that may be performed by a software application) within a graphical menu with only minimal mouse movement. In some embodiments, it is not necessary for the user to position the cursor over an icon or click on it, but only move slightly toward it, or hover over or near it for a predetermined period of time. This may increase user speed and efficiency. In addition, the reduction in mouse movement has the potential to reduce repetitive motion injury, particularly in applications where users interface with computers for many hours per days, for example: radiologists reading medical imaging exams on Picture Archive and Communication Systems; office workers who spend hours per day with email, word processing, and spreadsheet applications, for example; web surfing; and/or computer gaming.

In another example, pressure sensitive touch screens can simplify methods for causing display of a graphical menu and selecting icons. In contrast to more time consuming methods, or methods that require additional movement of a mouse or other input device, a user can simply select a portion of the touch screen and apply the user's preferred pressure level to the touch screen, and the graphical menu can appear. Upon selecting a particular icon, the user can simply apply a lesser, or optionally greater, pressure and the particular icon can be permanently selected. As complex user interfaces become the norm, simplifying and improving user interfaces—specifically when used by medical professionals—is paramount to increase efficiency.

In another example, the systems and methods described herein may provide visual and/or auditory feedback as to which of the items in a graphical menu has been chosen and the user can vary mouse position and dynamically change the selected icon. In yet another example, once a user learns the relative positions of icons within a graphical menu, there is no need for the user to visually examine the presented menu; rather, the user may rapidly choose the desired icon by moving the mouse (or other input device) in the remembered direction (or pattern of directions) of the desired icon(s).

In yet another example, user interfaces described herein may include a graphical menu that is customizable. For example, a user may select positions of selectable icons (e.g., that are associated with particular functions) within the graphical menu, and/or may select particular icons to be included in the graphical menu. Functions may be selected by movement of an input (e.g., from a mouse cursor) to a location associated with icons in the graphical menu. In an embodiment, movement of an input generally along a first axis (e.g., up and down on a display) and/or another pre-defined path may cause performance of a selected function (e.g., scrolling through images), while movement of an input generally along a second axis (e.g., left and right on a display) and/or another pre-defined path may allow selection of a different function via a graphical menu. Thereafter, for example, movement of an input generally along the first axis may operate the different selected function.

The present disclosure is presented generally in the following structure. Some terms as used herein are defined for clarity. An embodiment of an exemplary computing system, which is actually representative of any computing system on which user interfaces may be display and interfaced with by a user, is described with reference to FIG. 1A. FIGS. 1B-1E illustrate sample conceptual configurations of menus, and exemplary navigation thereof. Embodiments of the user interface systems and methods for use on computing devices with small screens or other systems without a mouse, such as a cell phone, PDA, gaming device, MP3 or media player, or tablet PC, are described in conjunction with FIGS. 2A and 2B. An example embodiment on a handheld device that can sense movement or position, such as an Apple iPhone or iTouch, will be described in conjunction with FIG. 2C. Methods for determining icon selection within a graphical menu based on cursor position will be described in conjunction with FIGS. 3, 4A-4B, and 5A-5C. FIGS. 6A and 6B are flowcharts illustrating operation of a computing device according to embodiments. Another embodiment including computer screen examples is discussed in conjunction with FIGS. 7A-7C. Yet further embodiments are discussed in conjunction with FIGS. 8A-8D. Other contemplated embodiments are discussed, including use of sound as a supplement to or replacement for display of a graphical menu.

Definitions Of Certain Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A "graphical menu" can include one or more graphical or textual objects, such as icons, where each of the objects is representative of a particular menu option.

An "icon" can be a component of a graphical menu that could be anything displayed on the screen that is visually distinguishable, such as a picture, button, frame, drawing, text, etc.

An "initial cursor position" can include a screen location of a cursor at the time the graphical menu system is initiated. The graphical menu is typically displayed around the initial cursor position and sufficient movement from this position is typically required for an icon to be selected.

A "home region" is the region around the initial cursor position, and including the initial cursor position. The home region may extend different distances from the initial cursor position, such as just a distance of a few millimeters on the display device to a few centimeters or more on the display device. Depending on the embodiment, the home region may be centered around the initial cursor position or may be offset such that the initial cursor position is closer to one edge (e.g., a top edge) of the home region than to an opposite edge (e.g., the bottom edge) of the home region. A home region may also be determined based on a location where a user has interfaced with a display device, where there may not be a cursor at all, such as a location where a touchscreen was touched by a finger or stylus of the user or where the finger or stylus moved in a predetermined pattern on the touchscreen.

A "temporarily selected icon" can include an icon within a graphical menu that has been temporarily chosen by the user, but has not yet been selected such that the particular menu option associated with the temporarily selected icon has not yet been initiated. Rather, the graphical menu is displayed so that the user can confirm that the temporarily selected icon is the desired icon. If the user is not satisfied with the indicated temporary selection, the user can choose a different icon within the graphical menu or choose no icon. A temporarily selected icon may be displayed in such a way as to allow the user to visually distinguish it from icons that are not temporarily selected.

A "permanently selected icon" (or simply "selected icon") can include an icon that has been selected by the user. When an icon is permanently selected, a software function associated with the icon is initiated by the program or operating system. An icon may be permanently selected in various manners, depending on the embodiment, some of which are described in further detail below.

Computing Systems

In some embodiments, the computing devices, computing systems, mobile devices, workstations, computer clients and/or servers described herein may comprise various combinations of components, such as the exemplary combinations of components illustrated in FIG. 1A-1E. Discussion herein of one or more specific types of computing devices should be construed to include any other type of computing device. Thus, a discussion of a method performed by a mobile computing device is also contemplated for performance on a desktop workstation, for example. However, certain features discussed herein are limited to devices that can distinguish various pressure levels of touch input, for example, touch screens, touchpads, mice, tablets, and input styluses that can sense various levels of pressure.

FIG. 1A is a block diagram illustrating one embodiment of a computing system 100 that may be used to implement certain systems and methods described herein. For example, the computing system 100 may be configured to execute software modules that cause the display of a menu around an area of focus (e.g., a current cursor position or a position on a touch screen that is touched by a finger or stylus) on a display device 104. Below is a description of exemplary components of the computing system 100.

The computing system 100 includes, for example, a personal computer that is IBM, Macintosh, or Linux/Unix compatible. In one embodiment, the computing system 100 comprises a server, a desktop computer, a laptop computer, a mobile computer, a cell phone, a personal digital assistant, a gaming system, a kiosk, an audio player, any other device that utilizes a graphical user interface (including office equipment, automobiles, airplane cockpits, household appliances, automated teller machines, self-service checkouts at stores, information and other kiosks, ticketing kiosks, vending machines, industrial equipment, etc.) and/or a television, for example. In one embodiment, the exemplary computing system 100 includes a central processing unit ("CPU") 105, which may include one or more conventional or proprietary microprocessor. The computing system 100 further includes a memory 108, such as one or more random access memories ("RAM") for temporary storage of information, a read only memory ("ROM") for permanent storage of information, and a mass storage device 102, such as a hard drive, diskette, flash memory drive, or optical media storage device. The modules of the computing system 100 may be connected using a standard based bus system. In different embodiments, the standard based bus system could be Peripheral Component Interconnect ("PCI"), PCI Express, Accelerated Graphics Port ("AGP"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Windows 7, Windows 8, Windows 10, Windows Mobile, Unix, Linux (including any of the various variants thereof), SunOS, Solaris, mobile phone operating systems, or other compatible operating systems. In Macintosh systems, the operating system may be any available operating system, such as MAC OS X or iPhone OS. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 includes one or more input/output (I/O) devices and interfaces 110, such as a keyboard, trackball, mouse, drawing tablet, joystick, game controller, touchscreen (e.g., capacitive or resistive touchscreen) touchpad, accelerometer, and printer, for example. The computing system also includes a display device 104 (also referred to herein as a display screen), which may also be one of the I/O device 110 in the case of a touchscreen, for example. In other embodiments, the display device 104 may include an LCD, OLED, or other thin screen display surface, a monitor, television, projector, or any other device that visually depicts user interfaces and data to viewers. The display device 104 provides for the presentation of GUIs, application software data, and multimedia presentations, for example. The computing system 100 may also include one or more multimedia devices, such as speakers, video cards, graphics accelerators, and microphones, for example.

In the embodiment of FIG. 1, the I/O devices and interfaces 110 may provide a communication interface to various external devices. For example, the computing system 100 may be electronically coupled to a network, such as one or more of a LAN, WAN, or the Internet, for example, via a wired, wireless, or combination of wired and wireless, communication link(s). Such a network may allow communication with various other computing devices and/or other electronic devices via wired or wireless communication links.

In the embodiment of FIG. 1, the computing system 100 also includes a user interface module 106 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 1, the computing system 100 is configured to execute the user interface module 106, among others, in order to provide user interfaces to the user, such as via the display device 104, and monitor input from the user, such as via a touchscreen sensor of the display device 104 and/or one or more I/O devices 110, in order to navigate through various menus of a software application menu, for example.

In general, the word "module," as used herein, refers to logic embodied in hardware or firmware, or to a collection of software instructions, possibly having entry and exit points, written in a programming language, such as, for example, Java, Javascript, ActionScript, Visual Basic, Lua, Swift, Objective C, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In other embodiments, the computing system may include fewer or additional components than are illustrated in FIG. 1A. For example, a mobile computing device may not include a mass storage device 102 and the display device 104 may also be the I/O device 110 (e.g., a capacitive touchscreen). In some embodiments, two or more of the components of the computing system 100 may be implement in one or more field programmable gate array (FPGA) or application specific integrated circuit (ASIC), for example.

Examples of Systems and Methods

In FIG. 1B, view 120 illustrates a mouse 130 comprising a right button 132. In view 120, a user depresses right mouse button 132 of mouse 130, with depression of the right mouse button illustrated with arrow 134. In one embodiment, depressing the right mouse button 132 initiates display of a graphical menu 140 on the display screen centered around initial cursor position 125 on the display device. In other embodiments, other operations may be performed on the mouse 130 (or other input device) in order to initiate display of the graphical menu 140. In the embodiment of FIG. 1B, the graphical menu 140 comprises one or more icons (in this example, eight octagonal icons labeled 141-148). Graphical menus and their component icons can vary in appearance and functionality, as will be described below.

The example graphical menu 140 may be displayed on top of whatever else might be displayed on the display screen, with some portions of the graphical menu transparent in some embodiments. In the example of FIG. 1B, the graphical menu 140 is displayed so that it is centered around the initial cursor position 125.

For the purposes of the series of events illustrated in FIG. 1B, FIG. 1C, and FIG. 1D, it is assumed that by default, display of the graphical menu 140 is centered on initial cursor position 125 (e.g., the cursor position when the user initiated displayed of the graphical menu, such as by right clicking the mouse 130).

FIG. 1C illustrates in view 122 a mouse movement that could be used to temporality select the icon 142 (FIG. 1B), such that the icon 142a (FIG. 1C) is temporarily selected. As illustrated in view 122, the user continues action 134 of depressing the right mouse button 132 and, in this example, moves the mouse 130 superiorly and to the right, along the path depicted by arrow 136. This movement of the mouse causes cursor 170 to move superiorly and to the right on the display device on which the graphical menu 140 is displayed. Thus, FIG. 1C illustrates cursor 170 moved from the initial cursor position 125 towards icon 142a.

As the cursor 170 approaches a portion of the graphical menu, an icon within the graphical menu is temporarily chosen and displayed in such a way as to visually distinguish it from unselected icons within the graphical menu. Thus, the graphical menu 140 shows the temporarily selected icon 142a displayed in a way that differentiates it from its original appearance as icon 142 (FIG. 1B). In the example of FIGS. 1B and 1C, icon 142 in FIG. 1B has changed to icon 142a in FIG. 1C by changing background and font colors of the icon 142, in order to indicate that icon 142 has been temporarily selected. There are many ways that an icon could change to depict that it is temporarily selected and differentiate it from icons that are not chosen. For example, an icon may become animated when temporarily selected, may display a modified or different image or text, or may be transformed in any other manner.

As noted above, in this exemplary embodiment the user is not required to position the cursor 170 directly over an icon in order to select that icon. As will be discussed in more detail below, only minimal movement toward an icon may be required to select it, increasing efficiency and decreasing necessary mouse movement and the potential for repetitive motion injury.

FIG. 1D demonstrates how the user indicates that the temporarily selected icon 142a (FIG. 1C) is permanently selected, which represents a final choice for this interaction with the graphical menu and the graphical menu is no longer displayed. As illustrated in view 124, the user releases mouse button 132 such that the button moves in a direction depicted by arrow 138 (e.g., releasing the right button 132). Thus, in the embodiment of FIGS. 1B, 1C, and 1D, an icon is temporarily selected by depressing the right button 132 in order to initiate display of the graphical menu, moving the cursor 170 towards (and/or partially or fully over) a desired icon in order to temporarily select the icon, and releasing the right button 132 to permanently select the desired icon in order to initiate execution of an operation associated with the selected icon.

In the embodiment illustrated in FIG. 1B, graphical menu 140 is displayed symmetrically around initial cursor position 125. However, in another embodiment where there is a default icon choice, for example, the graphical menu could be asymmetrically positioned around the initial cursor position such that an icon is chosen by default. In one embodiment, the graphical menu 140 may be positioned such that a default icon is closer to the initial cursor position when the graphical menu 140 is initially displayed. With reference to FIG. 1C, for example, if the initial cursor position is the position of cursor 170 shown in FIG. 1C, rather than position 125 indicated in the figure, the menu 140 may be initially displayed so that icon 142a is temporarily selected as a default. Depending on the embodiment, any of the icons in the graphical menu may be chosen by default, such as in response to options established by a user or based on frequency of use of respective icons, for example.

Figure 1E:
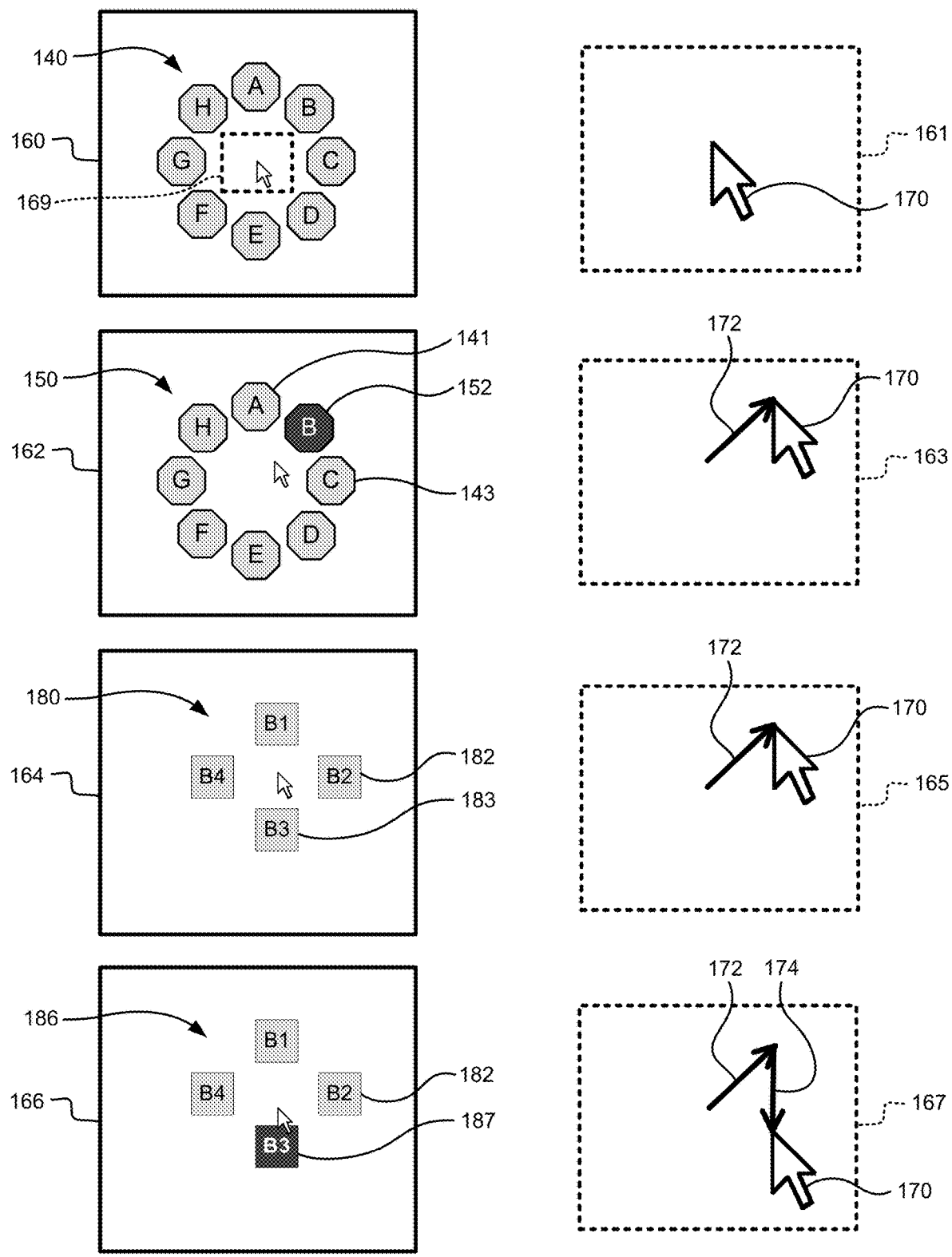
FIG. 1E illustrates how icons within a graphical menu, and icons of a second graphical menu, can be selected in response to exemplary movements of a cursor.

FIG. 1E illustrates how icons within a graphical menu, and display of a second graphical menu, can be selected in response to movements of a cursor. There is no limit to the number of choices that can be presented to the user using the graphical menus discussed herein. For example, the permanent selection of an icon in one graphical menu could initiate display of another graphical menu, as will be discussed in further detail with reference to FIG. 1E. This could be repeated so that selection of an icon in a second graphical menu could open a third graphical menu, and the process may be repeated ad infinitum to present further graphical menus. One of the selections in a graphical menu could be to return to a previous graphical menu.

In FIG. 1E, screen regions 160, 162, 164 and 166 represent the same physical screen region but at different stages in the navigation of a primary graphical menu (stages 160, 162) and a secondary graphical menu (stages 164, 166). Region 161 is a magnification of central region 169 of screen region 160, with its approximate size and location illustrated by a dashed rectangle 169 within region 160. Magnified central regions 163, 165, and 167 of screen regions 162, 164, and 166, respectively, are also shown, with the corresponding magnified regions having the same relationship as region 161 to screen region 160.

In FIG. 1E, screen region 160 shows display of graphical menu 140 including icons labeled A-H that are arranged in an icon region surrounding the initial cursor position of cursor 170, depicted in both the dashed rectangle 169 and the magnified region 161 that represents the content of the same dashed rectangle 169. In one embodiment, display of the graphical menu 140 was initiated by user actions.

In screen region 162, the user has moved the cursor 170 superiorly and to the right along path 172, depicted in magnified region 163. In this embodiment, movement of cursor 170 toward icon 152 has caused icon 152 to be temporarily selected and its appearance has changed so that it can be visually differentiated from unselected icons, such as icons 141 and 143. As illustrated, icon 152 is temporarily selected before the cursor reaches the icon 152. In other embodiments, temporary selection of an icon may not occur until at least a predetermined portion of the cursor covers an icon. Various criteria for determining when icons are temporarily and/or permanently selected are discussed below.

In the example shown in FIG. 1E, permanent selection of icon 152, such as by releasing the right mouse button when icon 152 is temporarily selected, for example, results in display of a new graphical menu 180. Depending on the embodiment, the display of graphical menu 180 shown in screen region 164 could be configured to occur in the following example circumstances: (1) Display of the second graphical menu 180 could occur as soon as the icon 152 (or other icon associated with display of the graphical menu 180) in the first graphical menu 150 is temporarily selected, (2) display of the second graphical menu 180 could occur after the icon 152 is permanently selected, such as by releasing the right mouse button or with one of the other techniques describe herein, or (3) display of the graphical menu 180 could occur after a time delay. This would allow the user to reposition the cursor 170 if an undesired icon is temporarily selected (e.g., rather than immediately replacing graphical menu 150 with graphical menu 180 when the undesired icon is temporarily selected). A selected time delay, such as 100 milliseconds, for example, could be set such that permanent selection of an icon, and display of a second menu in this example, would occur after an icon is temporarily selected for at least 100 milliseconds.

The screen region 164 depicts display of the secondary graphical menu 180 and removal of graphical menu 150, such as in response to one of the above-indicated interactions with icon 152. In this embodiment, the secondary graphical menu 180 is centered around a new initial cursor position, the position of the cursor in screen region 162 at the time that icon 152 was permanently selected. As discussed elsewhere herein, graphical menus can vary in their appearance and graphical menu 180 happens to have 4 square icons. Screen region 165 depicts a magnification of screen region 164, as described above.

Screen regions 166 and 167 illustrate what happens when the user moves the cursor inferiorly from the position illustrated in screen regions 164 and 165 along the path illustrated by arrow 174. Cursor movement inferiorly has caused the temporary selection of an icon 187 within graphical menu 186. Graphical menu 186 is the same as graphical menu 180 except that an icon has been temporarily selected. Specifically, graphical menu 186 has a temporarily selected icon 187 displayed in a way that differentiates it from unselected icons such as 182 and 183.

Implementation on Cell Phones, PDAs, Tablet PCs

Figure 2B:
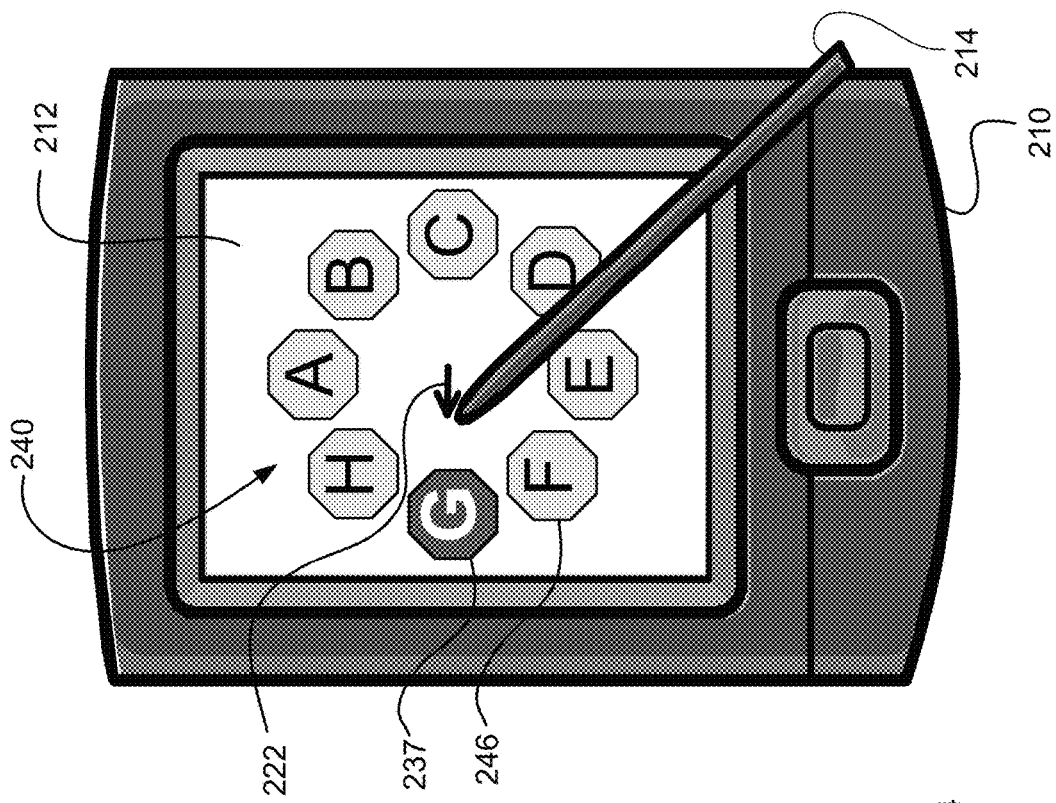
FIG. 2B further illustrates the use of a graphical menu on a handheld device, such as a cellular phone, PDA, or tablet computer.
Figure 2A:
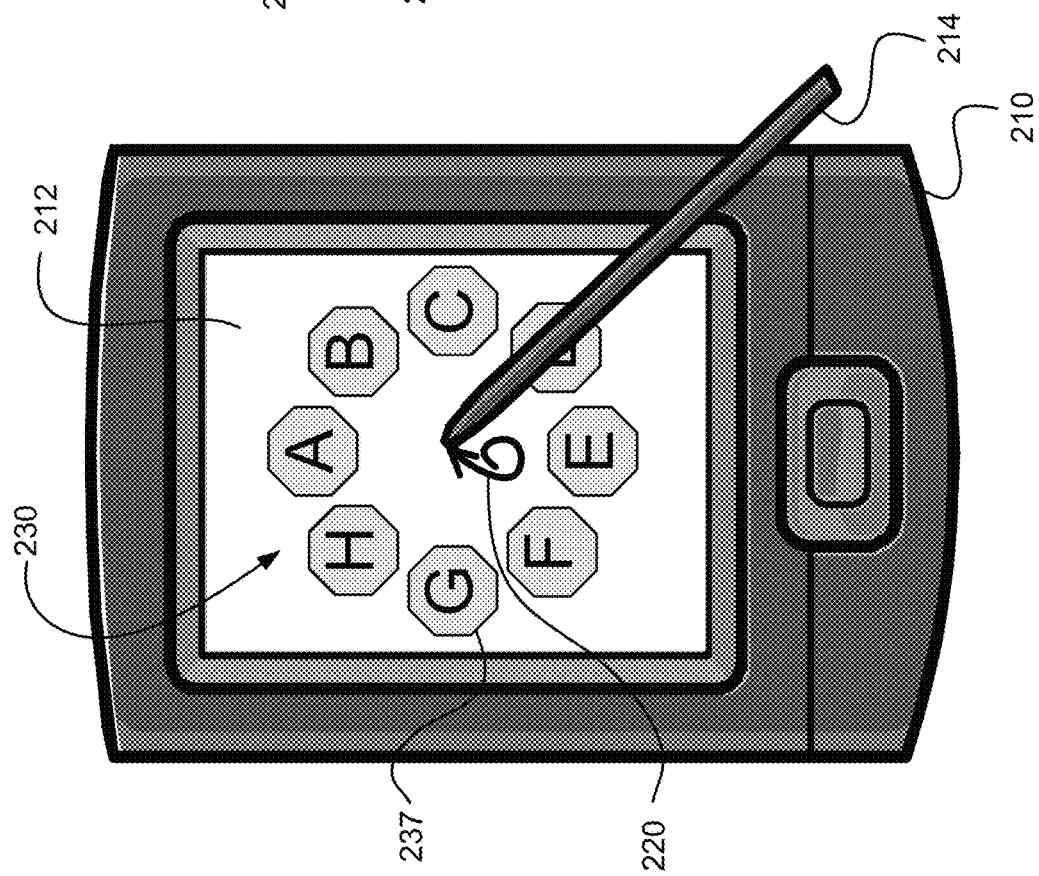
FIG. 2A illustrates an example use of a graphical menu on a handheld device, such as a cellular phone, PDA, or tablet computer.

Some computing systems with displays do not utilize a mouse for navigation and the user interfaces described herein can be implemented with other forms of navigation. For example, FIGS. 2A and 2B illustrate the implementation of an enhanced user interface using a stylus, but other navigation devices could be utilized, such as a finger controlled touch screen or directional navigation buttons, for example. In the description below, the device in FIG. 2A and FIG. 2B will be referred to as a cell phone, but it could be a PDA, tablet PC, or other device with a display screen 212, such as a pressure-sensitive display screen. While the pointing device illustrated is a stylus 214, it could alternatively be the user's finger or other object.

In FIG. 2A, the user initiates an action that causes display of graphical menu 230. In this implementation, display of the graphical menu 230 is initiated by detection of a particular motion path 220 on the input screen 212. In this embodiment, motion path 220 comprises roughly the path that the user would use to draw the number "6" using the stylus 214. The user interface software that executes on the cell phone 210 could be configured to display other graphical display menus for other input tracings. For example, the interface software could be configured to display a different graphical menu in response to the user tracing a path similar to the letter "L" or any other pattern. Display of graphical menus could be initiated in many other ways, as will be described herein.

In this example, graphical menu 230 has eight hexagonal icons and is displayed centered about where the input pattern was completed on the display screen. Thus, in the embodiment of FIG. 2A, the initial cursor position is a terminal position of tracing 220. In other embodiments, the graphical menu 230 may be centered elsewhere, such as a start position of the tracing 220 or some intermediate position of the tracing 220, for example. Icon 237 is one of the eight icons within graphical menu 230.

The user can temporarily select an icon within the graphical menu 230 by moving the stylus 214 toward the desired icon. FIG. 2B shows an example where the user has moved the stylus 214 towards the left along path 222. This movement causes temporary selection of the closest icon, in this case the icon 237, which changes appearance in FIG. 2B in response to being temporarily selected, in order to allow it to be visually differentiated from the other unselected icons in the graphical menu 240, for example unselected icon 246.

Figure 2C:
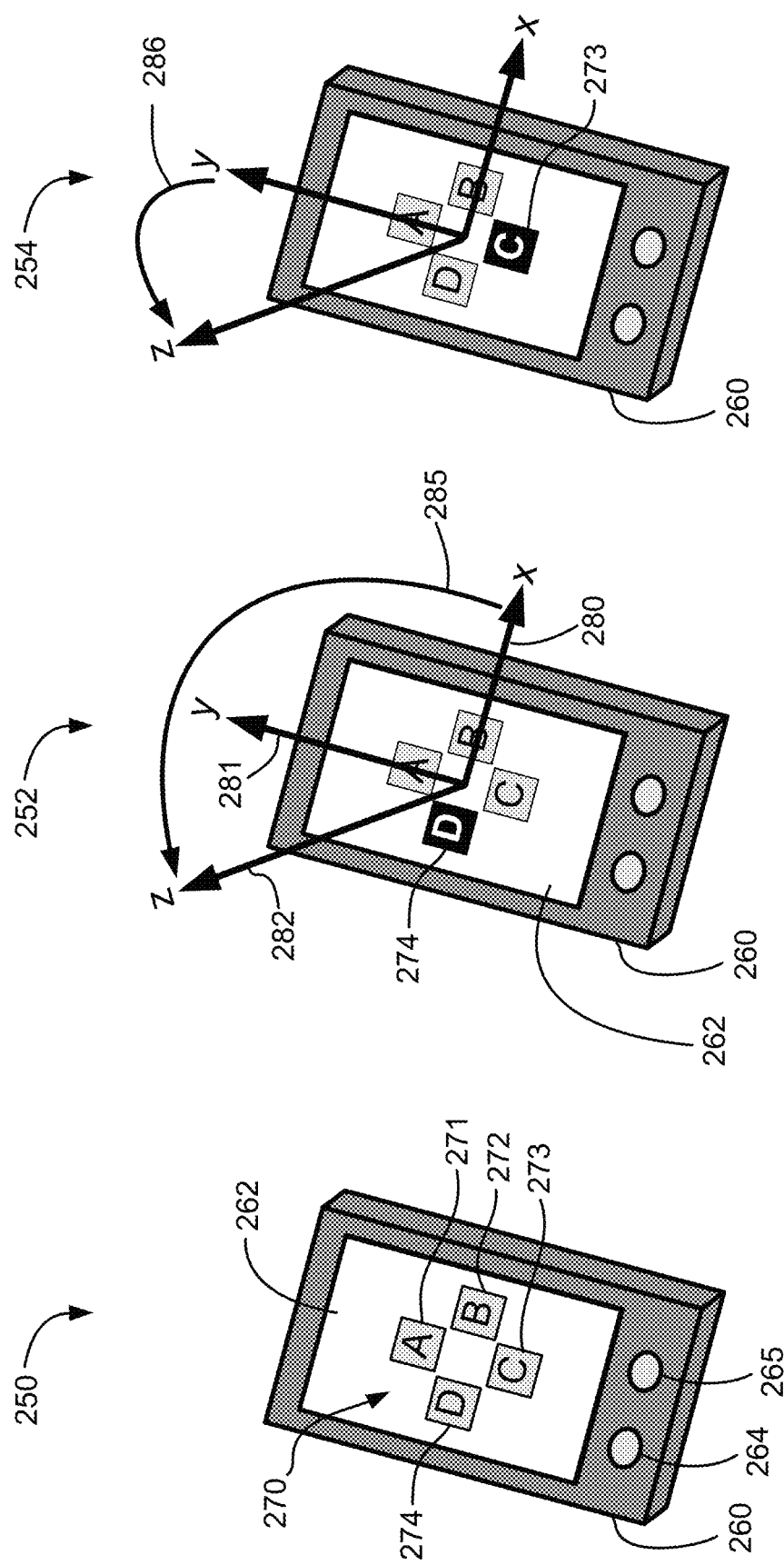
FIG. 2C illustrates an example use of a graphical menu on another handheld device that has the ability to monitor its position or movement.

FIG. 2C illustrates the use of a graphical menu 270 on another handheld device 260 that has the ability to monitor its position (e.g., orientation) or movement. The device 260 is a handheld device such as a cell phone (e.g., iPhone), PDA, tablet PC, portable music or media player, gaming device or other handheld device with a display screen. In another embodiment, device 260 could be an input device, such as a Wii controller or 3D mouse, where the screen is on another device.

In order to use this graphical menu system in the way that will be described in FIG. 2C, device 260 includes technology that allows it to sense its position and/or motion, such as one or more accelerometers. Device 260 has display screen 270 and may have one or more input devices 264 and 265, that could include buttons or other input devices. Device 260 is depicted in view 250 in an arbitrary orientation (e.g., position held by the user). As will be described, its position will be changed by the user in views 252 and 254 in order to indicate selection of icons.

In view 250 of FIG. 2C, graphical menu 270 is displayed on screen 262 and includes icons 271-274. The user initiated some action to cause the graphical menu to be displayed, for example one of the other techniques described herein. Additional ways the user could initiate display of graphical menu 270 include the pressing of a button, for example button 264, voice or other audible commands, touching the screen with two fingers in a predetermined pattern and/or location, or some positioning of device 260, such as shaking it side to side.

In view 252 of FIG. 2C, x, y, and z axes are illustrated to indicate repositioning of the device by the user. The x axis and y axis are in the plane of screen 262 of device 260, along its short and long axis respectively, and the z axis is perpendicular to the screen. Motion path 285 illustrates that the user is physically rotating the device toward his left along the y axis. Device 260 detects movement of the device 260 along motion path 285 and temporarily selects the icon within the graphical menu that is positioned in the detected direction from the point of view of the center of the graphical menu. In this case, because the motion path 285 comprises rotation of the device 260 towards the left, the left icon 274 of the graphical menu 270 is temporarily selected. Once temporarily selected, one or more characteristics of icon 274 are changed (as shown by the dark background of icon 274 in view 252) in order to allow it to be visually differentiated from the remaining unselected icons.

In view 254 of FIG. 2C, x, y, and z axes are again illustrated as in view 252. As illustrated by motion path 286, the user is rotating the device downward (toward him, rotating about the x axis). In response to this movement, the computing device temporarily selects the icon 273 at the bottom of the graphical menu 270. In this case, selected icon 273 is illustrated in a way to differentiate it from the remaining unselected icons. While views 252 and 254 illustrate rotation around specific axes, the user may rotate the device in any arbitrary direction to allow temporary selection of an icon at any position on the screen.

In one embodiment, an icon that is temporarily selected may be permanently selected without further user interaction (e.g., there really is no temporary selection, by maintaining the device 260 in an orientation to temporarily select an icon for a predetermined time period), by pressing a button, such as one of buttons 264, 265, or by any other input that may be provided by the user of the device 260.

In the example depicted in FIG. 2C, detection of "pouring" motions (e.g., motion 252 shows the device being tilted as if the user is pouring into icon 274) can be facilitated by tilt sensor(s) and/or accelerometer(s). In certain embodiments, sufficient number of such detection components can be provided so as to allow motion-based temporary selection and/or permanent selection of icons having both x and y components. For example, suppose than a fifth icon is provided between icons A and B (in first quadrant of the x-y plane). Then, a tilting motion towards such an icon can be detected by sensing a combination of motions about y and x axes (motions opposite to 285 and 286).

There are a number of other motion-based user inputs that can be implemented to achieve similar results. For example, a device can be jerked slightly towards an icon that the user wants to temporarily (or permanently) select. For such motions, one or more accelerometers can be provided and configured to detect two-dimensional motion along a plane such as a plane substantially parallel to the device screen.

Methods for Determining Icon Selection

There are many possible methods for determining if a user has selected an icon within a graphical menu. Several will be described herein, but others are contemplated that would provide the same or similar functionality.

Figure 3:
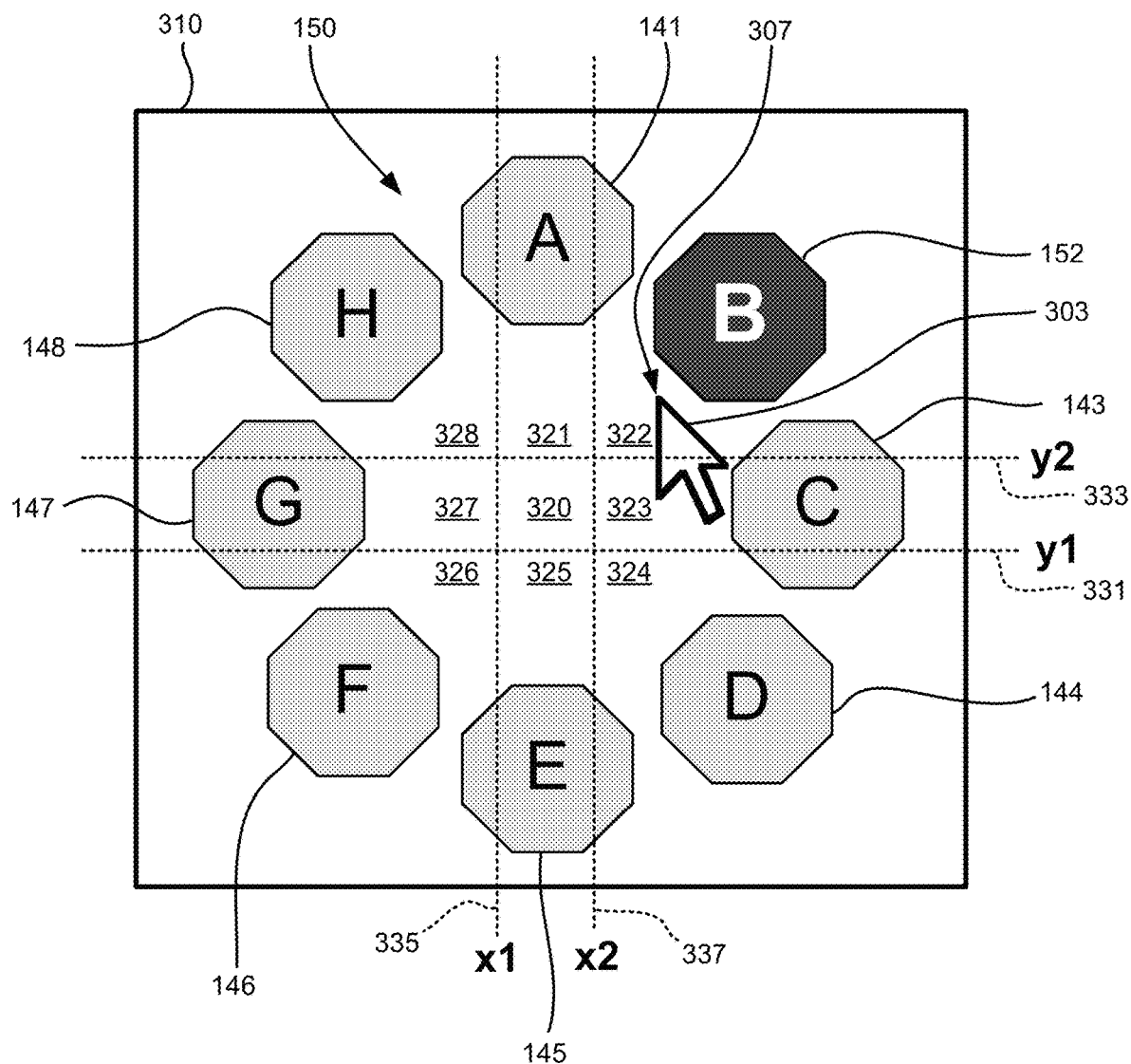
FIG. 3 is a diagram illustrating screen regions of a sample graphical menu, where movement of the cursor between the screen regions in certain manners may be used to determine which icon within the graphical menu has been temporarily and/or permanently selected by the user.

FIG. 3 is a diagram illustrating screen regions 320-328 of a graphical menu 150, where movement of a cursor 303 onto certain screen regions may be used to determine which icon within the graphical menu has been selected (or temporarily selected) by the user. Using such a mapping scheme, an icon within the graphical menu may be selected when the user positions the cursor 303 within a screen region corresponding to an icon.

In this example, graphical menu 150 depicts eight icons, 141, 152, 143, 144, 145, 146, 147, and 148. The screen is divided into multiple regions 320-328, with regions 321-328 corresponding to respective icons and region 320 centered on the initial cursor position, around which the graphical menu is displayed. In this embodiment, each of the regions 321-328 includes at least a portion of its respective icon. In this example, region 320 is centered about the initial cursor position at the time the graphical menu was displayed. In the example shown, region 321 corresponds to icon 141, region 322 to icon 152, region 323 to icon 143, region 324 to icon 144, region 325 to icon 145, region 326 to icon 146, region 327 to icon 147, and region 328 to icon 148.

Determining whether the cursor falls within a region is straightforward in this example as the regions are bounded by horizontal lines 331 and 333 and vertical lines 335 and 337 which may be represented by x and y coordinates in a computer system. For the purposes of illustration, lines 335, 337, 331 and 333 are labeled with "x1", "x2", "y1", and "y2", respectively, in order to indicate their positions in the coordinate system of screen 310 as follows:

Vertical line 335 is at position x1.
Vertical line 337 is at position x2.
Horizontal line 331 is at position y1.
Horizontal line 333 is at position y2.

In this embodiment, if the position of cursor 303 at any given time is represent by coordinates (x,y), determining the region that the cursor is positioned can be accomplished as follows:

If x>x1 and x<x2 and y≥y2 then in region 321.
If x>x1 and x<x2 and y>y1 and y<y2 then in region 320.
If x>x1 and x<x2 and y≤y1 then in region 325.
If x≥x2 and y≥y2 then in region 322.
If x≥x2 and y>y1 and y<y2 then in region 323.
If x≥x2 and y≤y1 then in region 324.
If x≤x1 and y≥y2 then in region 328.
If x≤x1 and y>y1 and y<y2 then in region 327.
If x≤x1 and y≤y1 then in region 326.

Figure 4A:
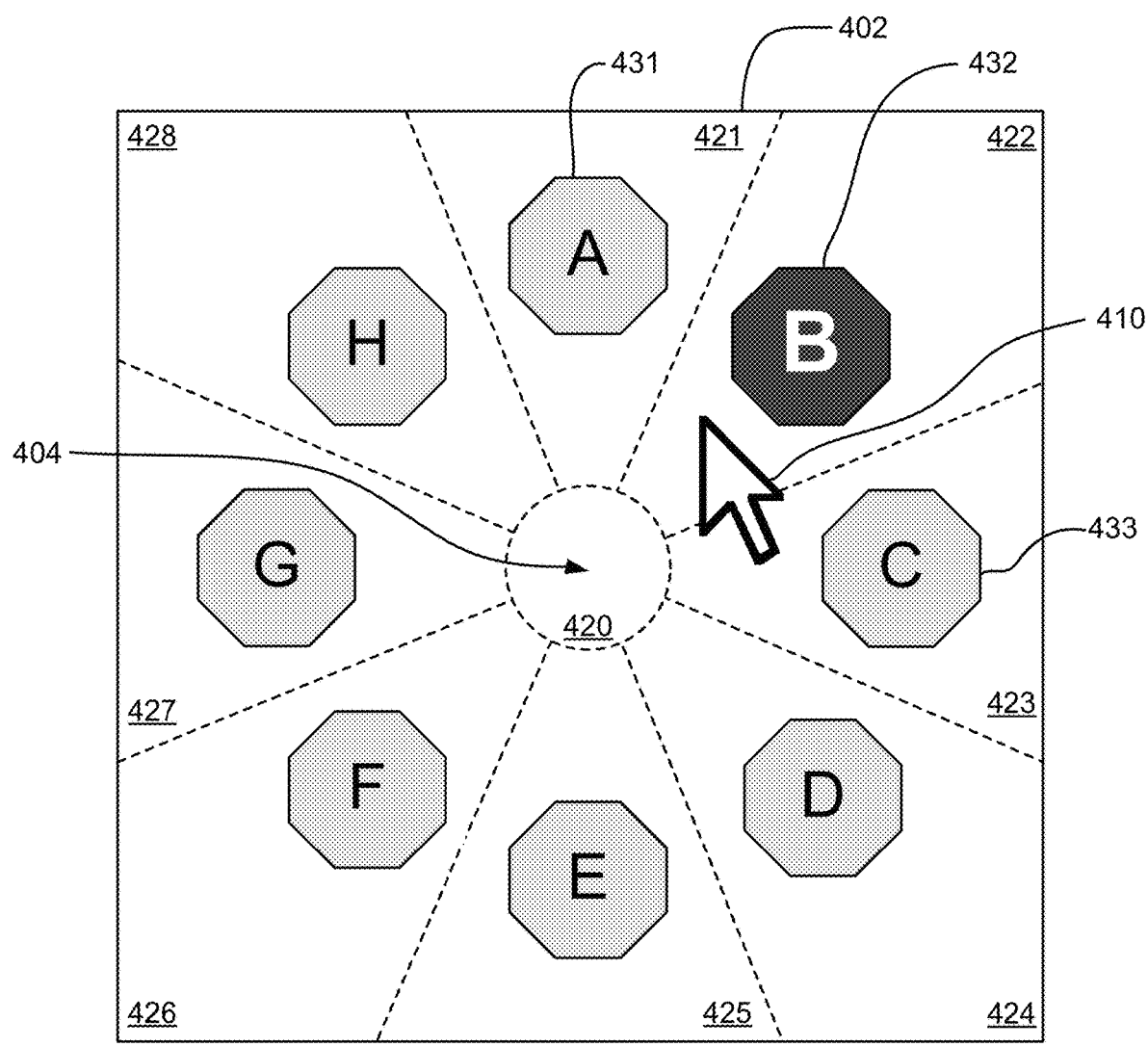
FIG. 4A is a diagram illustrating another embodiment of a graphical menu including screen regions that may be used to determine which icon within the graphical menu has been selected by the user.

FIG. 4A is a diagram illustrating another embodiment of a graphical menu including screen regions that may be used to determine which icon within a graphical menu has been selected by the user. In this embodiment, screen 402 includes a graphical menu having 8 hexagonal icons. Position 404 indicates the initial cursor position when the graphical menu was rendered at its current position on the screen.

In this example, the screen 402 is divided into radial regions 421-428 and a central home region 420 centered in the graphical menu. In this embodiment, radial regions 421-428 each correspond to a respective icon in the graphical menu. For example, region 421 corresponds to icon 431, region 422 corresponds to icon 432, and region 423 corresponds to icon 433.

When cursor 410 is positioned within home region 420, no icon is selected. When the user moves the cursor out of home region 420 and into another region, the icon within that region is temporarily selected. In this case, cursor 410 has been moved by the user into region 422. This has caused temporary selection of the corresponding icon 432 which is displayed in such a way as to differentiate it from the unselected icons within the graphical menu. In this example the temporarily selected icon is displayed as darker and the letter inside it displayed with a different font and color, but there are many other ways that a temporarily selected icon could be visually distinguished from unselected icons.

Figure 4B:
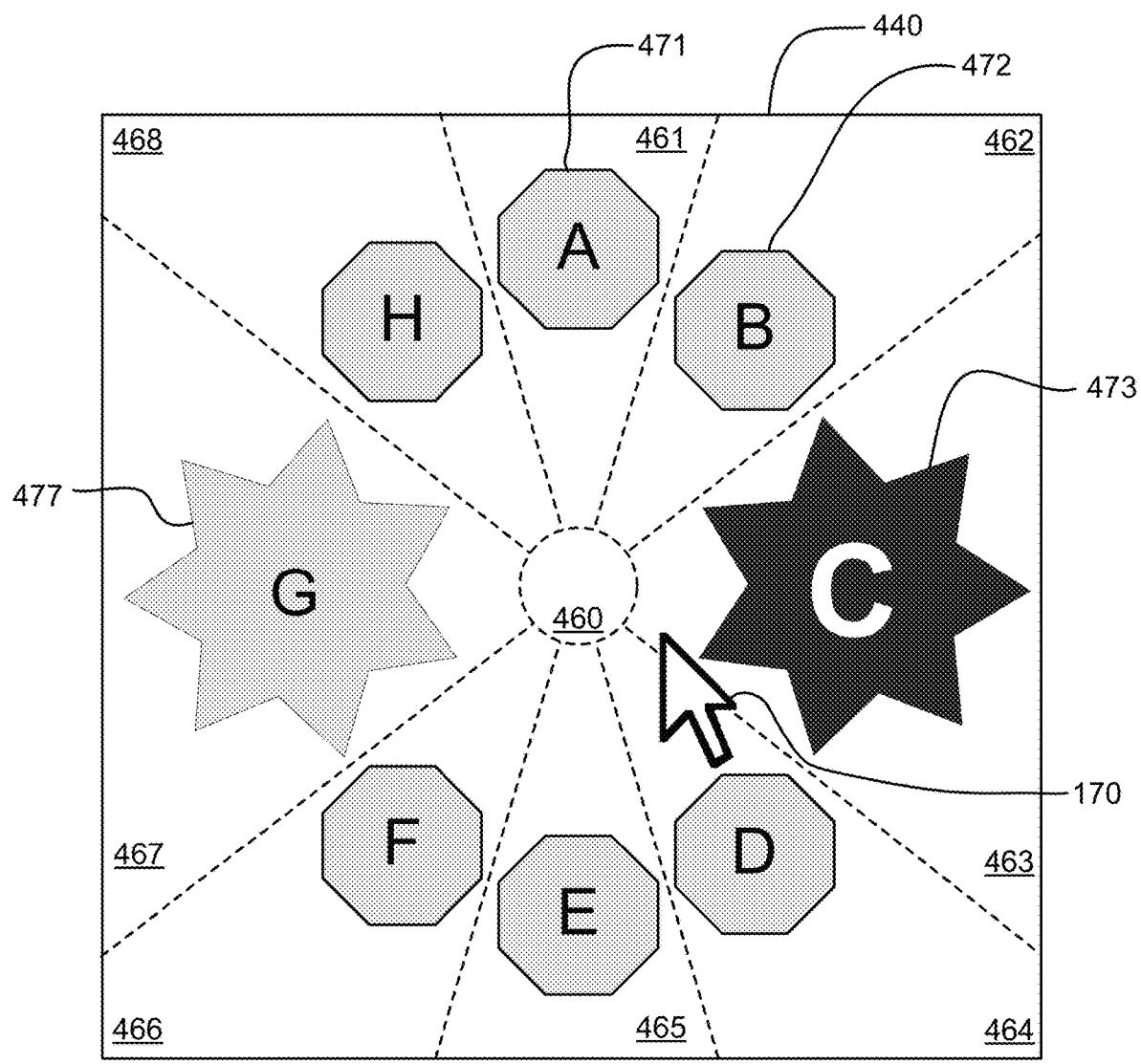
FIG. 4B is a diagram illustrating another embodiment of a graphical menu including screen regions that may be used to determine which icon within the graphical menu has been selected by the user.

FIG. 4B is a diagram illustrating another embodiment of a user interface including screen regions 461-468 that may be used to determine which icon within a graphical menu has been selected by the user, where the user interface includes asymmetric icons and asymmetric screen regions used for detection of icon selection. In the embodiment of FIG. 4B, the graphical menu comprises eight icons within screen region 440. This example demonstrates that unselected icons within a graphical menu may differ in appearance, including features such as size and shape. In addition, the size and/or shape of the screen regions associated with each icon in a graphical menu may differ.

The screen regions associated with each icon can differ in size and shape. This may be advantageous in cases where some icons are more commonly chosen than other. More commonly selected icons might be assigned larger associated screen regions to make it easier for the user to select those areas and therefore the respective icon. While the relative size of the various screen regions could vary independently of the size of the icons in the function menu, in this example icons 473 and 477 are larger than the other icons in the graphical menu, and their associated screen regions 463 and 467 are also larger than the other screen regions.

As in a previous example, home region 460 is centered where the cursor was positioned at the time the graphical menu was displayed. When cursor 170 is positioned within the home region, no icon is selected. In other embodiments, however, a default icon may be temporarily selected even when the cursor 170 is initially positioned within the home region 460.

The remainder of screen region 440 is divided into eight regions, one each corresponding to the icons within the graphical menu, with screen regions 461-468 depicted using underlined text in the figure. For example, region 461 is associated with unselected icon 471, region 462 with unselected icon 472, region 463 with selected icon 473, and region 467 with unselected icon 477.

In this example, the user has positioned cursor 170 in region 463, causing temporary selection of icon 473. In this example, icon 473 had an appearance similar to 477 when it was unselected, but upon temporary selection of the icon 473, the icon 473 changed its appearance to allow it to be differentiated from the unselected ions. Temporarily selected icon 473 is darker than the unselected icons and the letter within it has a different font, larger, bold, and white instead of black color.

Figure 5A:
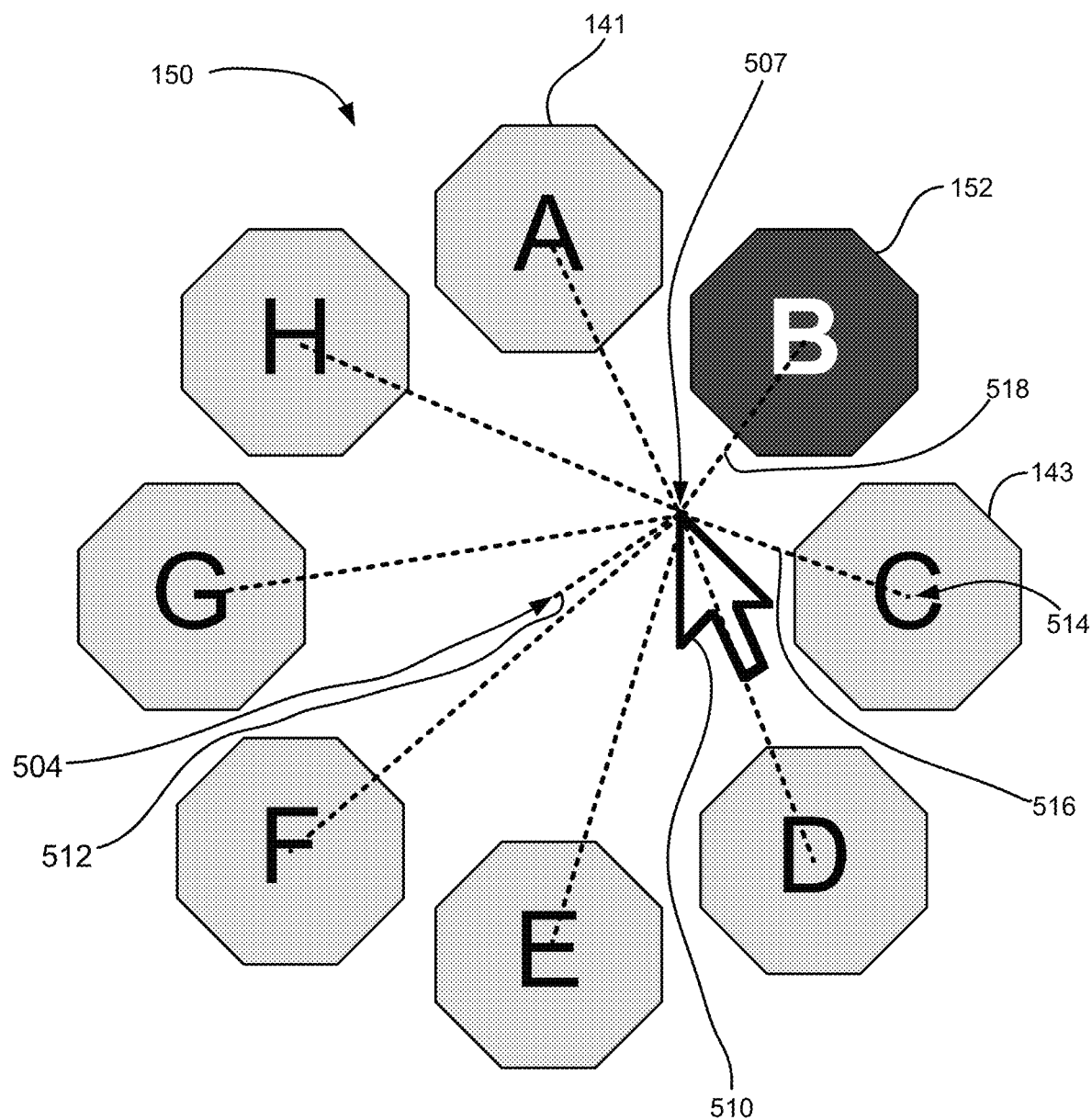
FIG. 5A is a diagram illustrating another embodiment of a graphical menu.
Figure 6A:
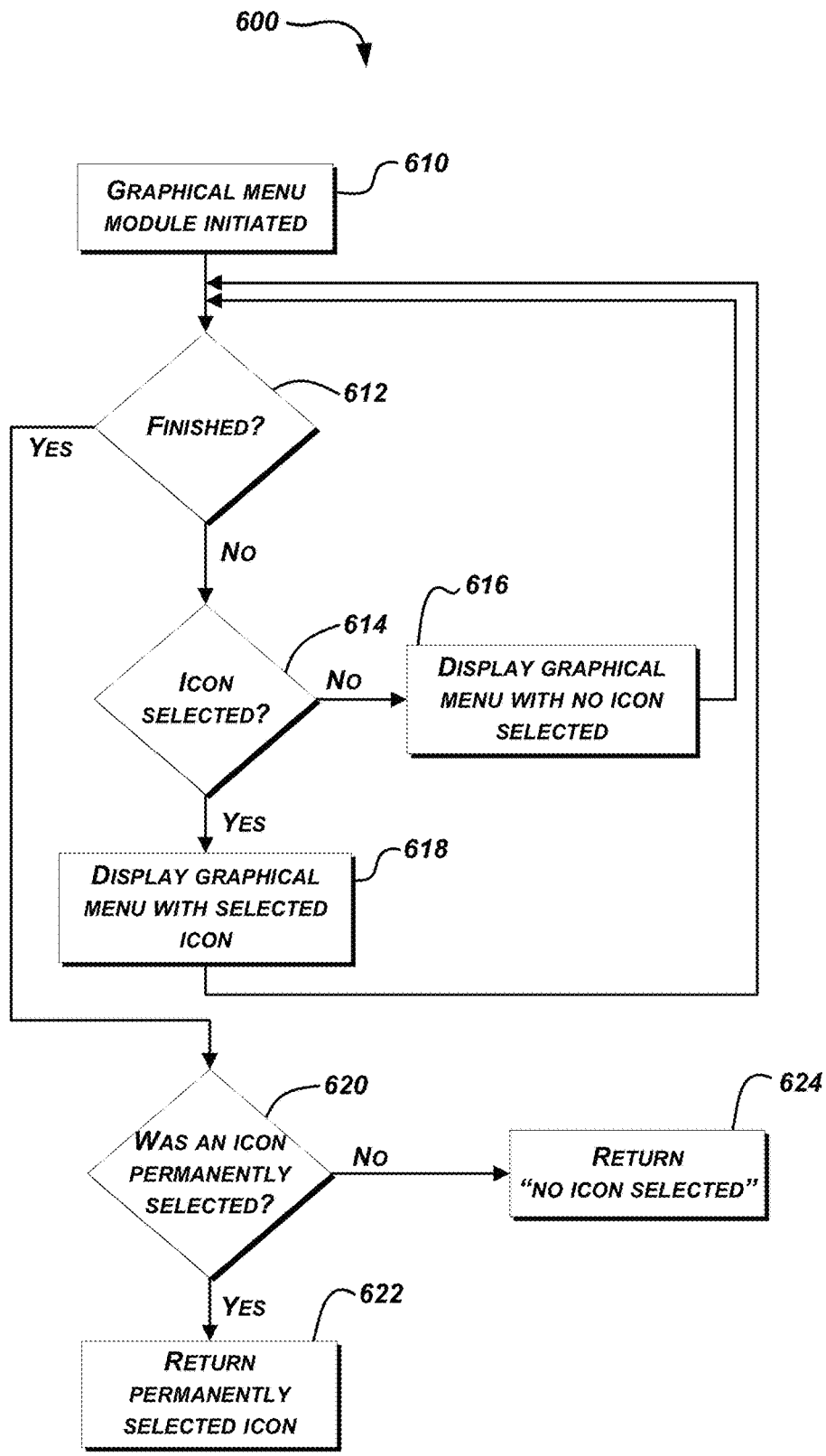
FIG. 6A is a flowchart illustrating one embodiment of a method for operating a graphical menu.
Figure 6B:
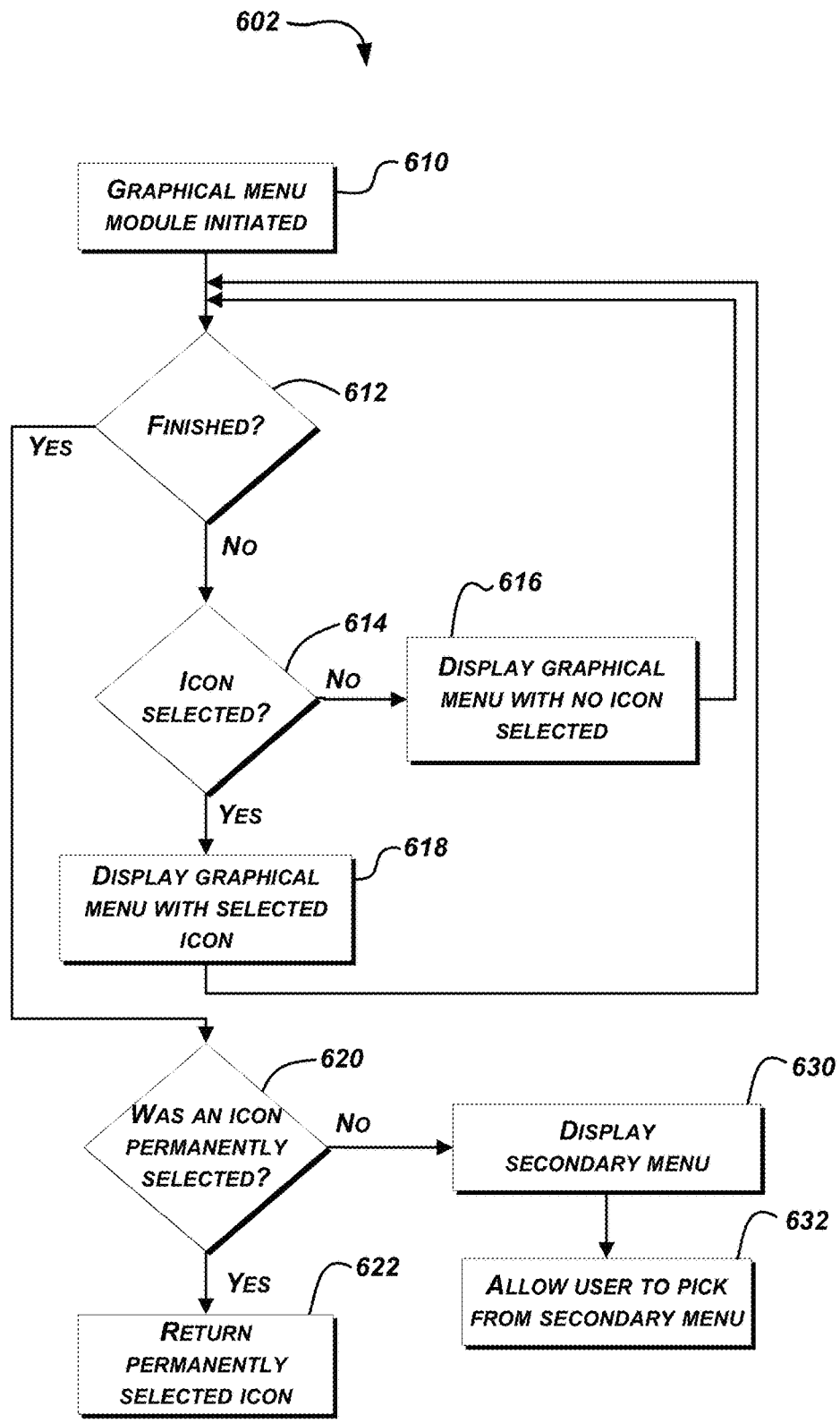
FIG. 6B is a flowchart illustrating another embodiment of a method for operating a graphical menu.

FIG. 5A is a diagram illustrating another embodiment of a graphical menu. In this embodiment, instead of dividing the screen into regions, this technique uses distance between the cursor and icons to determine whether and which icon is selected.

For the purposes of describing this technique, the initial cursor position 504 is the screen position at which the graphical menu was initially displayed.

In the technique depicted in FIG. 5A, each icon is associated with a single position (icon location point). In the example shown, graphical menu 150 has eight hexagonal icons, including icons 141, 152, and 143. In this example, each icon's location point is at the icon center. However, an icon's location point could be assigned to any position within the icon or even outside of the icon. In the example shown, the icon location point for icon 143 is at position 514.

The location of user controlled cursor 510 is screen position 507 in the figure. In the figure, the distance between each icon's location point and the cursor position 507 is depicted by a dashed line. For example, dashed line 516, which would be invisible to the user of the graphical menu, represents the distance between cursor position 507 and icon location point 514 of icon 143.

Determining whether an icon has been selected and if so, which one, can be accomplished by using the distances between the cursor position and icon location points. Determining whether any icon has been selected can be determined in a number of ways. Two non-limiting examples are described below.

With one technique, the distance between the cursor position 507 and initial cursor position 504 is determined, depicted in the figure as dashed line 512. This distance is compared to a threshold distance, wherein when the distance is above the threshold distance (e.g., the cursor is close enough to an icon), an icon is temporarily selected. Thus, once it is determined that the cursor is positioned such that an icon should be temporarily selected, the computing system determines which of the icons is the selected icon. In one embodiment, a particular icon is identified for temporary selection by assessing the distances between the cursor location 507 and icon location points, and then selecting the icon with the smallest cursor to icon location point distance. It is possible that two or more icons might have equal cursor to icon location point distances. This situation may be resolved in several ways, such as (1) no icon would be selected until the user repositions the cursor so that the choice is unique, (2) icons could be assigned priorities so that the highest priority icon is chosen in the case of distance ties, or (3) an icon is randomly chosen from among this group, for example.

In the example shown, distance 518 is the smallest cursor position to icon location distance, causing icon 152 to be temporarily selected. Note that appearance of selected icon 152 differs from the other unselected icons in graphical menu 150.

In another embodiment, rather that performing the step of first determining whether an icon is selected, such as based on a distance between the cursor and an initial cursor position, and then determine which specific icon has been selected, the computing device may repeatedly recalculate distances between the cursor position 507 and one or more icon locations until one of the distances falls below a threshold.

Figure 5B:
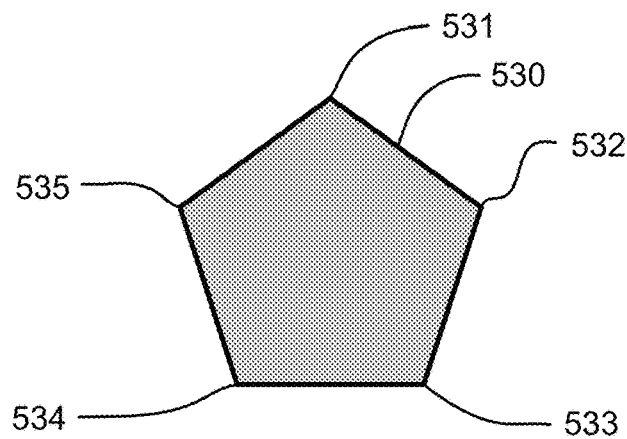
FIG. 5B illustrates an icon with multiple icon location points.
Figure 5C:
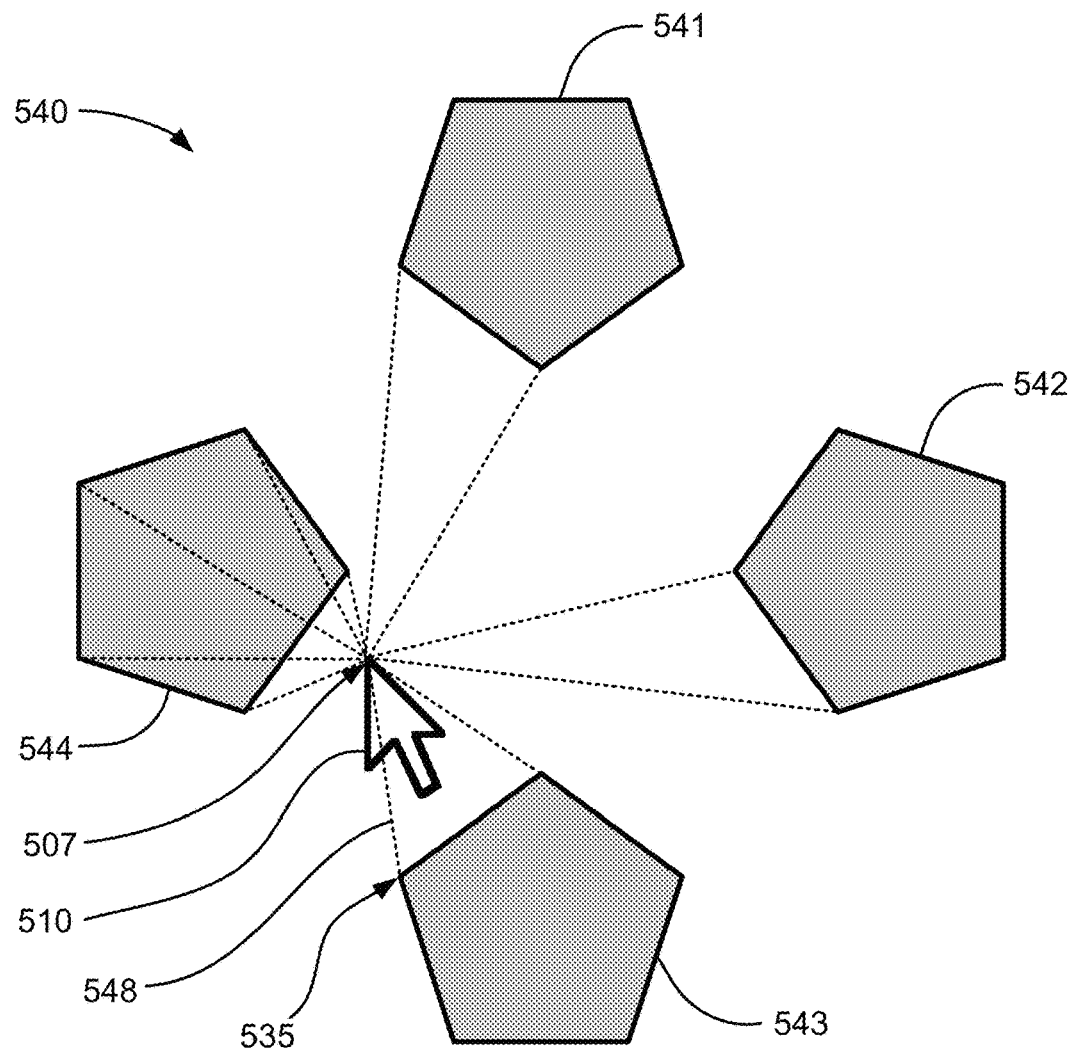
FIG. 5C illustrates a graphical menu including icons with multiple icon location points.

FIG. 5B and FIG. 5C illustrate another technique in which distance is used to determine whether an icon is temporarily or permanently selected and, if so, which one. The technique illustrated in FIG. 5A utilizes a single icon location point of each icon. However, multiple icon location points can be utilized for icons.

FIG. 5B illustrates icon 530 with multiple icon location points 531-535 positioned at its vertices. However, icon location points can be assigned at any positions within an icon, along its edge or outside of it.

FIG. 5C illustrates a graphical menu 540 having four icons, 541-544. As in FIG. 5B, each of these icons has 5 icon location points, one at each of its vertices. The position 507 of cursor 510 is illustrated in the figure. Dashed line 548 depicts the distance between cursor position 507 and one of the icon location positions, 535 of icon 543. The figure illustrates dashed lines between cursor position 507 and several of the other icon location points of the icons in the graphical menu. In practice, the distance from the cursor location to every icon location point may be determined.

The process of determining whether and which icon would be selected with multiple icon locations per icon may be similar to that used with a single icon location per icon. In the case of multiple icons locations per icon, the cursor to icon location distance for each icon is the minimum distance of its icon location points to the cursor location.

Flowcharts

FIG. 6A is a flowchart 600 illustrating one embodiment of a method that could be used for display and interaction of a user with a graphical menu. As discussed above with FIG. 1E, graphical menus can be cascaded, as discussed in reference to the flowchart in FIG. 6B. There is no limit to the number of levels that could be implemented in such a cascade or tree of graphical menus. The method of FIG. 6A may be performed on any suitable computing device, such as one of the computing devices discussed above with reference to FIG. 1A. Depending on the embodiment, the method of FIGS. 6A and 6B may include fewer or additional blocks and the blocks may be performed in a different order than is illustrated.

In flowchart 600, a graphical menu module that is configured to display graphical menus is first initiated in block 610. The graphical menu module may include software code that is executed by a computing device, such as a mobile or desktop computing device. The graphical menu module is configured to cause the computing device to display the graphical menu and detect interactions of the user (e.g., a cursor controlled by the user or a stylus or finger touching the display screen). In one embodiment, the graphical menu module comprises a standalone software application that interfaces with other software applications on a computing device. Alternatively, the graphical menu module may be incorporated into another software application, such as a word processor, graphic application, image viewing application, or any other software application. Alternatively, the graphical menu module could be part of the operating system. Depending on the embodiment, the initiation of the graphical menu module might occur as a result of a user's action, for example depression of the right mouse button, or could occur automatically as a result a program or the operating system initiating the system to obtain user input. In response to initiation of the graphical menu module, a graphical menu is provided via a display device, such as a monitor or screen of a mobile computing device.

In block 612, the graphical menu module determines whether the user has finished using the displayed graphical menu. For example, by releasing the right mouse button (possibly indicating a desire to permanently select a temporarily selected icon and initiate execution of a process associated with the icon), the user may indicate that he has finished with the current instance of the graphical menu system. Alternatively, a user may indicate that he is finished with a graphical menu by moving a cursor off of the graphical menu, such as outside an area of the screen where the graphical menu is displayed. In one embodiment, certain graphical menus may "time out," so that if no user input is received for a predetermined time period, the user is considered to be finished with the graphical menu and the method continues to block 620.

If the user is not finished using the displayed graphical menu, in block 614 the system determines whether an icon is temporarily selected using, for example, one of the techniques described herein.

If no icon has been temporarily selected, in block 616 the graphical menu is displayed with no icon selected (e.g., shaded or otherwise distinguished from other icons) in block 616. The method then loops back to block 612 and again senses whether the user is finished with the graphical menu.

If an icon has been temporarily selected, in block 618 the graphical menu is displayed with the selected icon displayed in a way that differentiates it from the unselected icons, as described herein. The method then loops back to block 612 and again senses whether the user is finished with the graphical menu.

If the graphical menu module determines that that the user is finished in block 612, the method branches to block 620 and determines whether an icon was permanently selected. If an icon is determined to have been permanently selected, the method branches to block 622 where the graphical menu module returns the identity of the permanently selected icon to the program or operating system that the graphical menu module is configured to interact with. In another embodiment, permanent selection of an icon initiates display of a secondary menu comprising a plurality of icons about the current cursor position. Thus, blocks 612-624 may be repeated with respect to the secondary menu in order to determine if an icon of the second memory is selected. The process may be repeated any number of times in relation to any number of different menus that may be navigated to via other graphical menus.

At block 620 if no icon has been permanently selected, the method branches to block 624 where the graphical menu module returns an indication that no icon of the graphical menu was permanently selected to the program or operating system that the graphical menu module is configured to interact with.

FIG. 6B is a flowchart 602 with logic similar to FIG. 6A, except for blocks 630 and 632. In the case that no icon was selected, a secondary menu is displayed in block 630. The user can pick from this secondary menu in block 632. This secondary menu could be a graphical menu, as described herein, or could be a conventional menu, as illustrated in FIG. 7C.

Figure 7B:
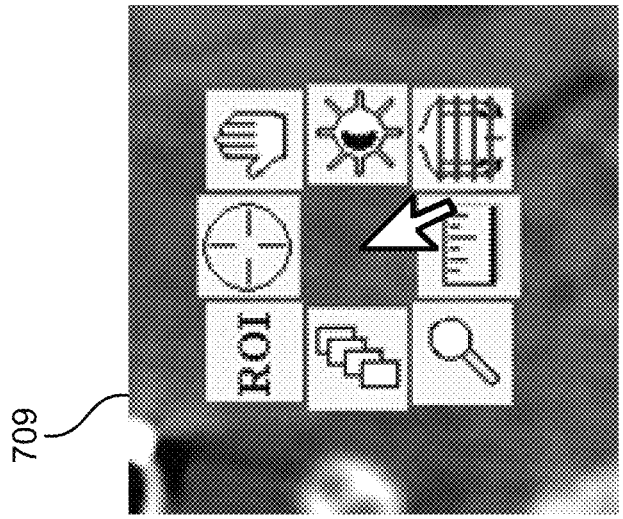
FIG. 7B illustrates an exemplary graphical menu superimposed on a complex screen output of a program that called the graphical menu.
Figure 7A:
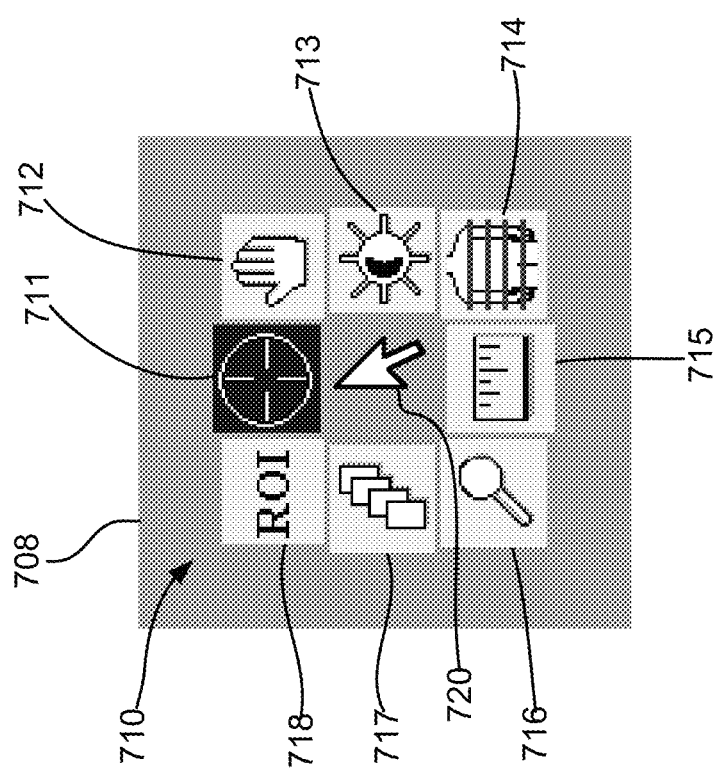
FIG. 7A illustrates an exemplary graphical menu superimposed on a homogenous screen.

FIG. 7A illustrates a graphical menu superimposed on a homogenous screen. In this embodiment, the graphical menu 710 comprises eight square icons, 711-718. Cursor 720 is positioned near icon 711 causing icon 711 to be selected, using one of the techniques described herein. The selected icon 711 appears color inverted with respect to the other unselected icons in the graphical menu, allowing the user to easily differentiate the selected icon from unselected icons.

FIG. 7B illustrates a graphical menu superimposed on a complex screen output of a program that called the graphical menu. In particular, the graphical menu is superimposed on the contents of the screen 709, in this case a gray scale image. In addition, the cursor is superimposed on top of both the graphical menu and the underlying image on the screen. In this example, the cursor position is near the initial cursor position and no icon within the graphical menu is selected. In one embodiment, the graphical menu may have some transparency, as illustrated in this figure. In one embodiment, a level of transparency can be selected by the user.

Figure 7C:
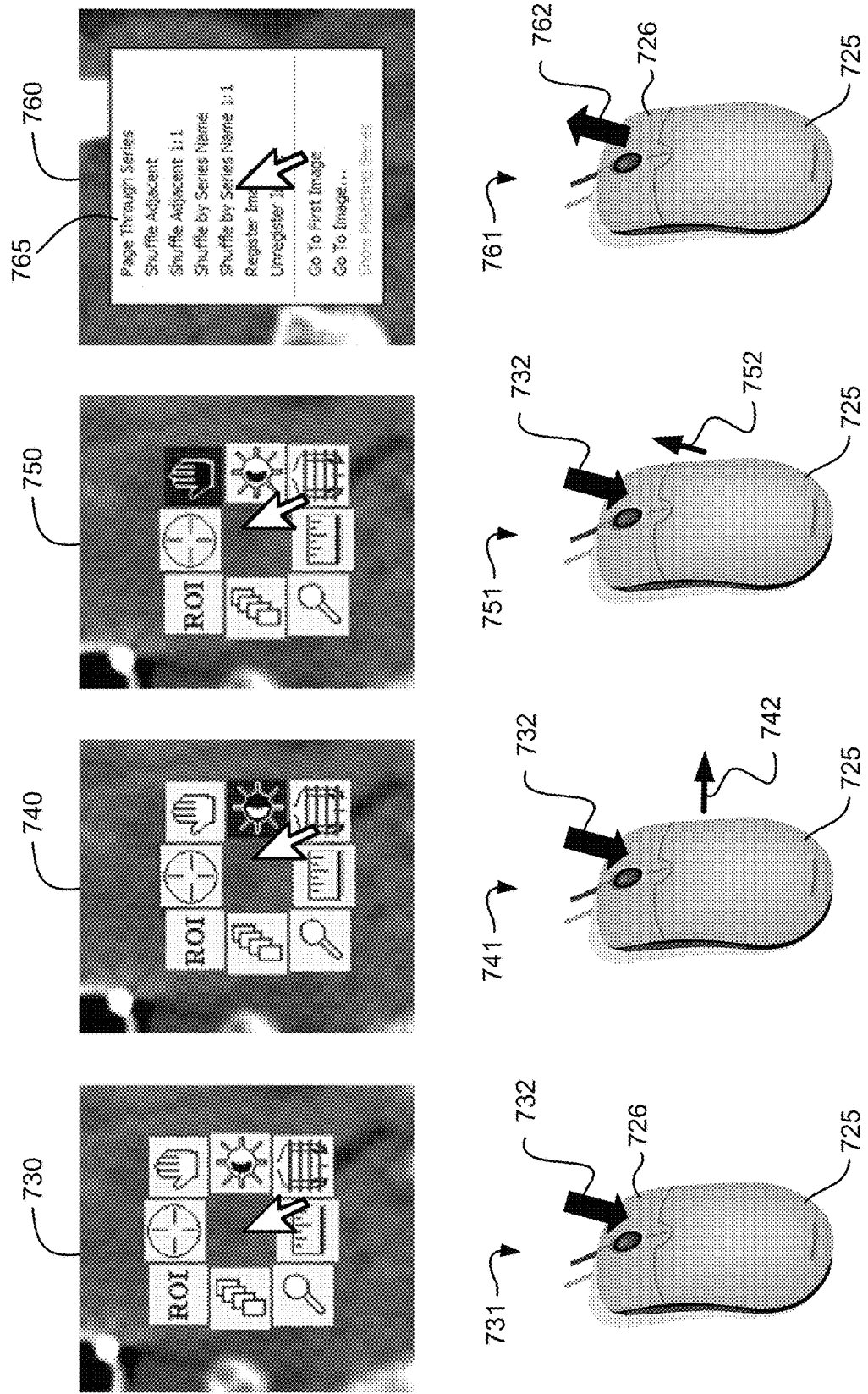
FIG. 7C illustrates sample user interactions with the graphical menu illustrated in FIG. 7B.

FIG. 7C illustrates user interactions with the graphical menu illustrated in FIG. 7A or FIG. 7B. A screen region 730 on which the graphical menu is superimposed is similar to screen regions 708 and 709 in FIG. 7A and FIG. 7B, respectively. For clarity, the various components of screen region 730 are not annotated as they are analogous to those illustrated in FIG. 7A and FIG. 7B. Screen region 730 illustrates a graphical menu having eight unselected icons superimposed on a screen region that in this case is a grayscale image. The cursor is displayed as well, as previously. In this case the cursor is positioned in a region within the graphical menu and no icon within the graphical menu has yet been temporarily selected.

View 731, which is associated with screen region 730, illustrates mouse activity that could have been used to initiate display of the graphical menu within screen region 730. Exemplary mouse 725 includes one or more buttons. In this example, depression of the right mouse button 726 causes display of the graphical menu. Depression of button 726 is illustrated by arrow 732.

View 741 is similar to view 731. While continuing to depress the right mouse button, illustrated by arrow 732, the user moves the mouse to the right, illustrated by motion path 742. This causes rightward motion of the cursor, repositioning it from its position in screen view 730 to that in screen view 740. This causes selection of an icon, as described previously. In comparing the graphical menu in screen view 740 to that in screen view 730, it can be seen that an icon has changed its appearance, indicating to the user that it has been temporarily selected.

View 751 is similar to view 741 but illustrates further mouse movement. In view 751, the user moves mouse 725 superiorly, illustrated by mouse path 752. As in the example illustrated in 740 and 741, this results in repositioning of the cursor and selection of a different icon within the graphical menu.

View 761 illustrates the case where there is little or no cursor repositioning compared to the original position of the cursor in view 730. In this case, net movement of the mouse is insufficient for an icon to be selected within the graphical menu, as discussed previously. In this example, release of mouse button 726, illustrated by arrow 762, results in the display of a different menu from which the user can choose. Thus, the user may be presented with a first graphical menu in response to a first action (e.g., depressing the mouse button) and may be presented with a second menu in response to a second action that follows the first action (e.g., releasing the mouse button without temporarily selecting an icon).

Force Dependent User Interfaces

As described above, for example with respect to FIGS. 7A-7C, icons can be presented in one or more interactive user interfaces, and actions of a user can cause actions associated with the icons to be performed. For instance, the user can manipulate a mouse, a stylus, one or more of the user's fingers, and so on, to cause presentation of a graphical menu, select one or more icons (e.g., temporarily select, permanently select, as described above), and so on.

Optionally, and as will be described, a system (e.g., a desktop device, a kiosk, and so on), mobile device (e.g., laptop, tablet, smart phone, wearable device), and so on, herein referred to as mobile devices or computing devices, can determine a measure associated with a force or pressure being applied to a touch screen presenting one or more user interfaces. For instance, a mobile device can receive a touch on a touch screen device (e.g., a finger of a user pressing on the touch screen device, a stylus or other object pressing on the touch screen device), and can determine a measure associated with a force being applied to the touch screen device. As an example, the mobile device can determine a depression of the touch screen device (e.g., due to the applied force), and can utilize the depression to determine a force being applied to the touch screen. Since the force is being applied to a portion of the touch screen (e.g., uniformly, non-uniformly) due to, for instance, a finger depressing the touch screen, this specification refers to the applied force also as a pressure being applied to the touch screen. Optionally, the mobile device can measure an applied pressure (e.g., a force per unit area), an applied force (e.g., a measure associated with a peak applied force, an average applied force), and so on. Optionally, in contrast to a touch screen device that is presenting one or more user interfaces, the techniques described herein can be utilized with a combination of a display (e.g., a display device presenting the user interfaces) being separate from an input device that can measure or otherwise discriminate between different values of pressure or force (e.g., touchpads, computer mice that detect pressure, tablets that detect pressure, input styluses used on a screen or tablet that detect pressure, and so on). For instance, a user can interact with the input device (e.g., press on the input device, and move the user's fingers around on the input device) and the display can update accordingly (e.g., in response to pressure or force and movement of fingers), as will be described.

The mobile device can discriminate between different measured values of pressure being applied to a touch screen, and the different values can be utilized by the mobile device to present, update, and so on, one or more user interfaces displayed via the touch screen. That is, user input can be based on a pressure with which the user applies to the touch screen, and optionally in combination with other user input (e.g., mouse, keyboard, stylus, and so on, can also be utilized at a same time or a different time as pressure based input). Additionally, as described above, user input can be based on a location on a user interface, or touch screen presenting the user interface, that is interacted with (e.g., screen coordinates, such as X, Y, coordinates, and so on).

Optionally, the mobile device may have a minimum and maximum value of an applied force or pressure, within which the mobile device can measure. The applied force and/or pressure may be categorized into one of multiple ranges, such as a light touch, heavy touch, and so on that may be measured within the determined minimum and maximum applied force and/or pressure. For instance, the mobile device may interpret an applied pressure greater than a first threshold value (e.g., a threshold value above the minimum or above zero) and less than a second threshold value, as being a light touch, while an applied pressure greater than the second threshold (e.g., an average pressure measured over a threshold period of time, such as 100 ms, 300 ms, and so on, greater than the second threshold) can be interpreted as a heavy touch. Similarly, the mobile device may store information indicating an average (e.g., measure of central tendency) value of a force and/or pressure, on a touch screen, and a value of a maximum force and/or pressure that the mobile device can measure, and can assign respective touches into respective ranges. For example, a light touch range may extend from the average value, or a threshold above the average value, to a first threshold, and a heavy touch range may extend from the first threshold to a second threshold (e.g., the maximum value, or a threshold value below the maximum value). Additionally, more than two ranges may be utilized, and a light, medium, heavy touch, can be interpreted by the mobile device, and optionally 4 or more labels can be utilized (e.g., 4 or more ranges). Optionally, the minimum and/or maximum values can be customizable, and the different ranges can be updated or modified by a user or automatically by the system, such as in response to the applied pressure received from a particular user. For example, the different ranges can be learned by the mobile device over a period of time, for instance the mobile device can receive different forces, pressures, applied to the touch screen, and the software can automatically adjust the ranges to allow the user to more easily provide inputs within different ranges. In some embodiments, the user can indicate his/her preferred values of force, pressure, for each range.

As will be described in FIGS. 8A-17, the mobile device can display one or more user interfaces, for instance user interfaces presenting medical images, and the user interfaces can present a graphical menu including icons for selection. The graphical menu can be presented upon a touch (e.g., a light touch, a medium touch, a heavy touch), and the user can select a particular icon that is representative of a function to be performed, for instance with respect to presented medical images. The user interfaces, medical images, and so on, can be received from an outside system (e.g., a server in communication with the mobile device) and the mobile device can present the received user interfaces, medical images, and so on. Optionally, the mobile device can detect force, pressure, applied to a touch screen, and can provide information describing the force, pressure, (e.g., a value of the force, pressure, or a label of the force, pressure, such as hard touch, light touch, to be processed by the server to update the user interfaces and so on).

Figure 8A:
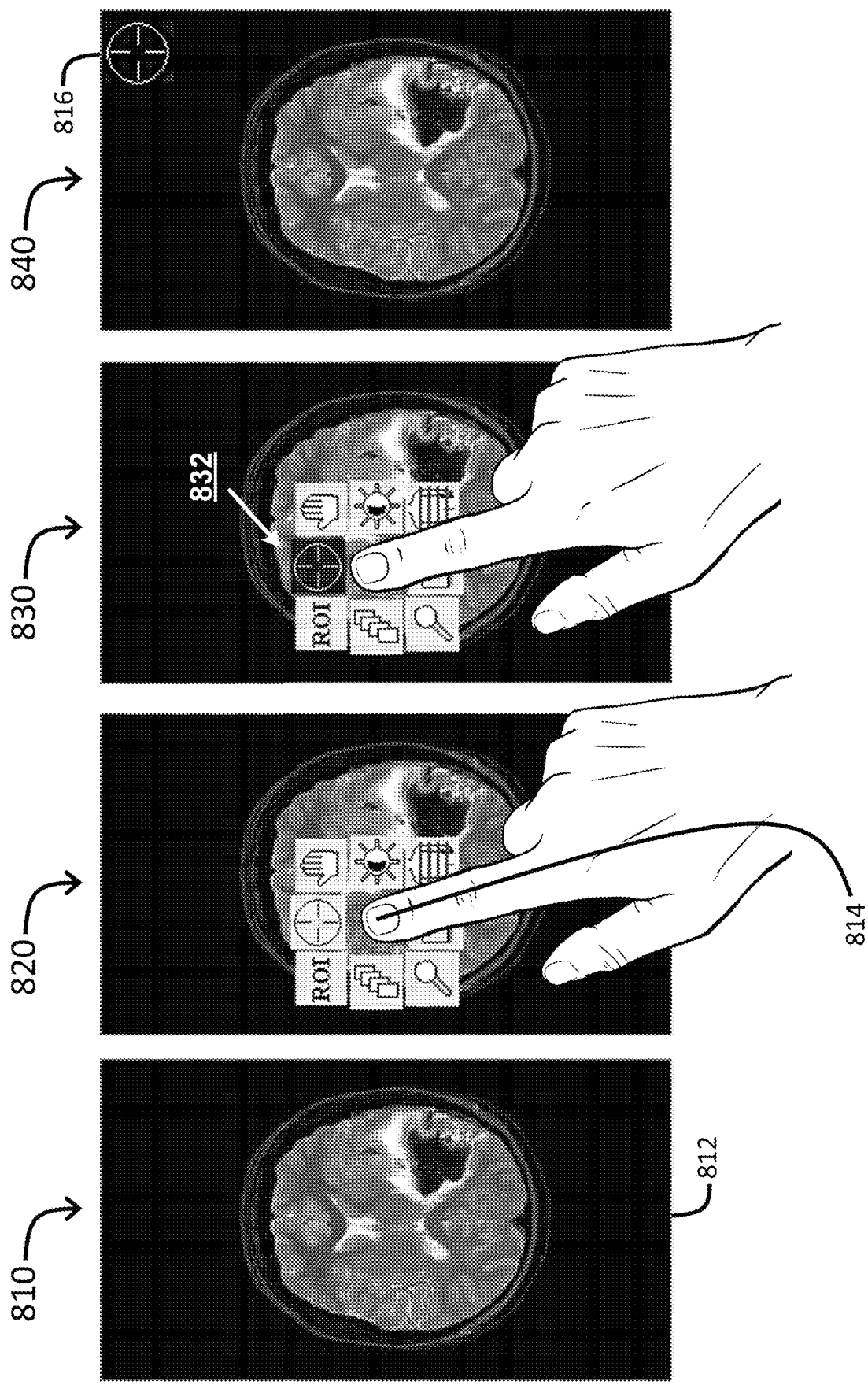
FIG. 8A illustrates permanently selecting an icon included in a graphical menu presented on a mobile device.

FIG. 8A illustrates permanently selecting an icon included in a graphical menu presented on a mobile device. As illustrated in view 810, a touchscreen 812 is presenting an example image (e.g., a medical image, such as a brain scan) to a user (e.g., for review). The user can interact with the touch screen using, for instance, one or more of the user's fingers 814, and upon interaction with the touch screen, the graphical menu can be displayed in view 820. A location at which the finger 814 interacts with the touch screen device can be associated with the resulting location of the presented graphical menu. For instance, icons can be presented around the finger 814 (e.g., spaced at positions around the finger 814, for instance with respect to a square, rectangle, circle, oval, spacing, such as on a perimeter, circumference, and so on, of rectangle, circle, oval, and so on), with each icon representative of a respective function that can be performed.

View 830 illustrates the finger 814 moving in a direction (e.g., upwards, superiorly) towards a particular icon 832, and temporarily selecting the particular icon 832. As described above, for instance with respect to FIG. 5, different techniques can be utilized to determine whether an icon is to be selected. As an example, the finger 814 can be located on the particular icon 832, or be within a threshold distance of the particular icon 832 and moving in a direction associated with the particular icon 832 (e.g., a vector sketched out by the finger 814 would extend to, or be located closest to, the particular icon 832), be within a threshold distance of the particular icon 832 after having passed over the particular icon 832 (e.g., illustrated in FIG. 10A and described further below), and so on.

After the particular icon 832 has been temporarily selected, as illustrated in view 840, the user can stop touching the touch screen, and the particular icon 832 can be permanently selected (e.g., the particular icon 832 is assigned as a permanent selection). As illustrated, optionally the touch screen can present an indication of the permanent selection of the particular icon 832. For instance, a graphical representation 816 of the particular icon 832 is presented on the touch screen in the upper right. Optionally, the graphical representation 816 can be presented in other portions of the touch screen (e.g., locations outside of the medical image, within a threshold distance of an extremity of the touch screen or user interface, such as a top border), and can be movable by the user (e.g., the user can select the graphical representation 816 and move the representation 816 around).

Figure 8B:
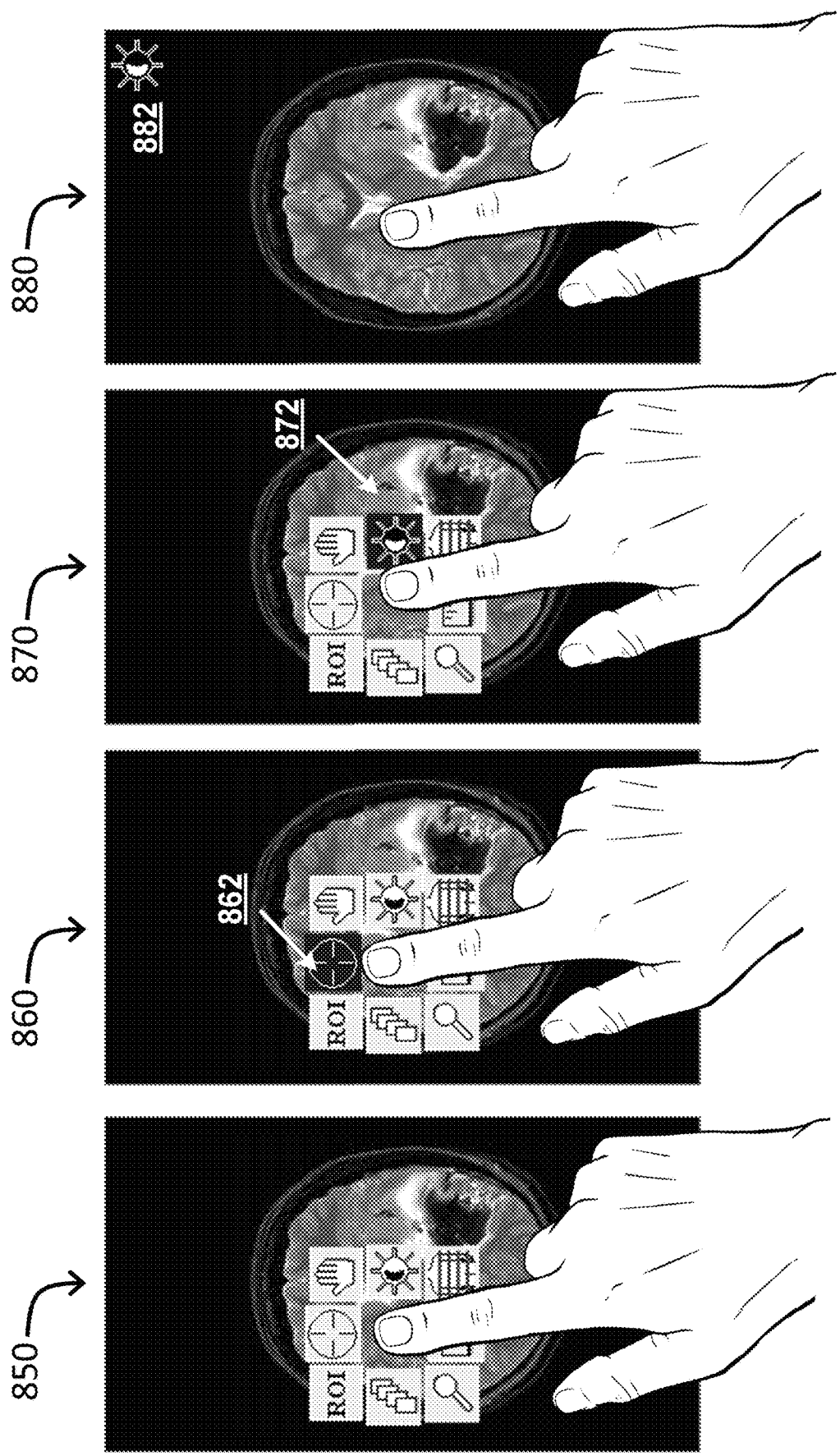
FIG. 8B illustrates permanently selecting an icon included in a graphical menu based on pressure applied to a touch screen of the mobile device.

FIG. 8B illustrates permanently selecting an icon included in a graphical menu based on pressure applied to a touch screen of the mobile device. As described above, the mobile device can determine a value associated with a pressure being applied to the touch screen (e.g., measure an applied force as described above), and can determine a range in which the value is included. In the example of FIG. 8B, a heavy touch and a light touch are utilized, with the heavy touch being associated with a greater pressure applied to the touch screen than the light touch. Additionally, the mobile device can determine a location at which the user is pressing on the touch screen.

As illustrated in view 850, the user's finger is contacting the touch screen with a heavy touch, and a graphical menu is being displayed in response to the heavy touch. That is, the mobile device has determined that the user's finger was applied with a force, pressure, greater than a threshold (e.g., included in a particular range), and in response the mobile device has updated the touch screen to present the graphical menu (e.g., around the user's finger).

Subsequent to the presentation of the graphical menu, and as illustrated in view 860, the user has temporarily selected a first icon 862 while retaining the heavy touch on the touch screen (e.g., the user has moved the user's finger to the first icon 862 with continued heavy touch, such as an average applied force, pressure, that is within a threshold of a range associated with heavy touch).

In view 870, with continued heavy touch, the user's finger has moved to a second icon 872, and the second icon 872 is temporarily selected. For instance, after the user's finger moved to the first icon 862, optionally the user may have moved his/her finger to the second icon 872 while always, or substantially (e.g., not less than a threshold time period), using heavy touch applied to the touch screen.

In view 880, the user is applying light touch or no touch, causing permanent selection of the second icon 872. Optionally, a graphical representation 882 of the permanently selected second icon 872 may be displayed on the screen. In the example of view 880, the graphical representation 882 is shown in the upper right-hand corner of the screen.

Figure 9A:
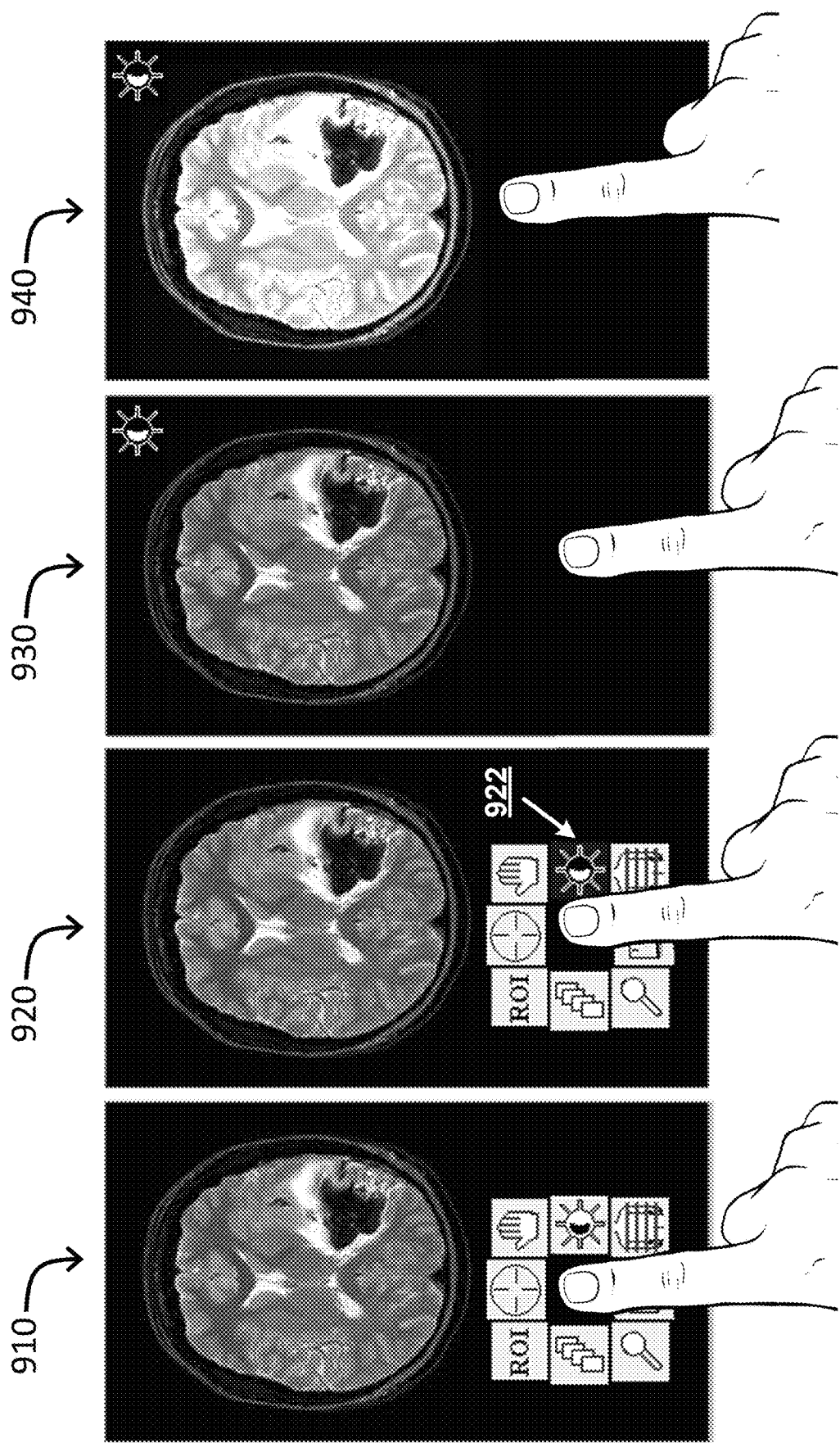
FIG. 9A illustrates a function associated with a permanently selected icon being utilized.

FIG. 9A illustrates a function associated with a permanently selected icon being utilized.

In the example of FIG. 9A, heavy touch is used to interact with a presented graphical menu, while light touch is used to interact with the other functions within the application, such as the function associated with an icon selected by the user using the graphical menu system.

In view 910, the user is applying heavy touch to the touch screen resulting in display of a graphical menu, as described above with respect to FIG. 8B.

In view 920, with continued heavy touch, the user has moved his finger toward an icon 922, causing the icon 922 to be temporarily selected.

In view 930, the user is applying light touch or optionally no touch, causing the temporarily selected icon 922 to be permanently selected, in this example initiating a function within the program that allows the user to change the contrast and brightness of the image displayed. For example, moving the finger up/down on the screen can cause adjustment of brightness, and moving the finger left/right can cause adjustment of contrast.

In view 940, with the contrast/brightness function selected (e.g., the icon 922 selected), the user has moved his finger in a direction (e.g., upwards, superiorly), with continued light touch, providing input to the selected function and resulting in an increase in brightness of the displayed image.

Figure 9B:
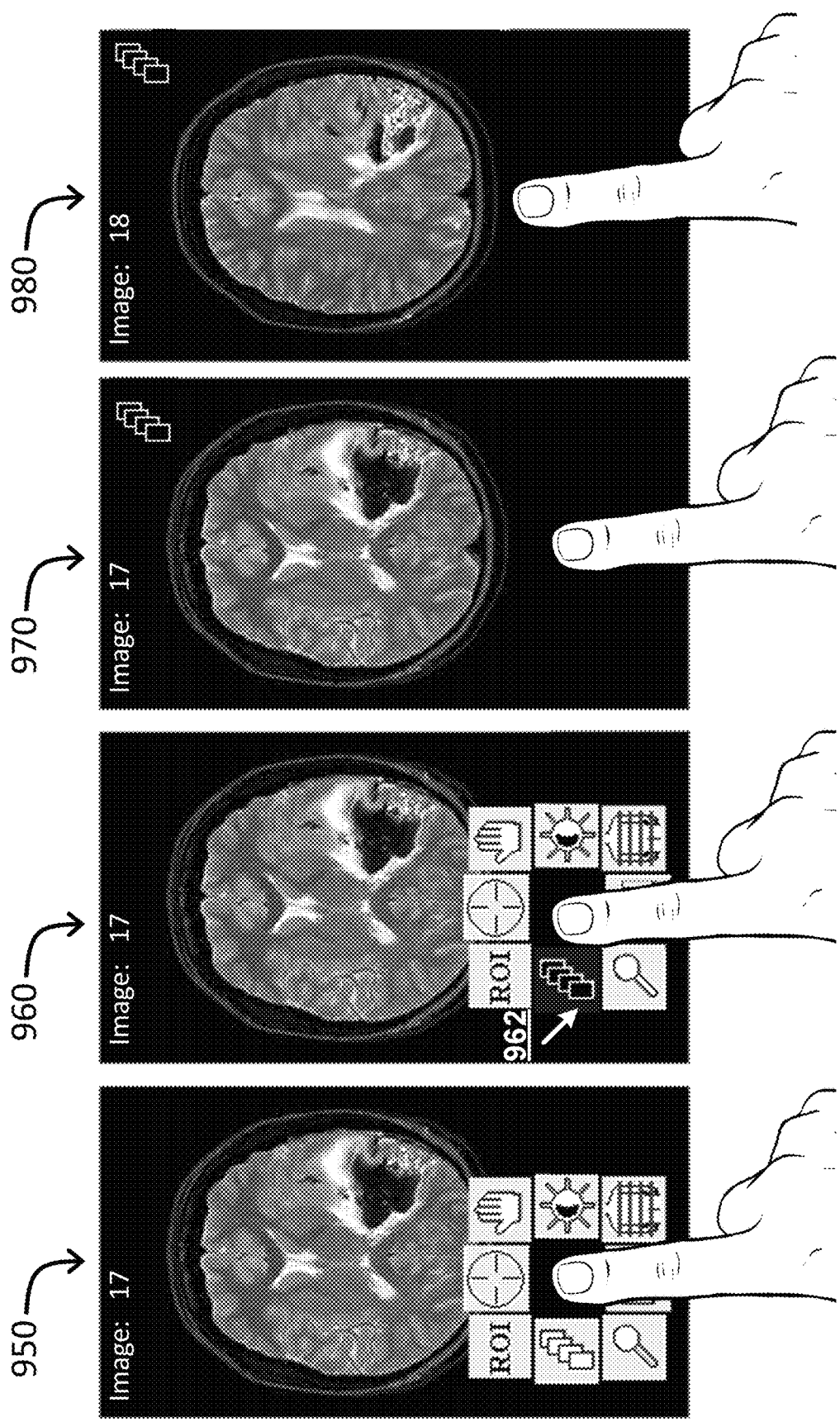
FIG. 9B illustrates another function associated with a permanently selected icon being utilized.

FIG. 9B illustrates another function associated with a permanently selected icon being utilized. The example of FIG. 9B is similar to the example of FIG. 9A, except the user has selected an icon 962 associated with a function that allows the user to navigate up and down through a series of images within a series of images (e.g., medical images).

In views 950 and 960 the user has used heavy touch to display a graphical menu and temporarily select an icon 962 corresponding to the image navigation function.

In view 970, light touch is used to permanently select the image navigation icon (e.g., icon 962) and activate the corresponding function.

In view 980, with continued light touch, movement of the finger on the screen provides input to the selected function, in this case causing display of a different image in the series.

As illustrated in FIGS. 8A-9B, a graphical menu can be displayed on the touch screen around a location at which a user's finger interacted with the touch screen (e.g., pressed on the touch screen with a heavy touch). Since the user's finger, palm, or other portion of his/her hand, may obstruct a portion of the touch screen, including the graphical menu, the user may be unable to easily view one or more obstructed icons. Similarly, particular locations at which the user's finger interacted with the touch screen may not allow full presentation of the icons. For instance, if the user touches the touch screen near an extremity of the touch screen or user interface presenting on the touch screen (e.g., within a threshold of a border), one or more icons may be cut off as they would otherwise be presented outside of the touch screen.

Techniques to handle the obstruction or obscuring of icons, thus enabling the user to easily view any obstructed or obscured icons, will be described. For example, the techniques include (1) allowing selection of an icon even if the user's finger has moved beyond a location of the icon (e.g., FIG. 10A), (2) displaying a selected icon at an extremity of the touch screen, such as a top of the touch screen (e.g., FIG. 10B), (3) modifying the graphical menu to display icons outside of an obstructed area (e.g., FIGS. 12-13), and (4) modifying the graphical menu to not display icons outside of the touch screen (e.g., FIG. 12-13). In this way, the techniques enable users to quickly interact with icons without information being hidden due to the necessities of the user interaction (e.g., placing a physical hand or object on top of a portion of a user interface), therefore solving a problem arising out of use of the mobile device.

Optionally the mobile device can detect a location of the user's hand (e.g., the mobile device can utilize sensors to detect a presence of a hand over a portion of the touch screen), and can ensure that no icons are presented in the detected location.

Figure 10A:
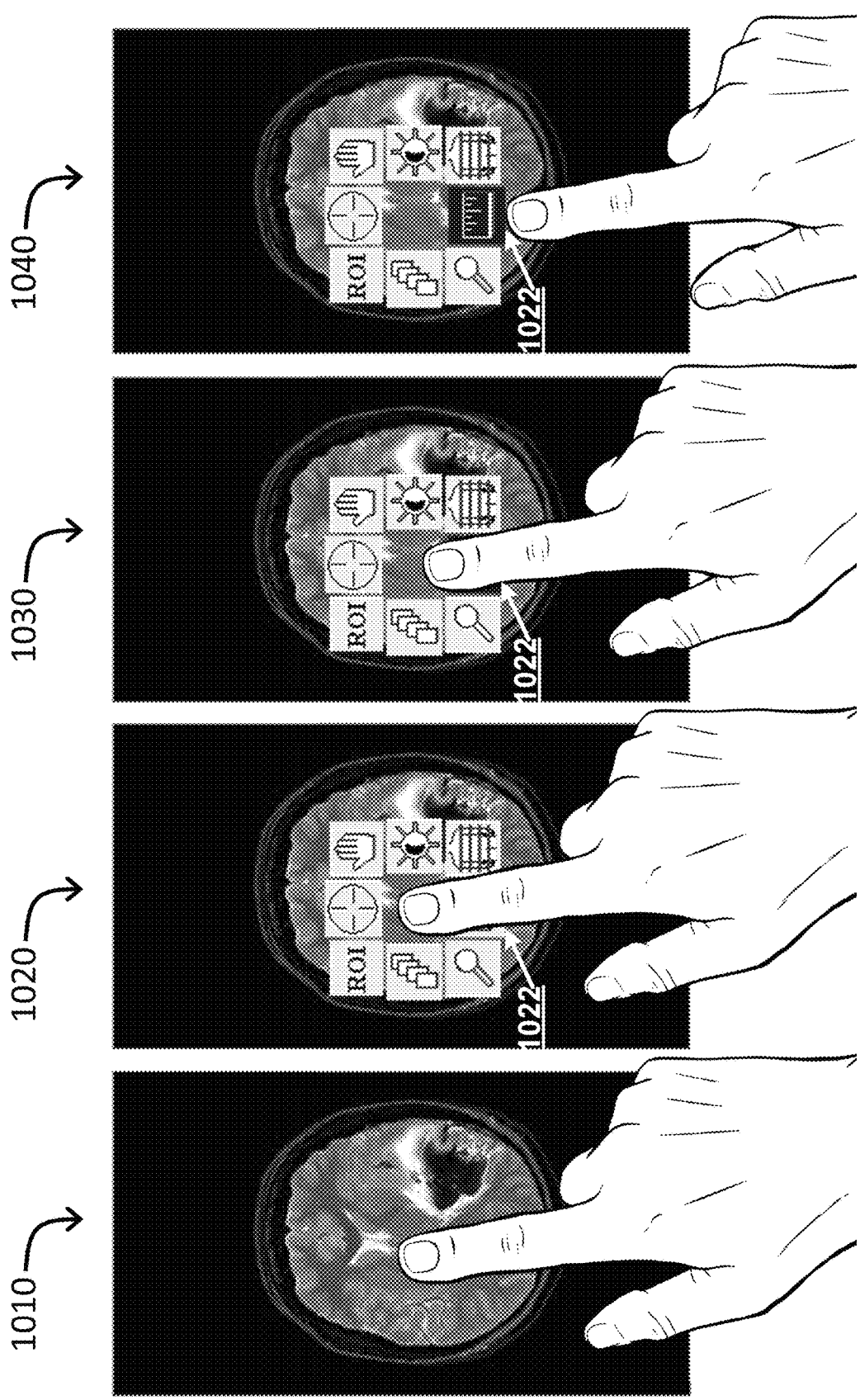
FIG. 10A illustrates an example of displaying an icon obscured by a user's hand.

FIG. 10A illustrates an example of displaying an icon obscured by a user's hand. Similar to the example of FIG. 9b, the example of FIG. 10A illustrates the user utilizing heavy touch to display a graphical menu and temporarily selecting an icon.

As described above, a particular icon 1022, can be obstructed by a portion of a user's hand (e.g., as illustrated, the user's finger is obstructing view of the particular icon 1022). As illustrated in view 1030, the user can temporarily select the particular icon 1022 (e.g., the user can apply a heavy touch and move his/her applied finger to the particular icon 1022). However, since the user's finger is opaque, the temporarily selected icon 1022 is hidden from view.

View 1040 illustrates one solution, where continued movement in a direction of the user's finger (e.g., downwards, inferior movement) reveals the temporarily selected icon 1022, which is still temporarily selected as it is the icon closest to where the user is touching the screen. Therefore, the user can move his/her finger beyond, or otherwise away from, the selected icon 1022, and the icon 1022 can remain temporarily selected.

Figure 10B:
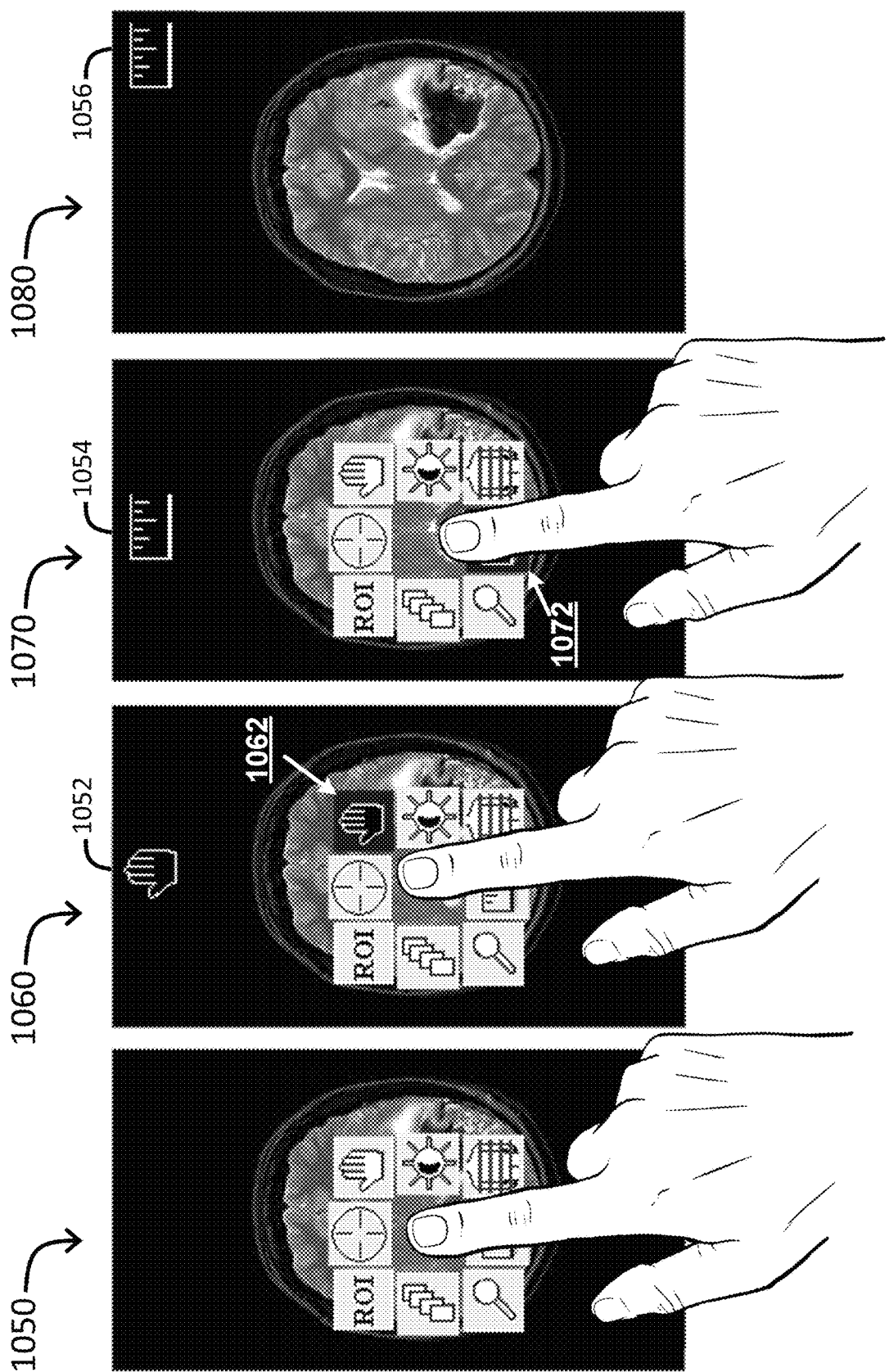
FIG. 10B illustrates another example of displaying an icon obscured by a user's hand.

FIG. 10B illustrates another example of displaying an icon obscured by a user's hand. Similar to the description in FIG. 10A, icons can be obscured due to placement or movement of a user's hand. As illustrated in FIG. 10B, a graphical representation (e.g., 1052, 1054, 1056) of a selected icon can be displayed at a particular location, such as an extremity of the touch screen, such that the user can easily determine icon was selected.

In view 1050, the user has used heavy touch to cause display of a graphical menu. In view 1060, continued heavy touch and movement of the user's finger toward an icon 1062 has caused the icon 1062 to be temporarily selected. The temporarily selected icon 1062 within the graphical menu is displayed in a way to differentiate it from the unselected icons, in this example by inverting its contrast.

In addition, a graphical representation of the temporarily selected icon 1062 is also displayed in a different place on the screen, for instance at the top in the middle as icon 1052, where it is unlikely to be obscured by the user's hand. Other locations can be utilized, and as described above the location can be selectable by the user. Upon selection of an updated location by the user, the updated location can persist as the user temporarily selects other icons.

In view 1070, a different icon 1072 is temporarily selected. While the temporarily selected icon 1072 is obscured by the user's finger, the second graphical representation of the icon 1054 at the top allows the user to clearly see which icon is temporarily selected.

In view 1080, with light touch or no touch, the temporarily selected icon 1072 is permanently selected. In this example, an icon 1056 corresponding to the permanently selected icon 1072 is displayed in the upper right corner of the screen, in a different location than where temporarily selected icons were displayed. In one embodiment, the same screen location could be used to display temporarily and permanently selected icons. Additionally, the temporary locations and permanent locations can be user selectable. Optionally, the temporary location and permanent location can be the same while the two associated icons are identical, however upon an updated selected of a temporary icon that is different than a presently selected permanent icon, the two locations can be relocated (e.g., next to each other).

Figure 11:
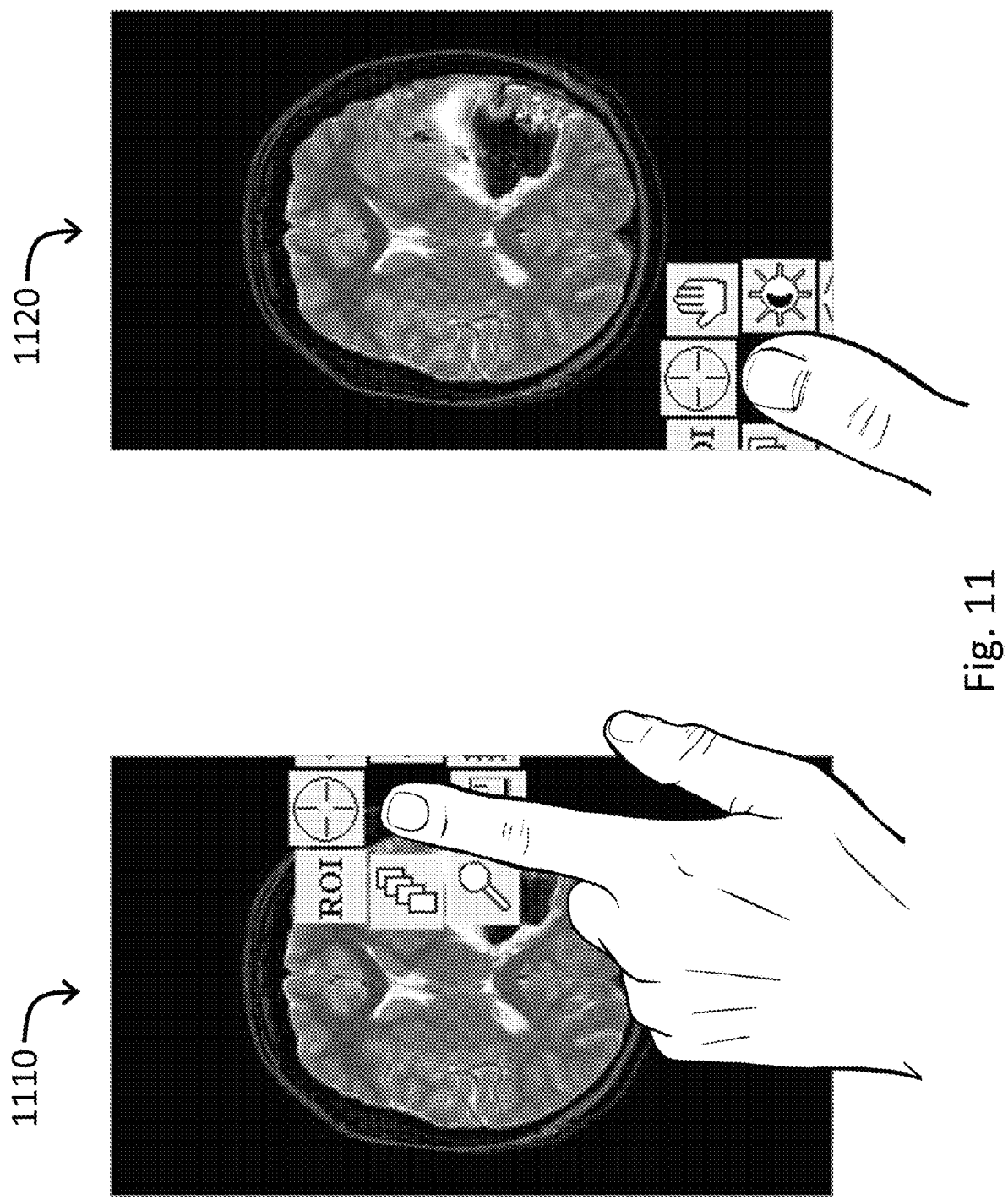
FIG. 11 illustrates an example problem associated with presentation of a graphical menu based on a location at which a user touches a touch screen.

FIG. 11 illustrates an example problem associated with presentation of a graphical menu based on a location at which a user touches a touch screen. As described above, a user can interact with the touch screen at a location within a threshold distance of an extremity of the touch screen. The interaction, as described above, can cause the presentation of a graphical menu and associated icons. Since the location is near an extremity (e.g., a border of the user interface, touch screen), one or more of the icons may not be presented as the user interface, touch screen, would cut the presentation off. That is, the graphical menu displayed around the location where the user touches the touch screen may be partially invisible to the user, as regions of the graphical menu may fall outside the display region.

In view 1110, the user has touched the right side of the user interface and a portion of the right side of the graphical menu therefore falls outside the touch screen display regions. In addition, portions of the graphical menu underneath the user's hand (e.g., portion of the user's hand, such as finger) are obscured from view.

In view 1120, the user has touched the lower left portion of the screen, for example with a finger or thumb, and left sided and inferior (e.g., lower) portions of the graphical menu therefore fall outside the touch screen display regions.

Figure 12:
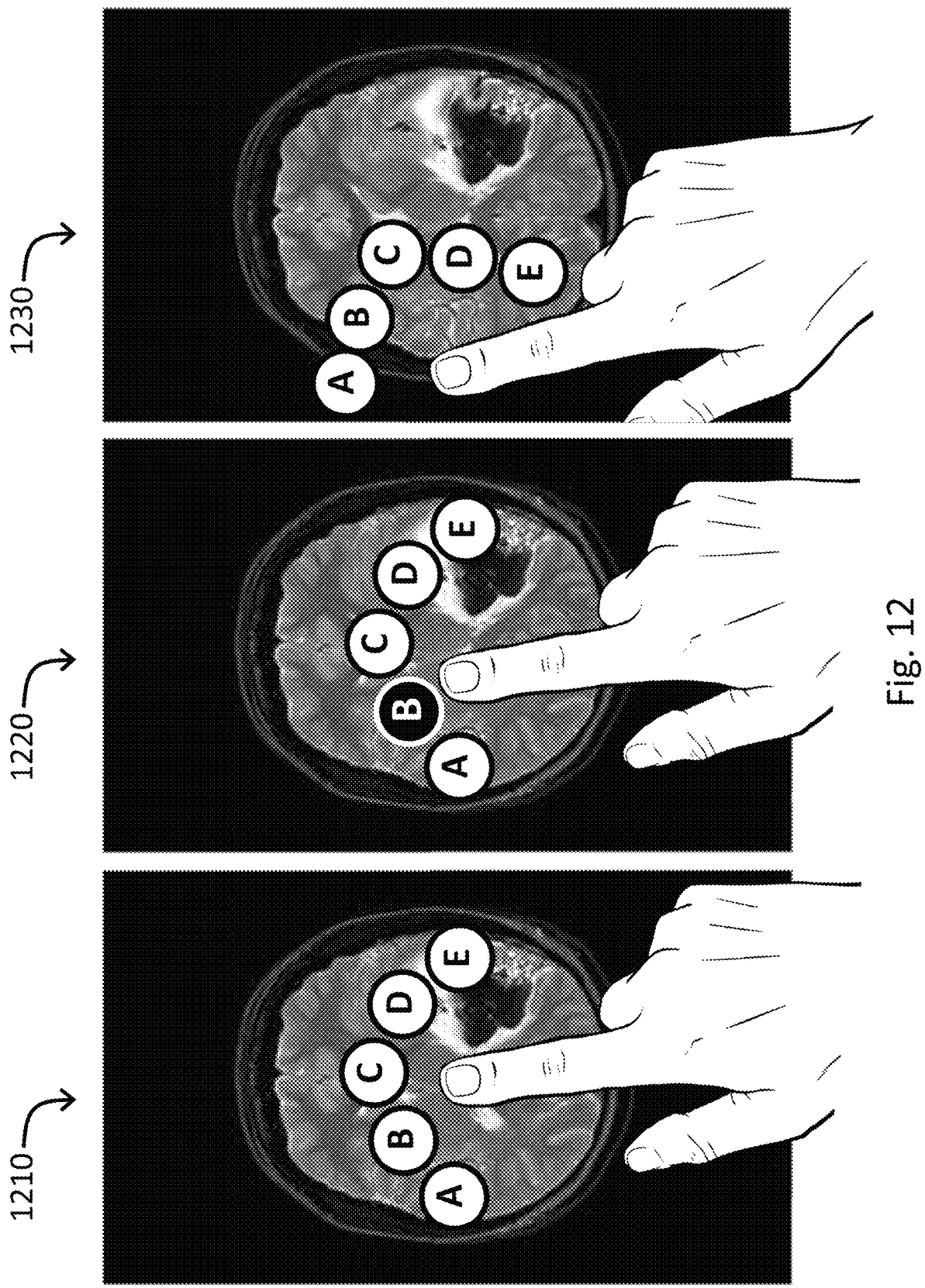
FIG. 12 illustrates modifying presentation of a graphical menu based on a location at which a user touches a touch screen.

FIG. 12 illustrates modifying presentation of a graphical menu based on a location at which a user touches a touch screen.

With use of mobile devices, such and smartphones and tablets, a portion of the user's hand can be typically inferior to (e.g., lower than) the point that the user touches the screen, for example with his/her index finger or thumb. To prevent a portion of the user's hand from obscuring visualization of the graphical menu, the system can be configured so that it does not display icons within a graphical menu inferior to (e.g., lower than) the location at which the user touches the touch screen. In addition, the system can be configured so that portions of the graphical menu are not located outside of the display area. Examples of functionality in conformance with the above are illustrated.

In view 1210, the user initially touches the touch screen (e.g., with light touch, or heavy touch as described above), causing display of a graphical menu. In the example, the icons are displayed above and on either side of the location associated with the user's interaction (e.g., touch). In this example, the icons of the graphical menu are circular with a white background and black letters, although icons of any form could be utilized, including any arbitrary polygonal shape. In this way, the icons may not be presented at a vertical position below the location at which the user interacted with the touch screen. Optionally, the icons may be presented a threshold vertical distance below the location at which the user interacted with the touch screen. Similarly, the icons may be presented a threshold vertical distance below the location at which the user interacted with the touch screen, which can be based on a horizontal position of the icons from the user's interaction. That is, the icons can be spaced a threshold horizontal distance from the user's finger, such that the icons will be visible and not obstructed by the user's finger or hand.

In view 1220, the user's finger has moved toward an icon of the graphical menu, causing it to be temporarily selected (e.g., with applied heavy touch as described above). In this example, the temporarily selected "B" icon is displayed with inverted contrast to indicate that it has been temporarily selected.

In view 1230, touch by the user's hand has initiated display of a graphical menu at a point toward the edge of the screen. If the arrangement of icons shown in view 1210 where used, portions of the graphical menu would fall outside of the bounds of the screen and therefore be invisible to the user.

In the embodiment of view 1230, the arrangement of icons has been automatically changed so that all the icons are positioned on the screen and they are also not inferior to the user's finger, where they would be obscured. That is, the mobile device causes presentation of each icon to be at least a threshold horizontal and vertical distance from an extremity of the user interface, touch screen. The icons can conform to a particular shape, such as a particular curve, oval, circle, and so on, with the shape being based on a location of the user's touch. As an example, icon A is placed at a first location on the user interface (e.g., a particular vertical distance above the user's finger, and a particular horizontal distance from the border of the user interface), and the remaining icons are placed along a curve (e.g., a parabola, a portion of an oval, circle) that terminates below the user's finger and at a particular horizontal distance from the user's finger. As a further example, the system can determine a location of each icon such that the icon will be (1) visible, and (2) not placed along a downwards vertical direction from the user's finger within a threshold horizontal distance of the user's finger. In this way, the icons can be placed such that they are not obstructed.

Figure 13:
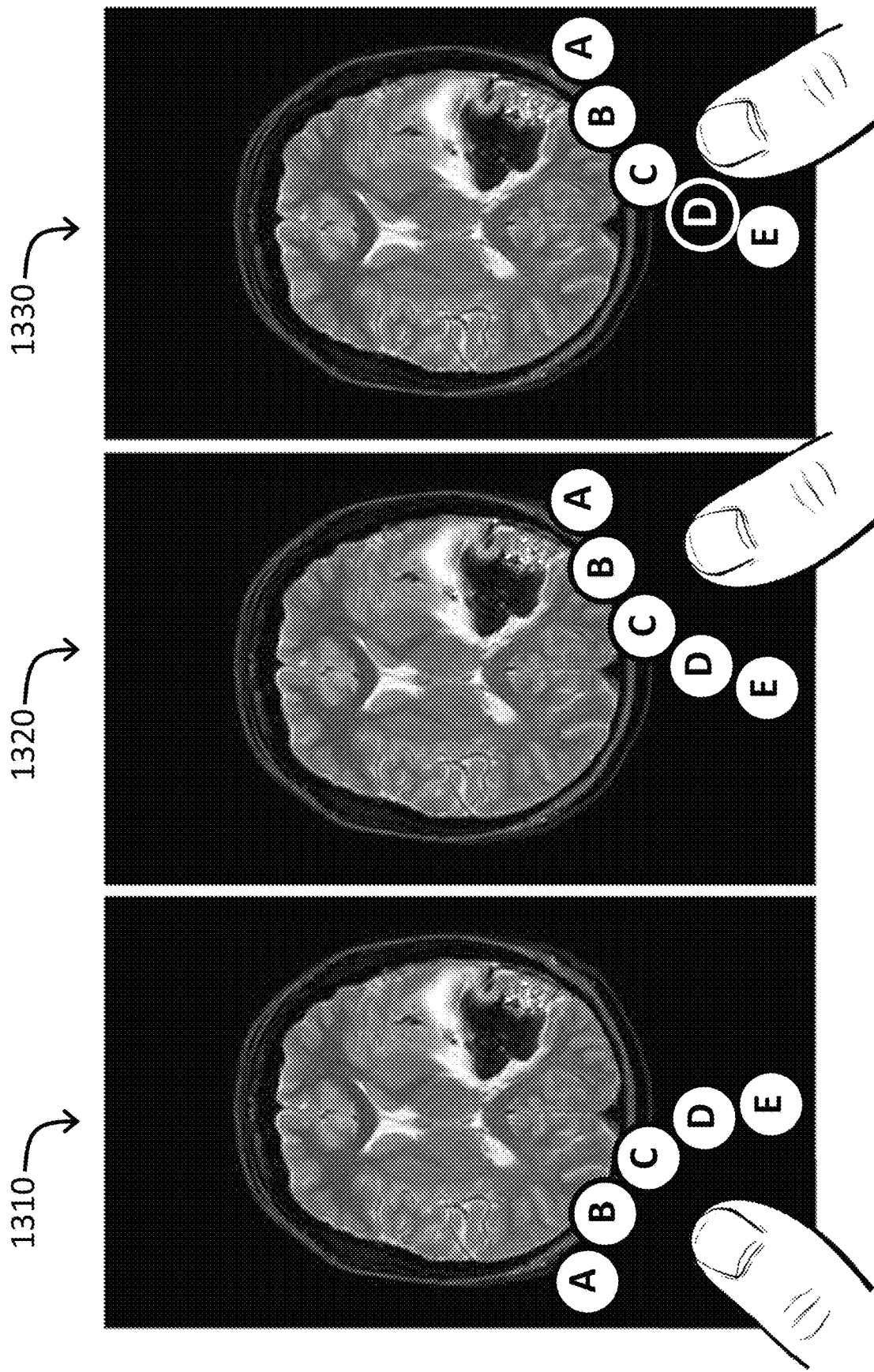
FIG. 13 shows other examples where icons are automatically arranged so that they are located on the touch screen and not obscured by the user's hand.

FIG. 13 shows other examples where icons are automatically arranged so that they are located on the touch screen and not obscured by the user's hand.

Figure 14:
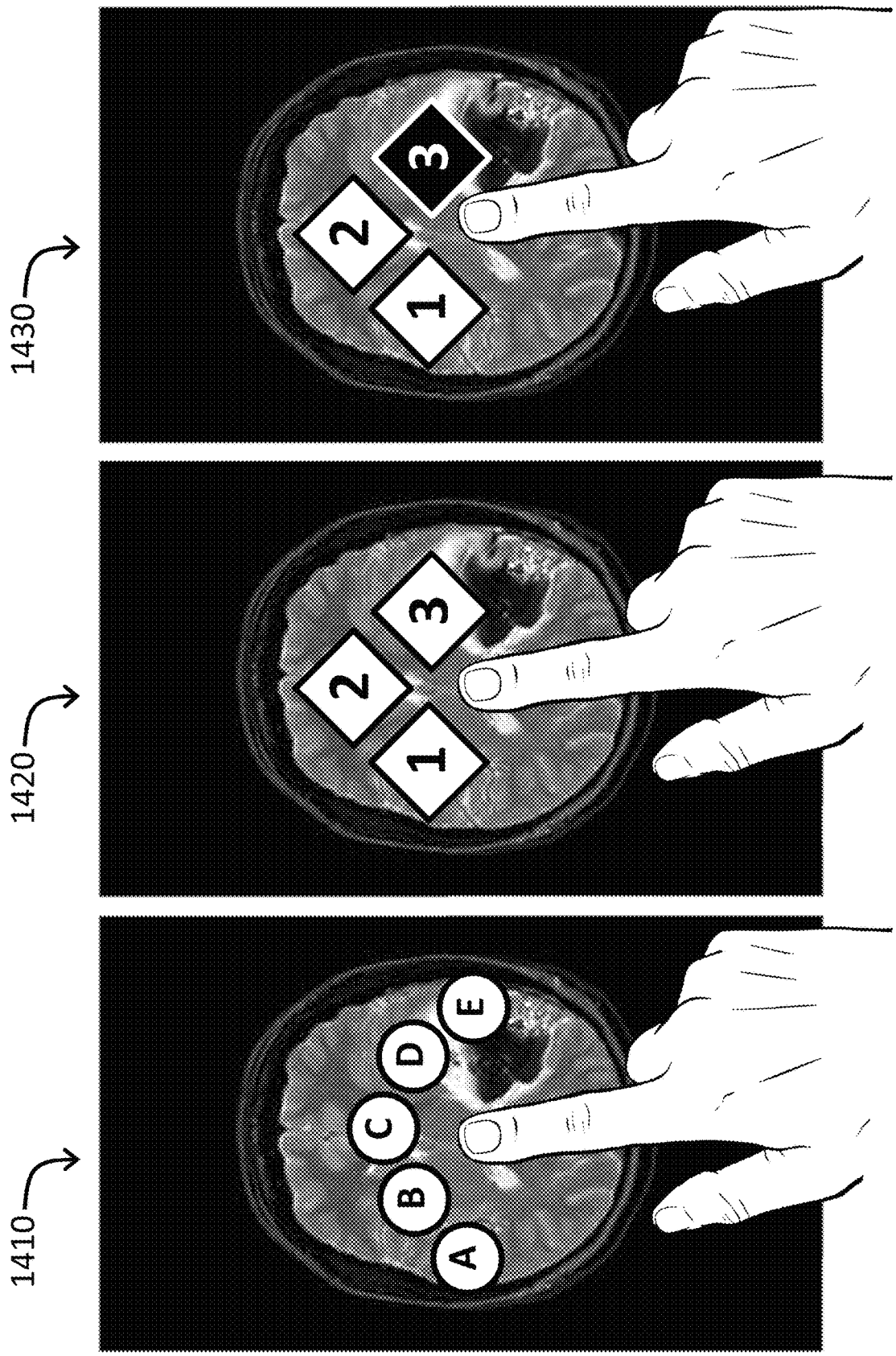
FIG. 14 illustrates an embodiment where different values of touch pressure can be used to display different menus.

FIG. 14 illustrates an embodiment where different values of touch pressure can be used to display different menus.

In this embodiment, touch pressure is divided into light, medium, and heavy, touches (e.g., as described above).

In view 1410, the user has applied medium touch and a first graphical menu has been displayed on the touch screen. With continued medium touch, the user can interact with this first graphical menu, as previously described, and temporarily select an icon.

In view 1420, the user has applied heavy touch, and the first graphical menu associated with medium touch, for example the one shown in view 1410, has been removed. In response to the heavy touch, a different graphical menu associated with heavy touch is displayed (e.g., the example graphical menu displayed in view 1420).

In view 1430, with continued heavy touch, the user has moved the finger touching the screen, the index finger in this example, toward one of the icons in the graphical menu, causing it to be temporarily selected.

Each graphical menu can include icons associated with particular functionality (e.g., with respect to medical images presented on the touch screen). Optionally, the first graphical menu can include icons each associated with particular functionality, and upon temporary selection of a particular icon, the user can apply a heavy touch (e.g., at a location corresponding to the particular icon, at a location at which the user caused presentation of the first graphical menu, or an arbitrary location) and the different graphical menu can include icons that are associated with the particular icon (e.g., include related functionality, detailed functionality associated with the particular icon, and so on).

As described above, touch pressure may be divided into more ranges so that more than 2 menu systems may be utilized.

Figure 15:
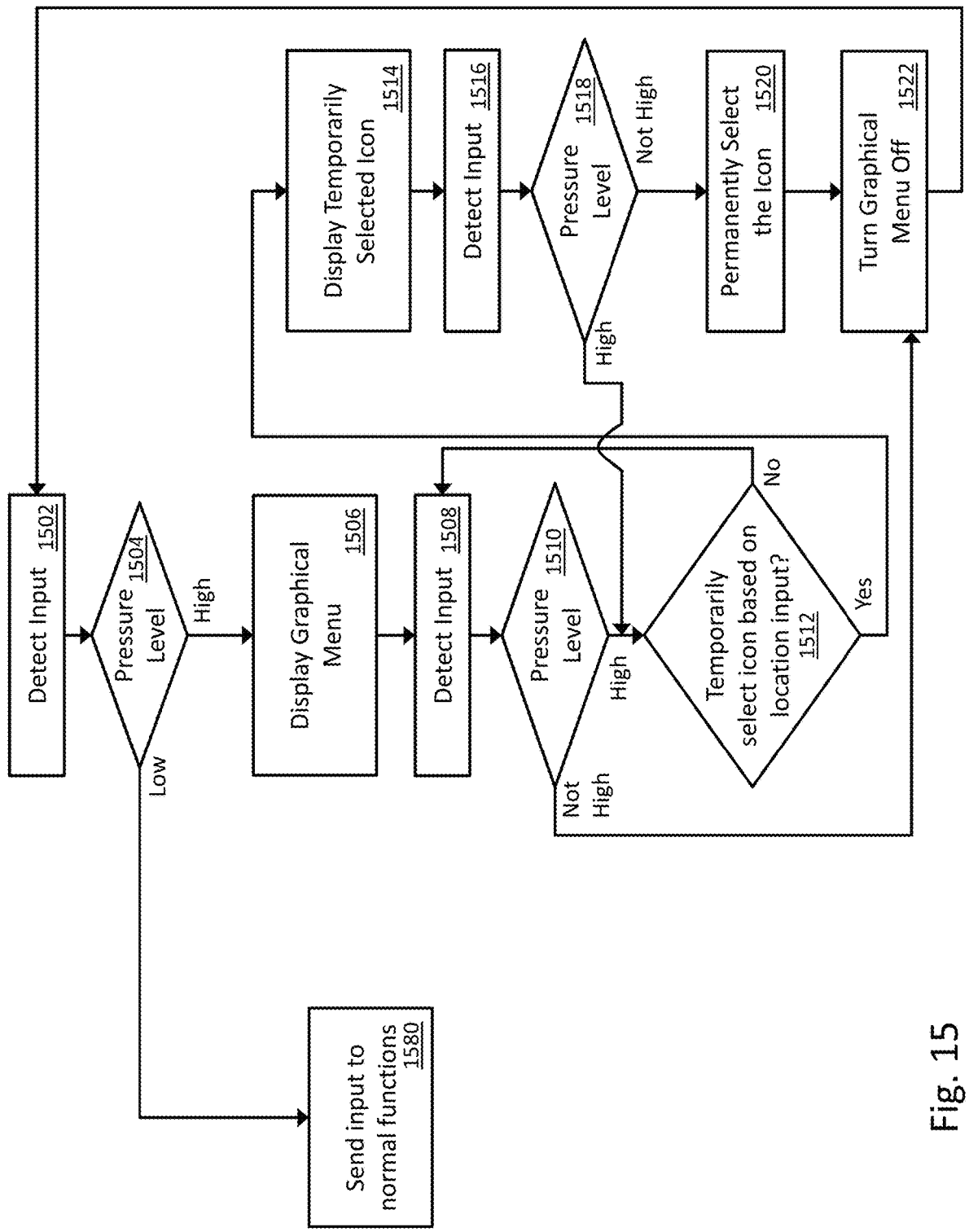
FIG. 15 is a flowchart of an example method of receiving input via touch pressure.

FIG. 15 is a flowchart of an example method of receiving input via touch pressure. In this embodiment, touch pressure is divided into high vs. low (e.g., light touch, heavy touch). The example block diagram can be implemented by a system, mobile device, and so on, as described above.

In block 1502, touch input is detected on a touch screen, which includes location information (e.g., X, Y position, in a user interface presented on the touch screen) and a measure of a force, pressure, applied to the touch screen (e.g., at a location indicated by the location information).

In block 1504, the degree of touch pressure is assessed. If the touch pressure is low, then the touch input is utilized by the normal application functions, those not associated with the menu system.

If touch pressure is high, then a graphical menu system is displayed in block 1506, as described above with reference to FIGS. 8A-14.

In block 1508, further touch input is detected and monitored. For instance, the locations at which touch input is detected on the touch screen can be monitored along with the associated touch pressure.

In block 1510, the touch pressure is assessed. If the touch input is not high (low or absent), then the system moves to block 1522 in which the displayed graphical menu is turned off, with no icon selected, as none has been temporarily selected.

In block 1510, if continued high pressure is detected (e.g., detected from the monitored user input), the system moves to block 1512, in which location information of the current touch point is assessed to determine whether or not an icon should be temporarily selected, according to one of the other embodiments described herein. For example, if the position of touch has moved out of the home region and close to one of the icons in a graphical menu, that icon would be temporarily selected.

The system then progresses to block 1514, in which the temporarily selected icon within the graphical menu is displayed in such a way as to distinguish it from the non-selected icons. In some embodiments, the graphical representation of the temporarily selected icon may also be displayed in another position on the screen, as described with reference to FIG. 10B.

In block 1516, further input is detected and monitored.

In block 1518, the degree of pressure is assessed. If the pressure remains high, the system progresses to block 1512, in which the system determines that an icon of the graphical menu is to be selected based on the location information of the touch input.

If the touch pressure is not high, low or absent, then the system progresses to block 1520, in which the temporarily selected icon is permanently selected.

In block 1522, the graphical menu is turned off and the system progresses to block 1502, in which user input is detected.

Figure 16A:
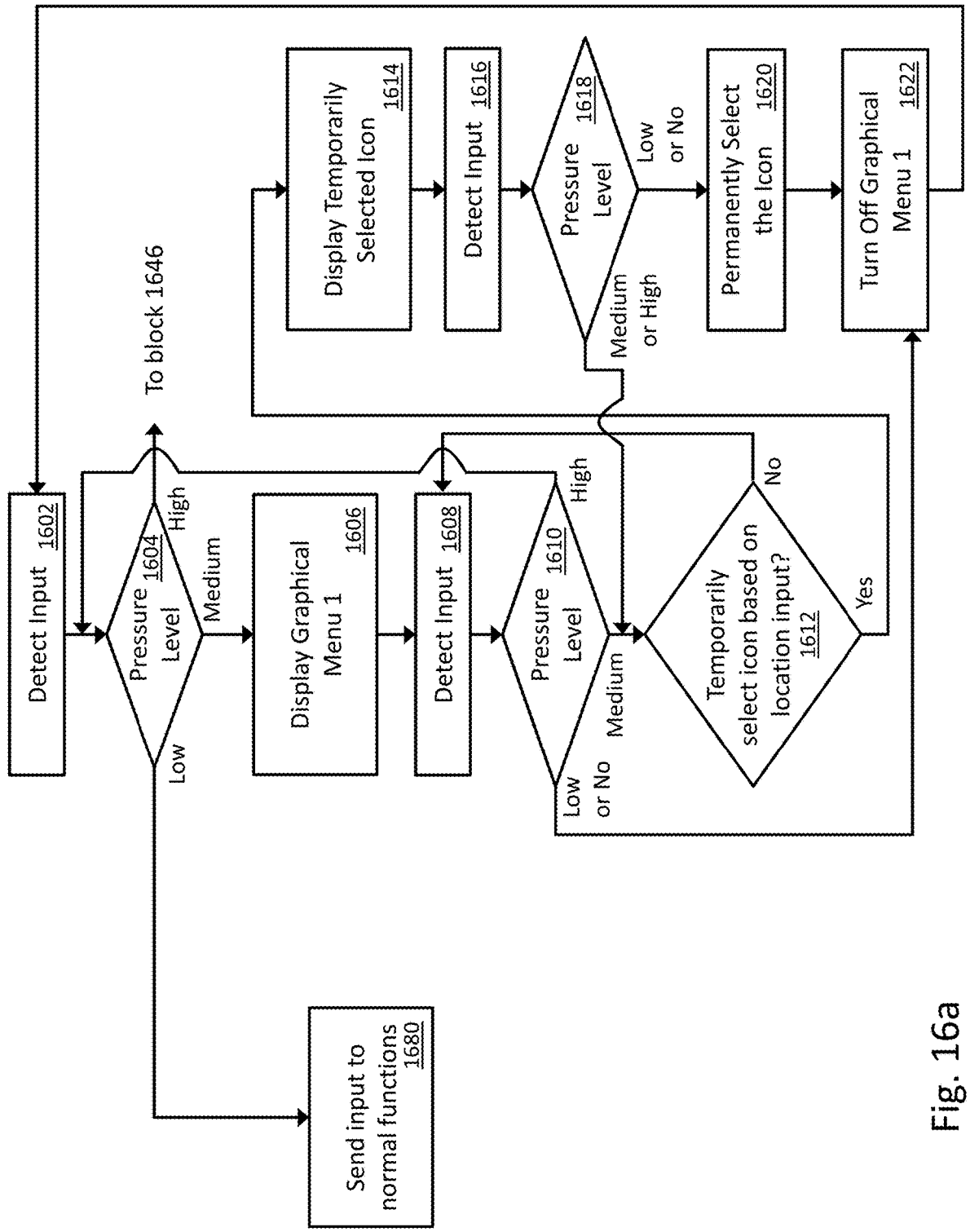
FIGS. 16a and 16b are flowcharts illustrating an example method of interpreting user input pressure.
Figure 16B:
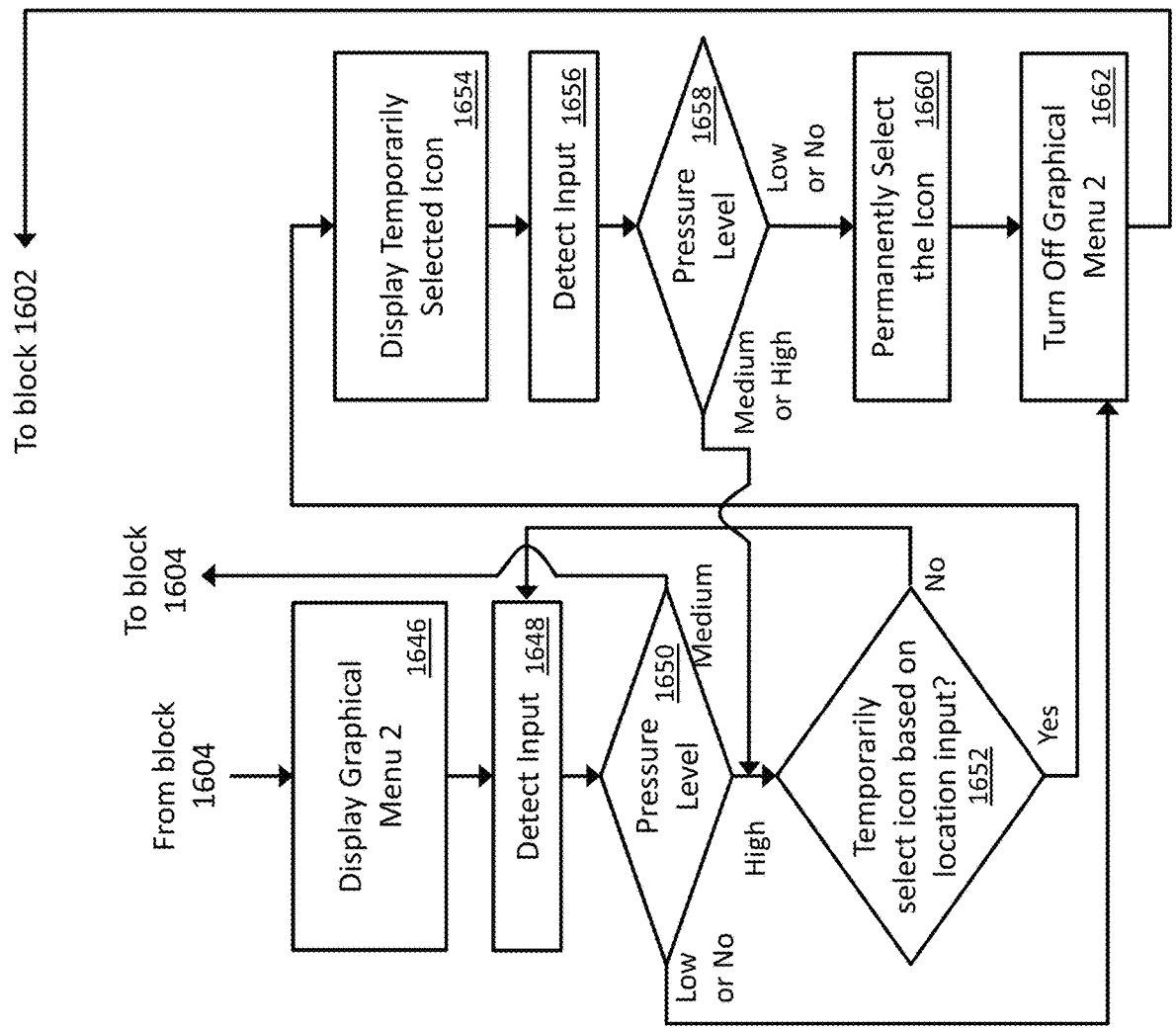

FIGS. 16a and 16b are flowcharts illustrating an example method of interpreting user input pressure. In the flowcharts, medium pressure is utilized to select the display of one graphical menu, and high pressure is utilized to select the display of another graphical menu, for example as illustrated in the embodiment of FIG. 14.

The block diagram is similar to the block diagram of FIG. 15, except that high, medium, low, and no pressure are utilized to select display of two different graphical menus and interact with them.

While the above description indicates that a user is to apply a heavy touch to a touch screen to view a graphical menu, and then with heavy touch applied (e.g., constant heavy touch, substantially heavy touch as measured over a threshold amount of time), is to maneuver his/her finger to an icon to temporarily select the icon, other techniques and methods can be utilized. For instance, the user can apply a heavy touch to the touch screen, and the graphical menu can be presented. The user can then apply light touch or no touch, and the graphical menu can remain presented. To remove presentation of the graphical menu, the user can apply a heavy touch to a same location (e.g., within a threshold distance of the same location) as initially applied to the touch screen when causing presentation of the graphical menu. Subsequently, the user can apply heavy touch to a particular icon, causing temporary and/or permanent selection of the particular icon. Optionally, the user can apply a light touch to a particular icon, causing temporary and/or permanent selection of the particular icon.

FIG. 17 illustrates a touch screen 1712 that allows display of visual information, in this example a brain MRI image, as well as touch input, for example from finger 1714. In this example the end of the user's finger is touching the screen, and the touch screen detects both the location of the touch, for example as an (x,y) location, as well as a measure of the touch pressure being applied by the finger to the screen.

Data structure 1720, illustrates a data structure that contains the touch location, as x and y coordinates, as well as the touch pressure.

FIG. 17 illustrates computing device 1750 that may be used with various embodiments described herein. It includes touch screen 1764 that allows measurement of touch pressure as well as touch location.

The mobile computing device 1750 may include various components, such as those described above with respect to FIG. 1A. For example, components of the mobile computing device 1750 may include one or more processors 1752 and memory and/or data storage 1753 (including one or more software modules 1751 and/or a rules engine 1763 (which may itself comprise a software module)). In particular, as described below, the rules engine 1763 may execute various rules that may be used to translate an amount of movement of the mobile computing device 1750 or input via the touch screen 1764 into a corresponding movement through the imaging volume or series of images. Such a determination may be based on, for example, an image type. Components may also include position sensors 1761, which may include, for example, motion sensors 1759, orientation sensors 1760, and/or location sensors 1762. The various position sensors 1761 may include, for example, gyroscopes (that may be used, for example, to detect and measure rotational motion), accelerometers (that may be used, for example, to detect and measure linear motion), cameras, Global Positioning System (GPS) transceivers and devices, near field communication (NFC) technology devices, Radio Frequency Identification (RFID) devices, systems and devices utilizing WiFi, systems and devices utilizing Bluetooth such as iBeacons, and/or the like. The mobile computing device may also include an optional position transmitter that may be used in combination with external sensors to track the location, position, movement, and/or orientation of mobile computing device 1750. The various sensors and transmitters may provide input/data to the mobile computing device 1750, and may also transmit such data, related to the device's position, including the device's location, orientation, and/or motion. Such information may be processed by, for example, one or more software modules of the mobile computing device and/or other components of the system, as described below, such that displayed image data may be updated.

Other Contemplated Embodiments

For some of the embodiments illustrated herein, the user input device is a mouse. However, any input device or combination of input devices could be used to control the graphical menus described herein, including: mouse, trackball, keyboard, touch screen, 3d mice, foot controls, pointing sticks, touchpad, graphics tablet, joystick, brain-computer interfaces, eye-tracking systems, Wii remote, jog dial, and/or steering wheel.

A graphical menu module could be implemented in many situations. For example, a graphical menu module can be implemented within a computer program where the user might use it to choose among options. For example, in a word processing program it might be used to allow the user to choose font options, such as bold, italic, and underline. In a PACS system it might be used to allow users to choose various predefined display settings for an image.

In another example, a graphical menu module can be implemented within a computer program to allow selection of various operations. For example, in a word processing program it could be used to choose among operations like copy, paste, delete, and indent. In a PACS system it could be used to choose among different operations such as window/level, choose series, region of interest, zoom, pan, and others.

In another example, a graphical menu module can be implemented within an operating system where it could be used to choose among operations like "launch web browser," "launch word processing program," "launch spreadsheet program," and so on.

In another example, a graphical menu module can be implemented as an add-in program or standalone driver, such as a mouse driver, that would allow the use of the system in cases where it had not been directly implemented within a program or operating system. The system may be configured to send key strokes or other inputs to the program or operating system for which it was configured.

The appearance and operation of graphical menus used in the system could vary in many ways. For example, the graphical menu, the icons it includes, and how it operates could vary depending on the context in which it was launched. Graphical menus could differ depending on the program or operating system that utilized the system. In addition, they could be configurable by the user. In another example, graphical menus could contain one or more icons. In another example, icons within graphical menus could take many forms, including a computer graphic, a picture, and/or text. In another example, icons within a graphical menu could vary in appearance and size. In another example, different methods could be used to allow a user to visually differentiate selected from unselected icons within a graphical menu. For example, the icons could be differentiated by icon appearance, size, color, brightness, features of text font (such as size, bold, italics), and/or motion or blinking (e.g., the selected icon could blink or shake back and forth on the display).

While depression of the right button of a mouse is used in several examples to initiate display of a graphical menu, many other ways are contemplated to initiate display of a graphical menu. For example, such initiation can be via a key on a keyboard, a button on any input device (with example input devices listed herein), a mouse gesture, a gesture on a touch screen with a finger or stylus, physical motion of the device (for example, shaking a handheld device), a result of picking an icon on another graphical menu, and/or a result of a computer or system operation, rather than the result of the user initiating the action. For example, a computer program or operating system might require the user to provide input and in that case display a graphical menu. In another example, a computer with a battery that is running low might display a graphical menu allowing the user to choose among: continue working, shut down, save all open documents, and initiate hibernation.

After an icon is temporarily selected within a graphical menu, several examples herein illustrate the user permanently selecting that icon by releasing the right mouse button. However, they are many ways that a user could permanently select an icon from a graphical menu, including: removing a stylus or finger from a touch screen, pressing a button or key, a mouse gesture, sound input, cursor movement (for example, slight movement from the initial cursor position toward an icon might result in it being temporarily selected; and further movement toward the icon might result in the icon being permanently selected and termination of display of the graphical menu), time (the system could be configured such that a temporarily selected icon would be permanently selected after it was temporarily selected for a predetermined time duration, say for example 100 milliseconds), and/or if the user positioned the cursor over the icon or a predetermined portion of the icon.

Sound

Sound could be used in several ways with this technique to supplement the use of a graphical menu or substitute for the display of a graphical menu. For example, when any icon is temporarily selected, a sound could be played, for example a beep.

In another example, when no icon is temporality selected (e.g., when the user moves the cursor back toward its initial cursor position after temporarily selecting an icon), a sound could be played. This could be different than the sound played when an icon is selected (e.g., temporary selection of an icon could cause a single beep, and subsequent cursor movement that resulted in no icon selected could result in a double beep).

In another example, different sounds could be played for different icons, even spoken words. This could allow the user to accurately verify selection of an icon without the need for visual verification. For example, a graphical menu within a word processing program might have four choices: "cut", "copy", "paste", and "look up". As the user repositions the cursor, these options could be spoken. If one of these was chosen and the user repositioned to another, the sound associated with the new choice would be spoken. If he repositioned the cursor so that none were chosen, a different phase could be spoken, such as "no selection".

In another example, a system using sound could be constructed in which visual display of the graphical menu was not required. This might be helpful in situations such as: blind users and drivers or pilots where the user would want to choose from a menu of options but not want to direct his attention to a display screen.

SUMMARY

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of detecting interactions with a pressure sensitive screen of a computing device, the method comprising:

by one or more computer processors of the computing device:

displaying a user interface on the pressure sensitive screen of the computing device, the user interface including a representation of one or more medical images;

obtaining information indicating user input on the pressure sensitive screen of the computing device, the information indicating a location in the user interface of the user input and a pressure value indicating a measure of pressure applied to the pressure sensitive screen;

in response to determining that the pressure value exceeds a first threshold, presenting a graphical menu comprising a plurality of icons on the pressure sensitive screen, each icon being associated with different functionality to perform on the one or more medical images;

with the graphical menu displayed, detecting a temporary selection input of a particular icon of the plurality icons;

subsequent to the temporary selection of the particular icon, detecting that the particular icon has been permanently selected in response to the pressure value being less than a second threshold;

in response to said permanent selection, initiating execution of a particular functionality associated with the particular icon on the one or more medical images and setting a functionality of a new user input to the particular functionality associated with the particular icon; and subsequent to said permanent selection of the particular icon, receiving the new user input on the pressure sensitive screen, and applying the particular functionality associated with the particular icon in response to the new user input.

2. The method of claim 1, wherein the plurality of icons are presented along a perimeter of a rectangular area of the user interface, wherein the location of the user input is included in the rectangular area.

3. The method of claim 1, wherein the location in the user interface of the user input is within a first threshold distance of an extremity of the user interface, and wherein the plurality of icons are placed along a curve initiating a second threshold distance from the extremity, such that the icons are included within the user interface.

4. The method of claim 1, wherein for one or more icons presented at a vertical location below a vertical location of the user input, the one or more icons are presented a horizontal threshold distance away from a horizontal location of the user input such that the one or more icons are not obstructed by a portion of a hand associated with the user input.

5. The method of claim 1, wherein the temporary selection input indicates that (1) the user input was applied to the pressure sensitive screen at a greater pressure than the first threshold, and that (2) the user input extended from the location of the user input to a location associated with the particular icon.

6. The method of claim 1, further comprising:
presenting a graphical representation of the particular icon within a threshold vertical distance of a top portion of the user interface.

7. A computer program product storing instructions that when executed by a computing device of one or more processors causes the computing device to perform operations comprising:

displaying a user interface on a pressure sensitive screen of the computing device, the user interface including a representation of one or more medical images;

obtaining information indicating user input on the pressure sensitive screen of the computing device, the information indicating a location in the user interface of the user input and a pressure value indicating a measure of pressure applied to the pressure sensitive screen;

in response to determining that the pressure value exceeds a first threshold, presenting a graphical menu comprising a plurality of icons on the pressure sensitive screen, each icon being associated with different functionality to perform on the one or more medical images;

with the graphical menu displayed, detecting a temporary selection input of a particular icon of the plurality icons;

subsequent to the temporary selection of the particular icon, detecting that the particular icon has been permanently selected in response to the pressure value being less than a second threshold;

in response to said permanent selection, initiating execution of a particular functionality associated with the particular icon on the one or more medical images and setting a functionality of a new user input to the particular functionality associated with the particular icon; and subsequent to said permanent selection of the particular icon, receiving a new user input on the pressure sensitive screen, and applying the particular functionality associated with the particular icon in response to the user input.

8. The computer program product of claim 7, wherein the plurality of icons are presented along a perimeter of a rectangular area of the user interface, wherein the location of the user input is included in the rectangular area.

9. The computer program product of claim 7, wherein the location in the user interface of the user input is within a first threshold distance of an extremity of the user interface, and wherein the plurality of icons are placed along a curve initiating a second threshold distance from the extremity, such that the icons are included within the user interface.

10. The computer program product of claim 7, wherein for one or more icons presented at a vertical location below a vertical location of the user input, the one or more icons are presented a horizontal threshold distance away from a horizontal location of the user input such that the one or more icons are not obstructed by a portion of a hand associated with the user input.

11. The computer program product of claim 7, wherein the temporary selection input indicates that (1) the user input was applied to the pressure sensitive screen at a greater pressure than the first threshold, and that (2) the user input extended from the location of the user input to a location associated with the particular icon.

12. The computer program product of claim 7, wherein the operations further comprise:
presenting a graphical representation of the particular icon within a threshold vertical distance of a top portion of the user interface.

13. A system comprising one or more processors and a computer program product storing instructions, that when executed by the one or more processors, cause the one or more processors to perform operations comprising:
displaying a user interface on a pressure sensitive screen, the user interface including a representation of one or more medical images;
obtaining information indicating user input on the pressure sensitive screen, the information indicating a location in the user interface of the user input and a pressure value indicating a measure of pressure applied to the pressure sensitive screen;
in response to determining that the pressure value exceeds a first threshold, presenting a graphical menu comprising a plurality of icons on the pressure sensitive screen, each icon being associated with different functionality to perform on the one or more medical images;
with the graphical menu displayed, detecting a temporary selection input of a particular icon of the plurality icons;
subsequent to the temporary selection of the particular icon, detecting that the particular icon has been permanently selected in response to the pressure value being less than a second threshold;
in response to said permanent selection, initiating execution of a particular functionality associated with the particular icon on the one or more medical images and setting a functionality of a new user input to the particular functionality associated with the particular icon; and
subsequent to said permanent selection of the particular icon, receiving a new user input on the pressure sensitive screen, and applying the particular functionality associated with the particular icon in response to the user input.

14. The system of claim 13, wherein the plurality of icons are presented along a perimeter of a rectangular area of the user interface, wherein the location of the user input is included in the rectangular area.

15. The system of claim 13, wherein the location in the user interface of the user input is within a first threshold distance of an extremity of the user interface, and wherein the plurality of icons are placed along a curve initiating a second threshold distance from the extremity, such that the icons are included within the user interface.

16. The system of claim 13, wherein for one or more icons presented at a vertical location below a vertical location of the user input, the one or more icons are presented a horizontal threshold distance away from a horizontal location of the user input such that the one or more icons are not obstructed by a portion of a hand associated with the user input.

17. The system of claim 13, wherein the temporary selection input indicates that (1) the user input was applied to the touch screen at a greater pressure than the first threshold, and that (2) the user input extended from the location of the user input to a location associated with the particular icon.

18. The system of claim 13, wherein the operations further comprise:
presenting a graphical representation of the particular icon within a threshold vertical distance of a top portion of the user interface.

* * * * *